(12) United States Patent
Uno et al.

(10) Patent No.: US 10,073,237 B2
(45) Date of Patent: Sep. 11, 2018

(54) LENS BARREL

(71) Applicant: Panasonic Intellectual Property Management Co., Ltd., Osaka (JP)

(72) Inventors: Tetsuya Uno, Osaka (JP); Atsushi Hasegawa, Osaka (JP); Manabu Kobayashi, Osaka (JP); Hiroyasu Fujinaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 22 days.

(21) Appl. No.: 15/145,150

(22) Filed: May 3, 2016

(65) Prior Publication Data

US 2016/0320587 A1 Nov. 3, 2016

Related U.S. Application Data

(63) Continuation of application No. 14/589,378, filed on Jan. 5, 2015, now Pat. No. 9,360,655.

(30) Foreign Application Priority Data

| Jan. 6, 2014 | (JP) | 2014-000631 |
| Jan. 6, 2014 | (JP) | 2014-000632 |
| Feb. 12, 2014 | (JP) | 2014-024798 |

(51) Int. Cl.
*G02B 15/14* (2006.01)
*G02B 7/10* (2006.01)
(Continued)

(52) U.S. Cl.
CPC ............ *G02B 7/10* (2013.01); *G02B 7/04* (2013.01); *G02B 13/009* (2013.01);
(Continued)

(58) Field of Classification Search
CPC .......... G02B 7/10; G02B 7/04; G02B 13/009; G02B 27/646; G03B 3/10; G03B 5/00;
(Continued)

(56) References Cited

U.S. PATENT DOCUMENTS 8,503,103 B2 * 8/2013 Onishi .................. G02B 7/102
359/695
2005/0276172 A1 12/2005 Tsutsumi
(Continued)

FOREIGN PATENT DOCUMENTS

| JP | S5855905 A | 4/1983 |
| JP | S60162216 A | 8/1985 |

(Continued)

OTHER PUBLICATIONS

Co-pending U.S. Appl. No. 15/145,171, filed May 3, 2016 (copy of application provided).
(Continued)

*Primary Examiner* — James Greece
(74) *Attorney, Agent, or Firm* — Renner Otto Boisselle & Sklar, LLP

(57) ABSTRACT

A lens barrel includes at least one lens, the optical axis of the lens; the first frame (the fixed frame 900) having the first restricting portion (901, 902) and having an approximately cylindrical shape about the optical axis; the second frame (1000) having the cam groove (1036) and having an approximately cylindrical shape about the optical axis; the third frame (510) having the guide portion (511) which restricts inclination thereof with respect to the first contact portion (514) and the optical axis and having an approximately cylindrical shape about the optical axis; the drive arm (520) having a cam follower (523), the second restricting portion (524, 525) and the second contact portion (526), and having an approximately arcuate shape constituted of a
(Continued)

portion of a circular cylinder about the optical axis or an approximately plate shape; the guide shaft (601) for guiding the guide in a movable manner in the optical axis direction; and the spring (603). The first restricting portion engages with the second restricting portion. The cam engages with the cam groove (1036). The drive arm moves approximately parallel to the optical axis due to the relative rotation of the second with respect to the first frame, the third is biased by the thus bringing the first contact portion and the second contact portion into contact with each other, and the third frame moves in the optical axis direction in an interlocking manner with the drive with the inclination of the guide being restricted by the guide.

5 Claims, 33 Drawing Sheets

(51) Int. Cl.
*G03B 3/10* (2006.01)
*G02B 13/00* (2006.01)
*G02B 7/04* (2006.01)
*G02B 27/64* (2006.01)
*G03B 5/00* (2006.01)
*G03B 17/04* (2006.01)
*H04N 5/225* (2006.01)
*H04N 5/232* (2006.01)

(52) U.S. Cl.
CPC .............. *G02B 27/646* (2013.01); *G03B 3/10* (2013.01); *G03B 5/00* (2013.01); *G03B 17/04* (2013.01); *H04N 5/225* (2013.01); *H04N 5/2254* (2013.01); *H04N 5/23287* (2013.01); *G03B 2205/0053* (2013.01)

(58) Field of Classification Search
CPC ...... G03B 17/04; H04N 5/225; H04N 5/2254; H04N 5/23287
USPC .................................................. 359/695–696
See application file for complete search history.

(56) References Cited

U.S. PATENT DOCUMENTS

2010/0165493 A1    7/2010   Fukino et al.
2011/0273781 A1*   11/2011   Nuno ..................... G02B 7/021
                                                   359/696

FOREIGN PATENT DOCUMENTS

| JP | S63210808 A | 9/1988 |
|---|---|---|
| JP | 2001235670 A | 8/2001 |
| JP | 2004341401 A | 12/2004 |
| JP | 2005077712 A | 3/2005 |
| JP | 2005215416 A | 8/2005 |
| JP | 2006003421 A | 1/2006 |
| JP | 2008070770 A | 3/2008 |
| JP | 2009222744 A | 10/2009 |
| JP | 2012053411 A | 3/2012 |
| JP | 2012053412 A | 3/2012 |
| JP | 2012053413 A | 3/2012 |
| JP | 2010156797 A | 7/2012 |
| JP | 2013152263 A | 8/2013 |

OTHER PUBLICATIONS

Co-pending U.S. Appl. No. 15/145,191, filed May 3, 2016 (copy of application provided).
Co-pending U.S. Appl. No. 14/589,378, filed Jan. 5, 2015 (copy of application provided).

* cited by examiner

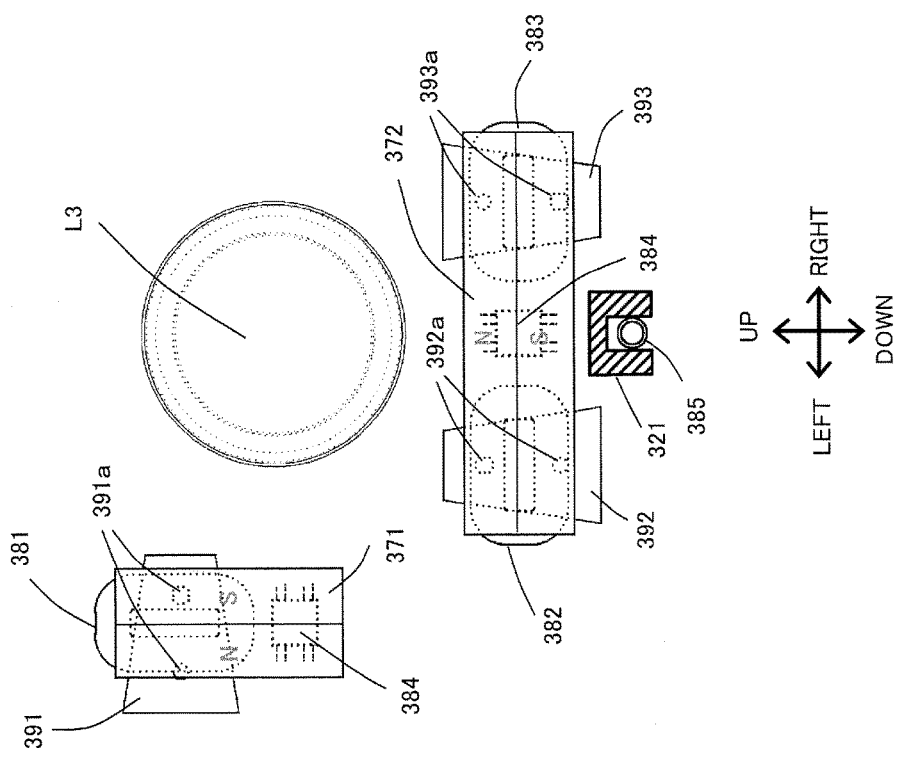
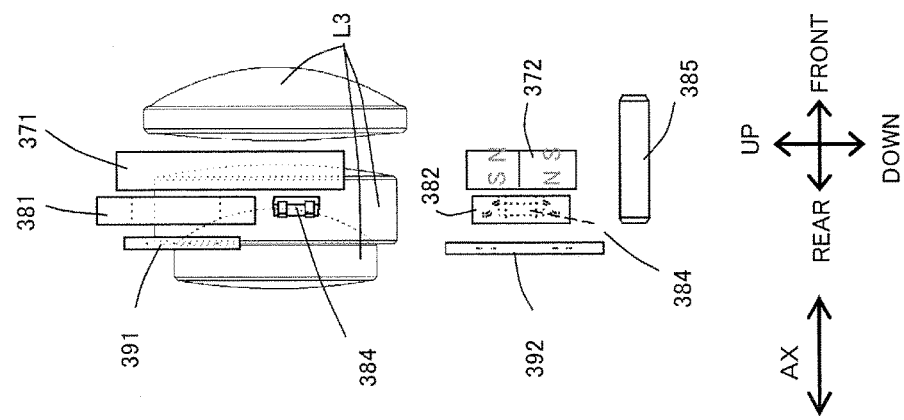

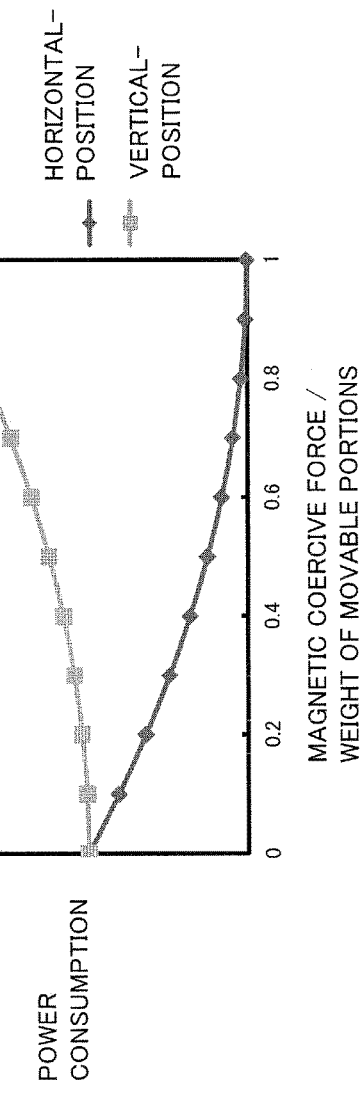
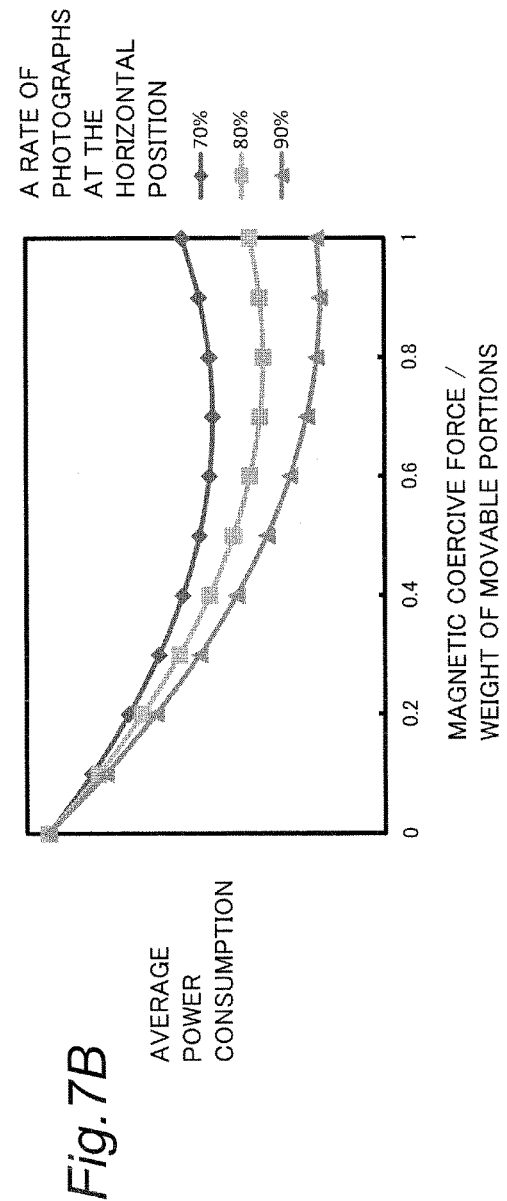
Fig. 7A
Fig. 7B

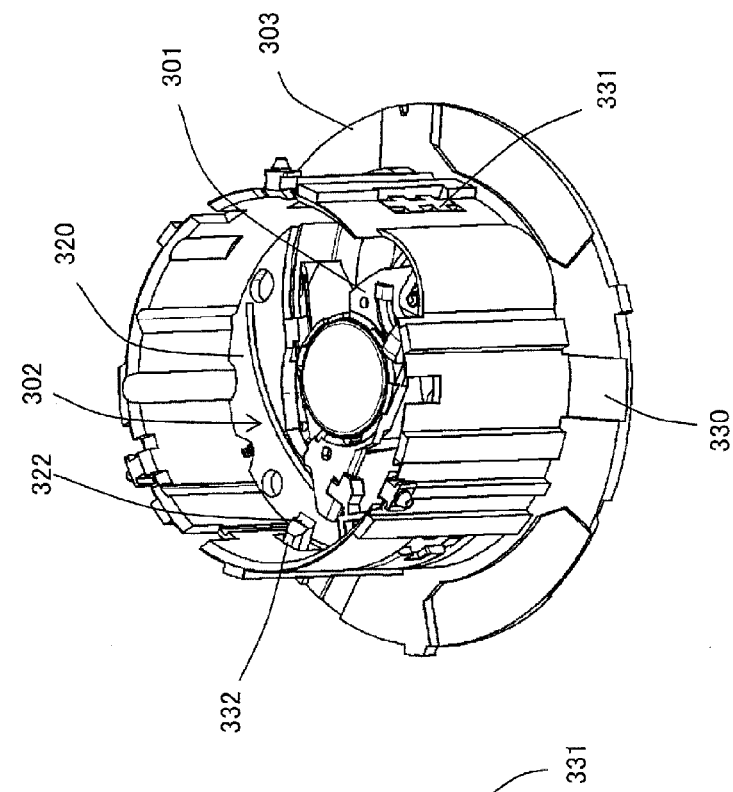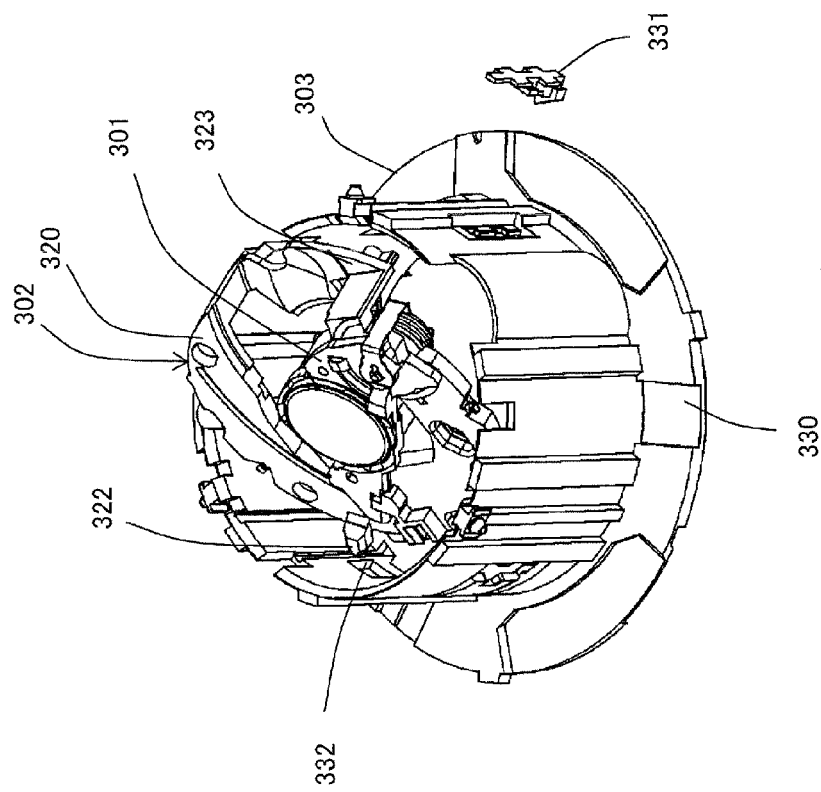

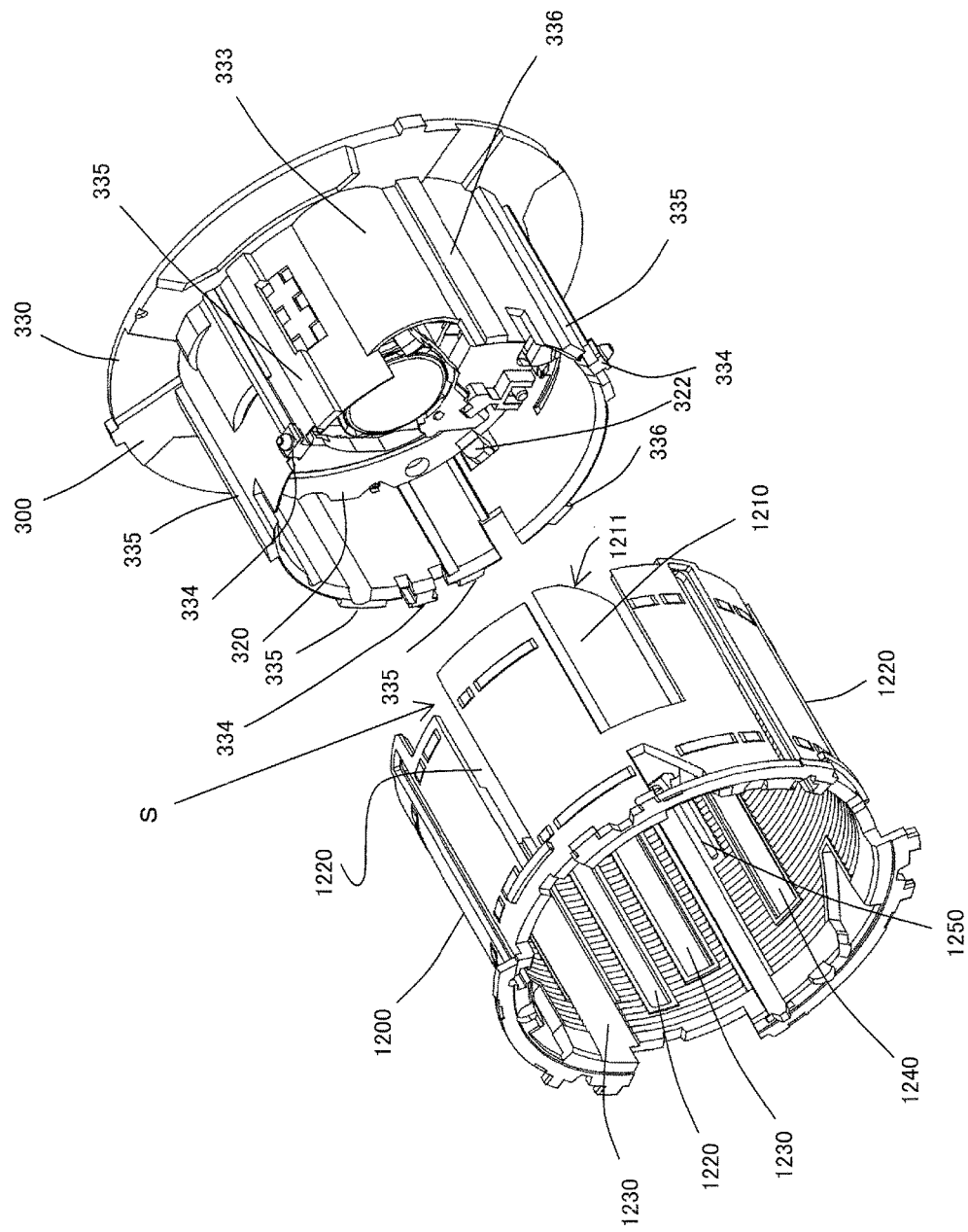

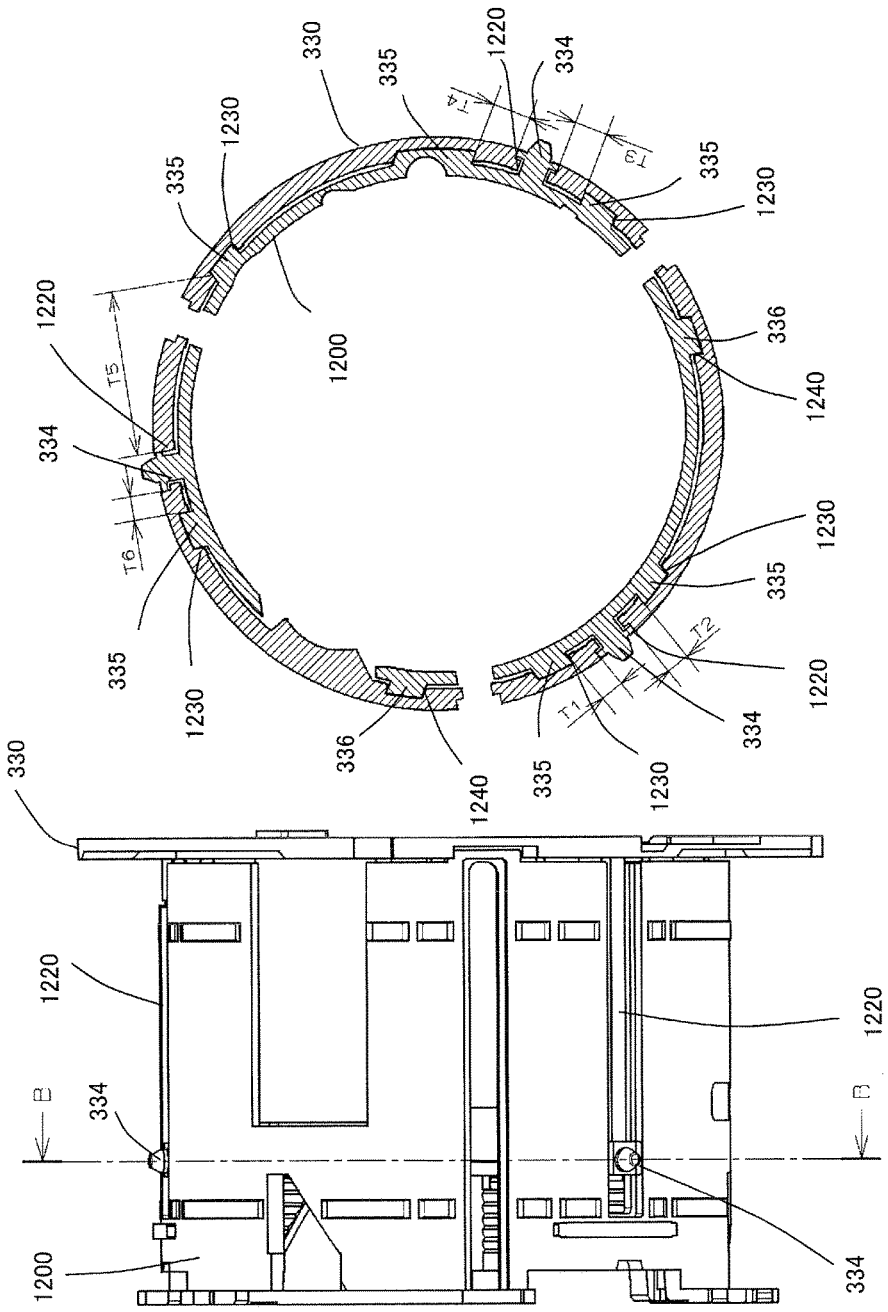

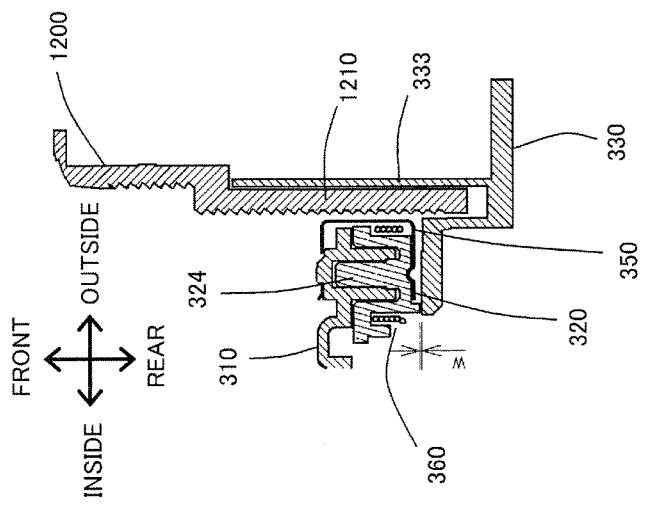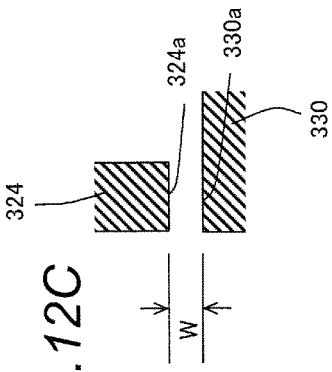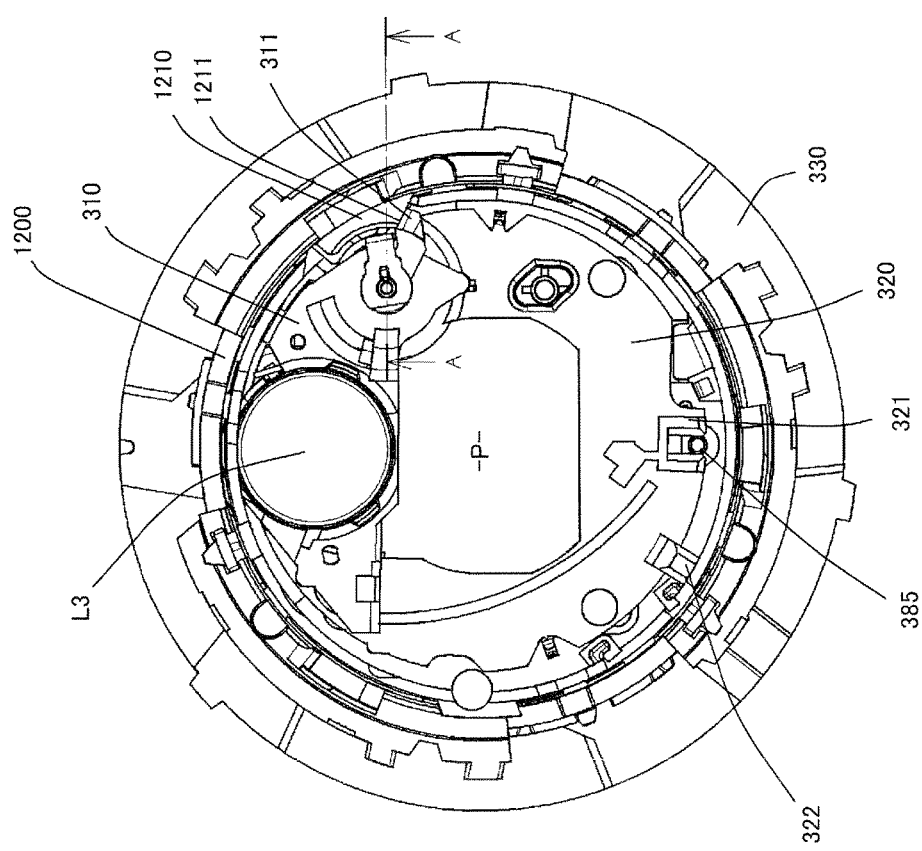

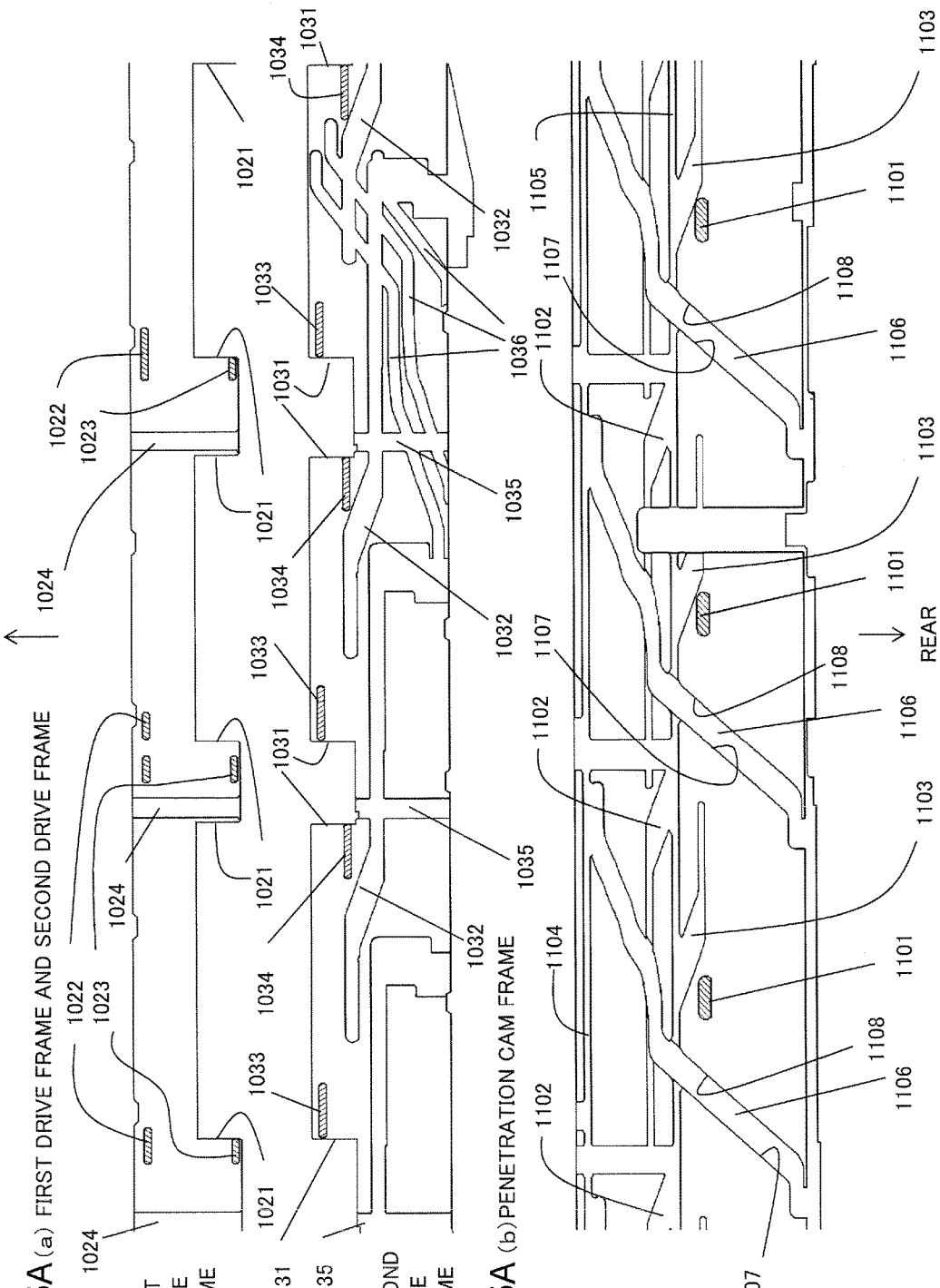

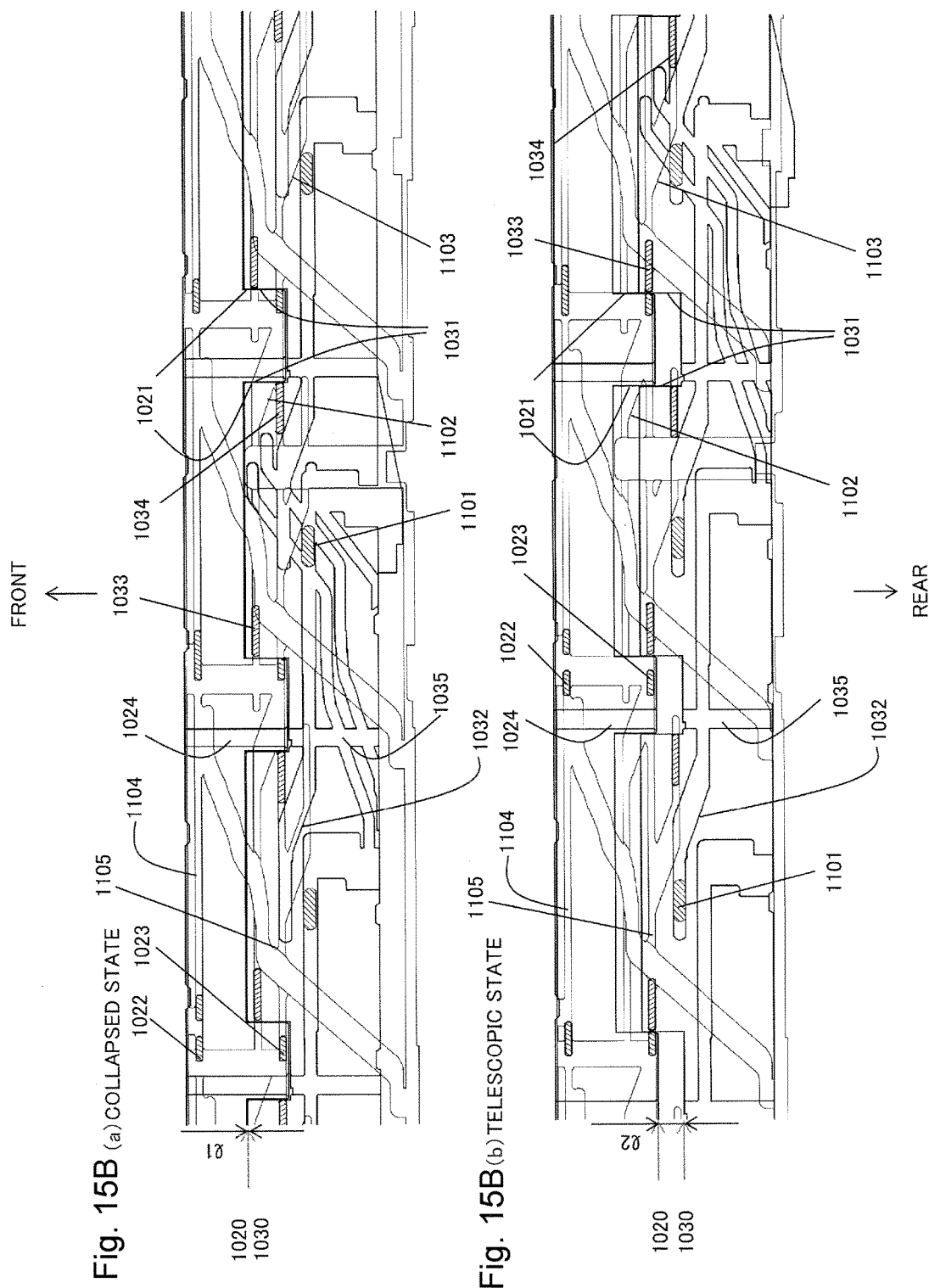

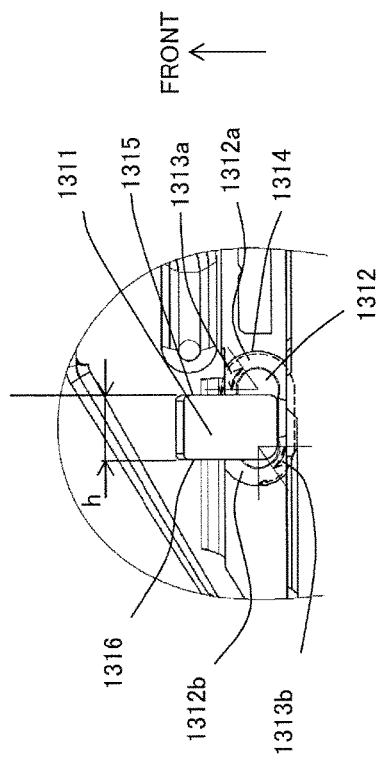
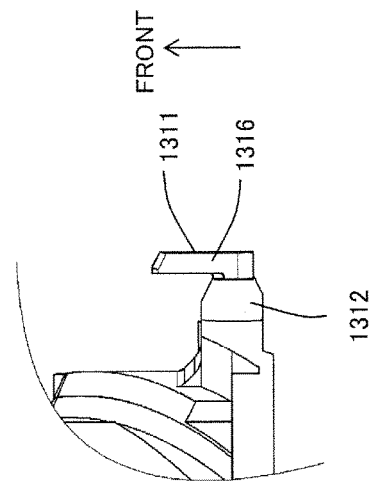
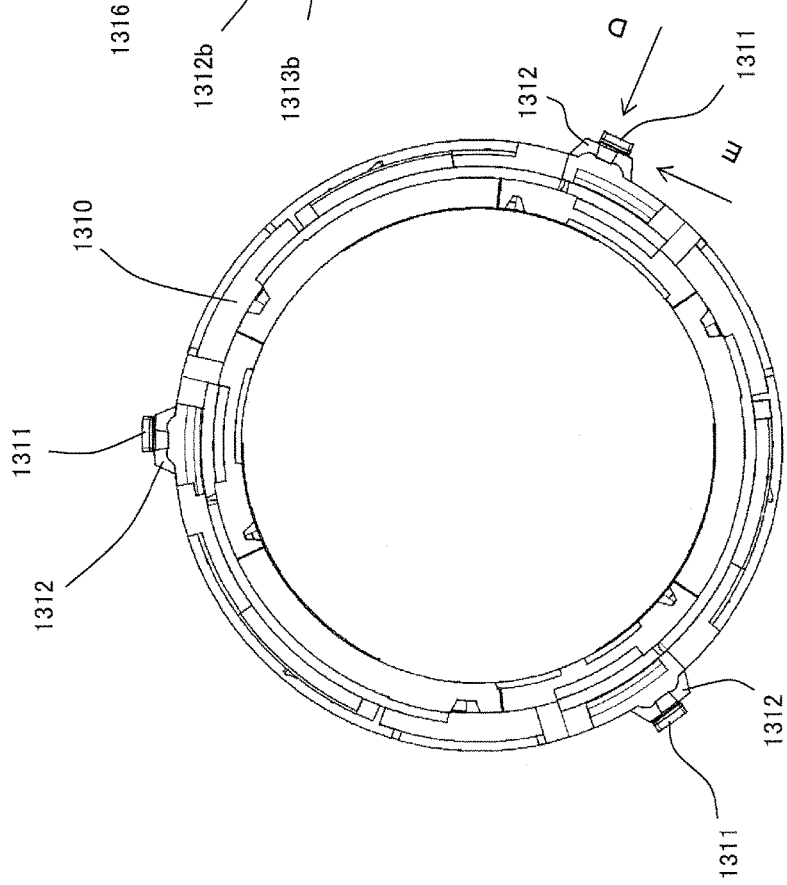

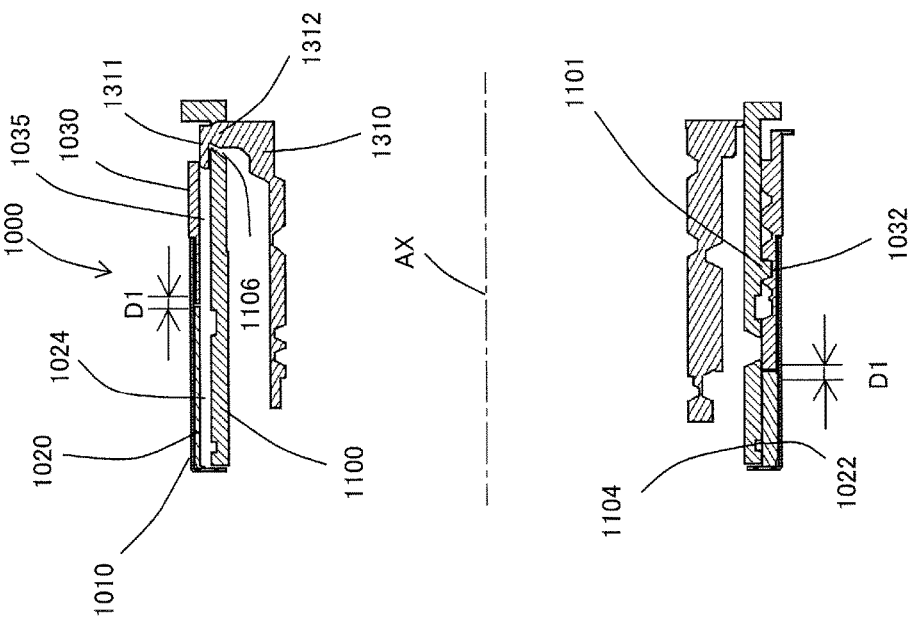
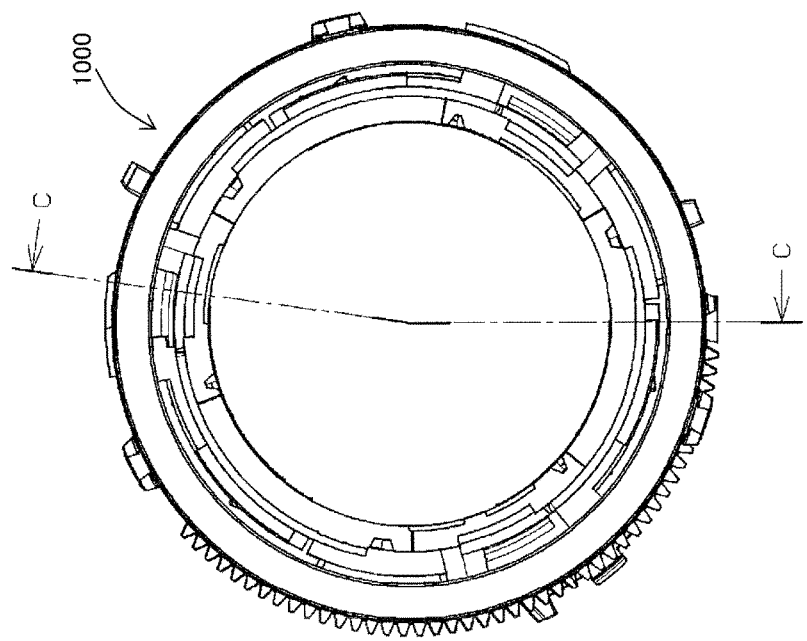
Fig. 19A
Fig. 19B

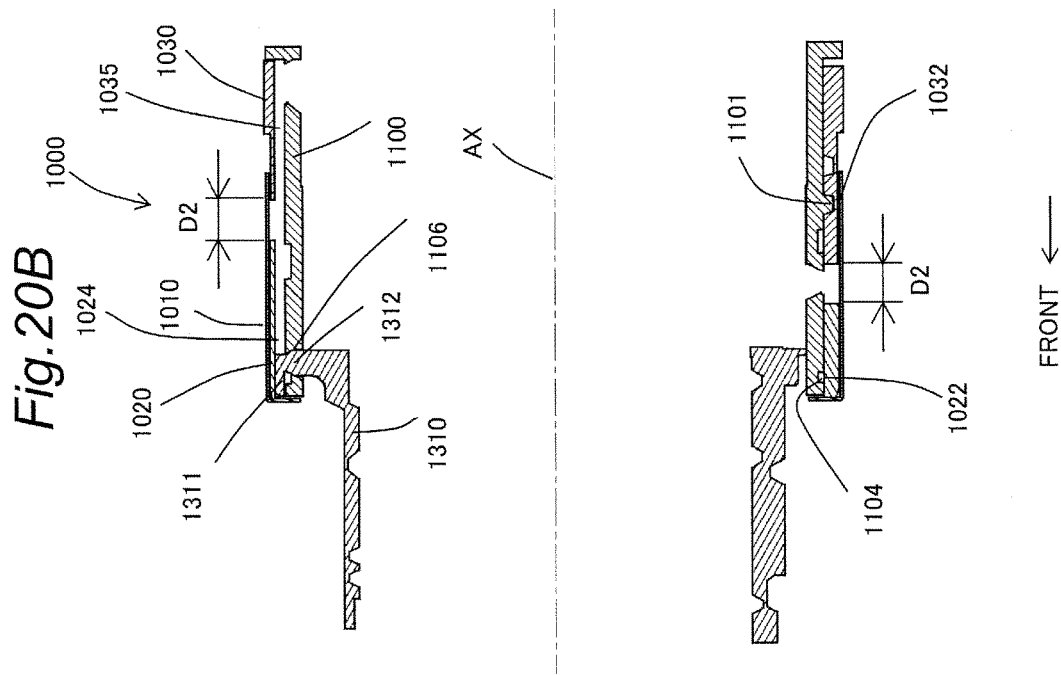
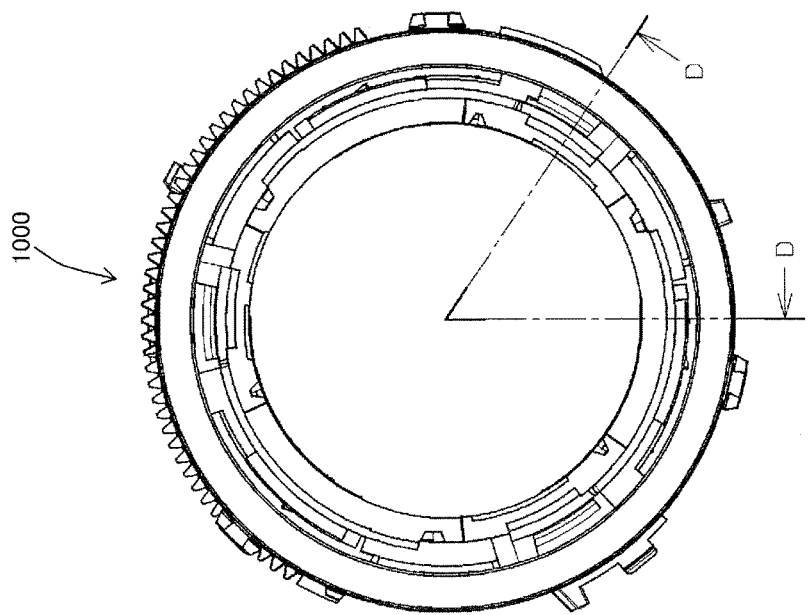

TELESCOPIC STATE

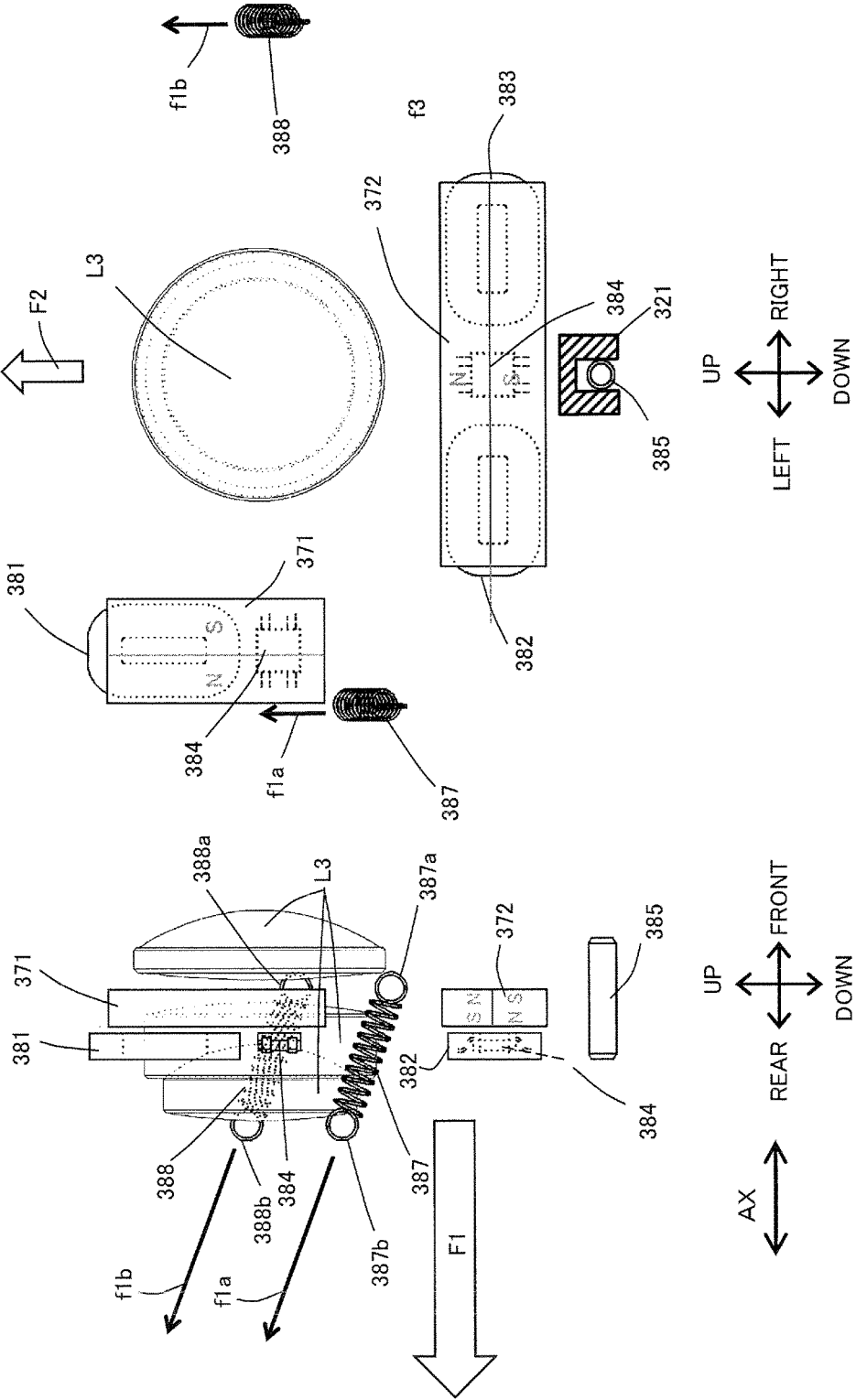

LENS BARREL

BACKGROUND

1. Technical Field

The present disclosure relates to a lens barrel provided with an optical system.

2. Related Art

JP 2012-53411 A discloses a lens barrel which enables zooming.

SUMMARY

It is an object of the present disclosure to miniaturize (to decrease a thickness of) a lens barrel in the optical axis direction.

A lens barrel according to a first aspect of the present disclosure includes at least one lens, an optical axis of the lens, a first frame including a first restricting portion, the first frame having an approximately cylindrical shape about the optical axis, a second frame including a cam groove, the second frame having an approximately cylindrical shape about the optical axis, a third frame including a first contact portion and a guide portion which restricts the inclination of the third frame with respect to the optical axis, the third frame having an approximately cylindrical shape about the optical axis, a drive arm including a cam follower, a second restricting portion and a second contact portion, the drive arm having an approximately arc shape constituted of a portion of a circular cylinder about the optical axis or an approximately plate shape, a guide shaft for guiding the guide portion in a movable manner in an optical axis direction, and a spring, wherein the first restricting portion engages with the second restricting portion, the cam follower engages with the cam groove, and along with the rotation of the second frame relative to the first frame, the drive arm moves approximately parallel to the optical axis, the third frame is biased by the spring so that the first contact portion and the second contact portion are brought into contact with each other, and the third frame moves in the optical axis direction in an interlocking manner with the drive arm in a state where the inclination of the guide portion is restricted by the guide shaft.

According to the lens barrel of the present disclosure, a lens barrel can be miniaturized (can be made thin) in the optical axis direction.

BRIEF DESCRIPTION OF DRAWINGS

FIGS. 5A and 5B are constitutional views of an OIS actuator;

FIGS. 7A and 7B are explanatory views showing power consumption of the OIS actuator;

FIGS. 8A and 8B are views showing an assembling method of the third group unit 300;

FIG. 9 is a perspective view showing the relationship between the third group unit 300 and a rotation restricting frame 1200;

FIGS. 10A and 10B are a side view and a cross-sectional view showing the relationship between the third group unit 300 and the rotation restricting frame 1200;

FIGS. 12A to 12C are a front view and cross-sectional views showing the relationship between the third group unit 300 and the rotation restricting frame 1200;

FIGS. 15A(a) and 15A(b) are views for describing the relationship between the drive frame unit 1000 and the penetration cam frame 1100;

FIGS. 15B(a) and 15B(b) are view for describing the relationship between the drive frame unit 1000 and the penetration cam frame 1100;

FIGS. 17A to 17C are a front view and views as viewed in the direction indicated by arrows of the double-sided cam frame 1310;

FIGS. 19A and 19B are views showing the relationship (a collapsed state) between the drive frame unit 1000, the penetration cam frame 1100 and the double-sided cam frame 1310;

FIGS. 20A and 20B are views showing the relationship (a telescopic state) between the drive frame unit 1000, the penetration cam frame 1100 and the double-sided cam frame 1310;

FIGS. 30A and 30B are constitutional views showing another example of the OIS actuator.

DETAILED DESCRIPTION OF PREFERRED EMBODIMENT

Figure 1:
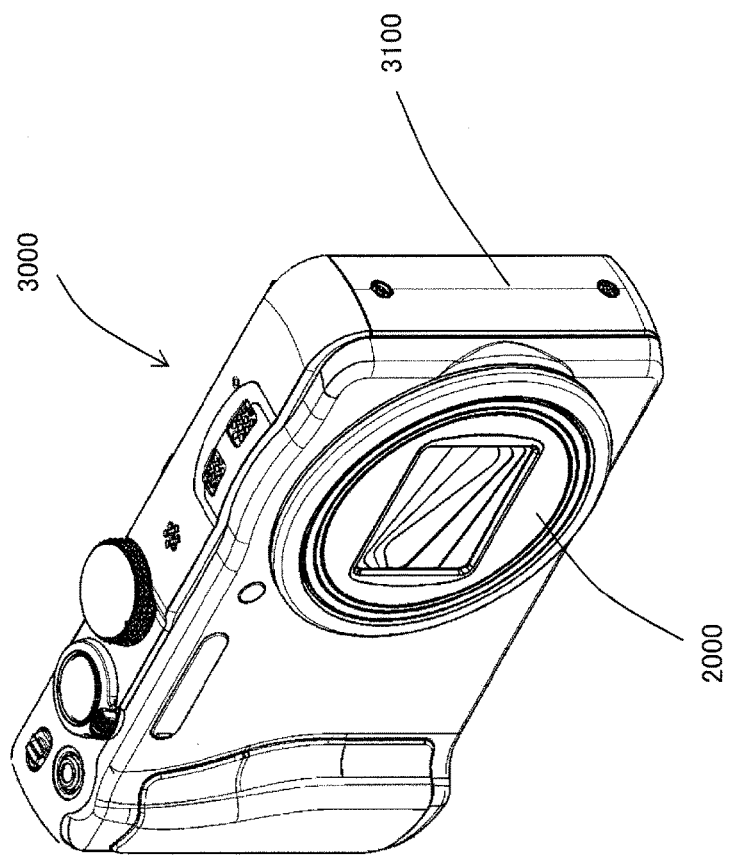
FIG. 1 is a perspective view of a digital camera 3000.

Hereinafter, an embodiment is described in detail with reference to drawings. However, the detailed explanation of the embodiment more than necessary may be omitted. For example, the detailed description of matters which are already well-known or the repeated explanation of the substantially identical constitutions may be omitted. Such omission can prevent the explanation made hereinafter from becoming unduly redundant thus facilitating the understanding of the present disclosure by those who are skilled in the art.

Inventors of the present invention provide attached drawings and the explanation made hereinafter for enabling those who are skilled in the art to sufficiently understand the present disclosure, and the inventors do not intend to limit the invention called for in Claims by the drawings and the explanation.

The embodiment of the present disclosure is described with reference to drawings. In the description made hereinafter with reference to drawings, identical or similar portions are given the same or similar symbols. However, the drawings are schematic views and hence, there may be a case where a size ratio between respective parts and the like differ from those of an actual product. Accordingly, specific sizes and the like should be determined by taking into account the explanation made hereinafter. It is also needless to say that portions are described differently from each other with respect to a size relationship and a size ratio among drawings.

In the following embodiment, the explanation is made by taking a digital camera as an example of an imaging device. In the explanation made hereinafter, using a digital camera in a horizontal position as the reference, a subject side is expressed as "front", a side opposite to the subject is expressed as "rear", a vertically upper side is expressed as "up", a vertically lower side is expressed as "down", a right side when a user views a lens barrel from the subject side is expressed as "right", and a left side when the user views the lens barrel from the subject side is expressed as "left". The horizontal position is a kind of posture of the digital camera. When a user takes a picture in a horizontal position, a long-side direction of a horizontally-elongated rectangular image substantially agrees with the horizontal direction in an image. A vertical position is another kind of posture of the digital camera. When the user takes a picture in the vertical position, the long-side direction of a horizontally-elongated rectangular image substantially agrees with the vertical direction in the image. With respect to a lens barrel of a camera, there may be a case where a center side in the radial direction is referred to as "inner peripheral side", and a side opposite to the center side in the radial direction is referred to as "outer peripheral side". There may be also a case where the direction toward a side opposite to the radial center in the radial direction of the lens barrel of the camera is referred to as "outer peripheral direction".

[1. Overall constitution of digital camera (FIG. 1, FIG. 2A, FIG. 2B)]

Figure 2A:
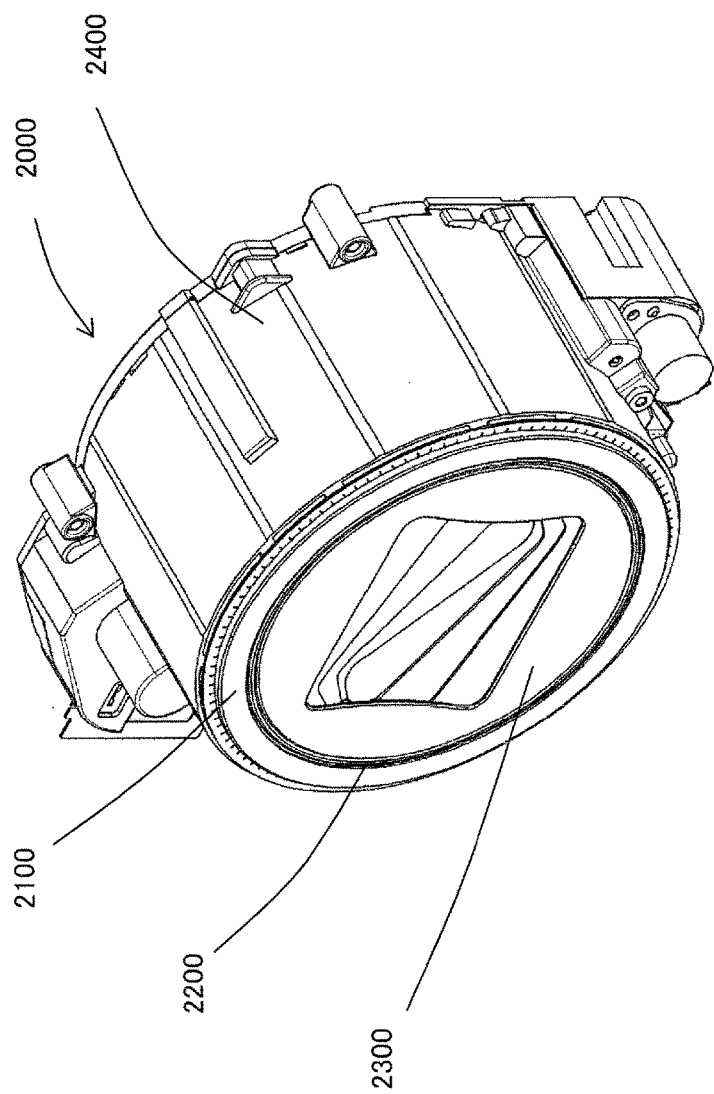
FIG. 2A is a perspective view showing a collapsed state of a lens barrel 2000.
Figure 2B:
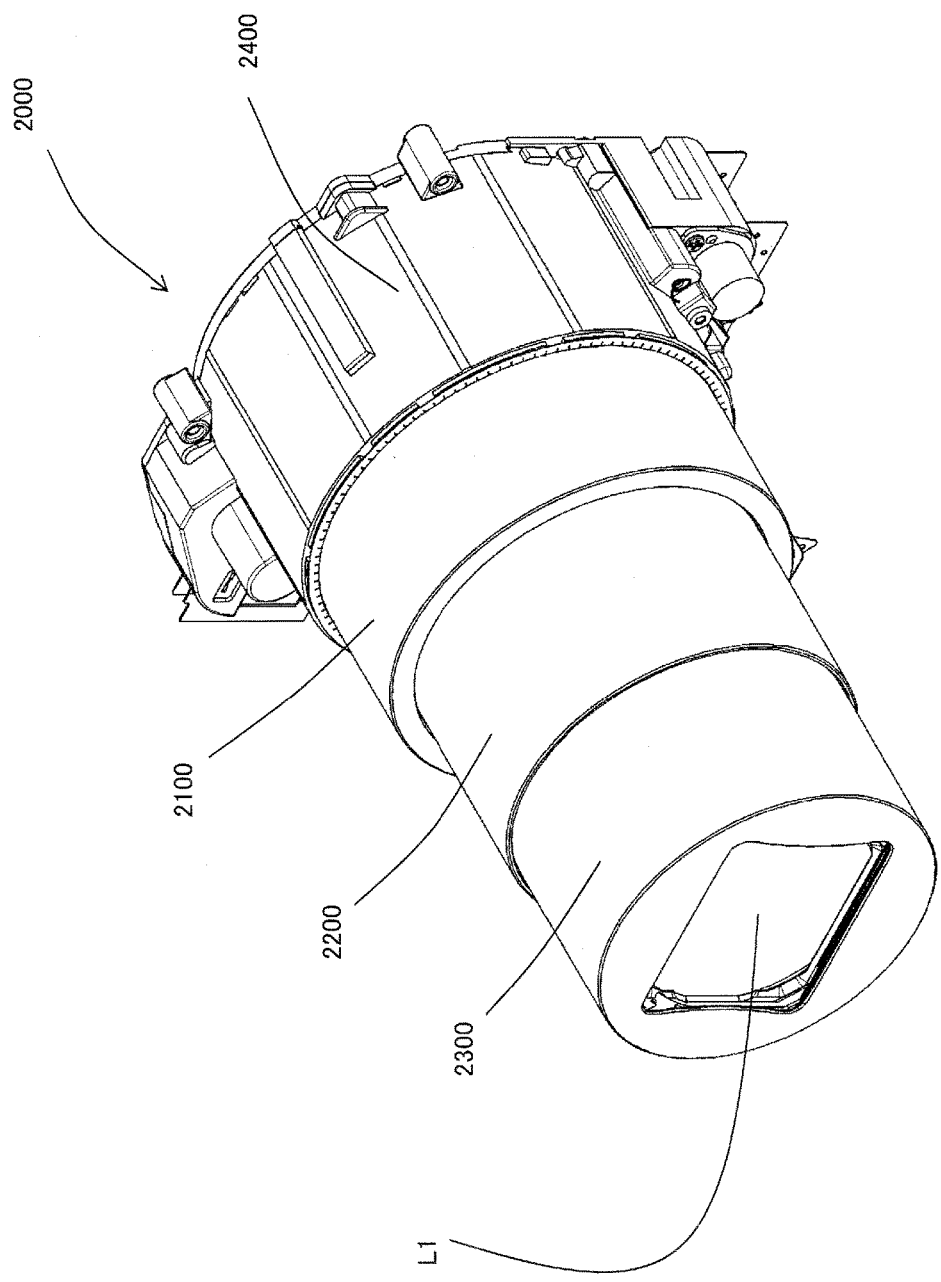
FIG. 2B is a perspective view showing a telescopic state of the lens barrel 2000.

The constitution of a digital camera 3000 is described with reference to drawings. FIG. 1 is a perspective view of the digital camera 3000. FIG. 2A and FIG. 2B are perspective views of a lens barrel 2000. The lens barrel 2000 in a collapsed state is shown in FIG. 2A, while the lens barrel 2000 in a telescopic state is shown in FIG. 2B. In this embodiment, the telescopic state is a state where the lens barrel is extended the most.

As shown in FIG. 1, the digital camera 3000 includes a housing 3100, and the lens barrel 2000.

The lens barrel 2000 is a three-stage collapsible lens barrel. The lens barrel 2000 is housed in the housing 3100 when photographing is not performed, and is extended frontwardly when photographing is performed. To be more specific, as shown in FIG. 2A and FIG. 2B, the lens barrel 2000 includes: a first movable barrel portion 2100; a second movable barrel portion 2200; a third movable barrel portion 2300; and a fixed barrel portion 2400.

The first movable barrel portion 2100 is extendable with respect to the fixed barrel portion 2400. The second movable barrel portion 2200 is extendable with respect to the first movable barrel portion 2100. The third movable barrel portion 2300 is extendable with respect to the second movable barrel portion 2200. The fixed barrel portion 2400 is fixed to the inside of the housing 3100. As shown in FIG. 2B, when the lens barrel 2000 is extended, the third movable barrel portion 2300 is positioned at the frontmost side out of the first to third movable barrel portions 2100 to 2300.

[2. Constitution of Lens Barrel (FIG. 3)]

Figure 3:
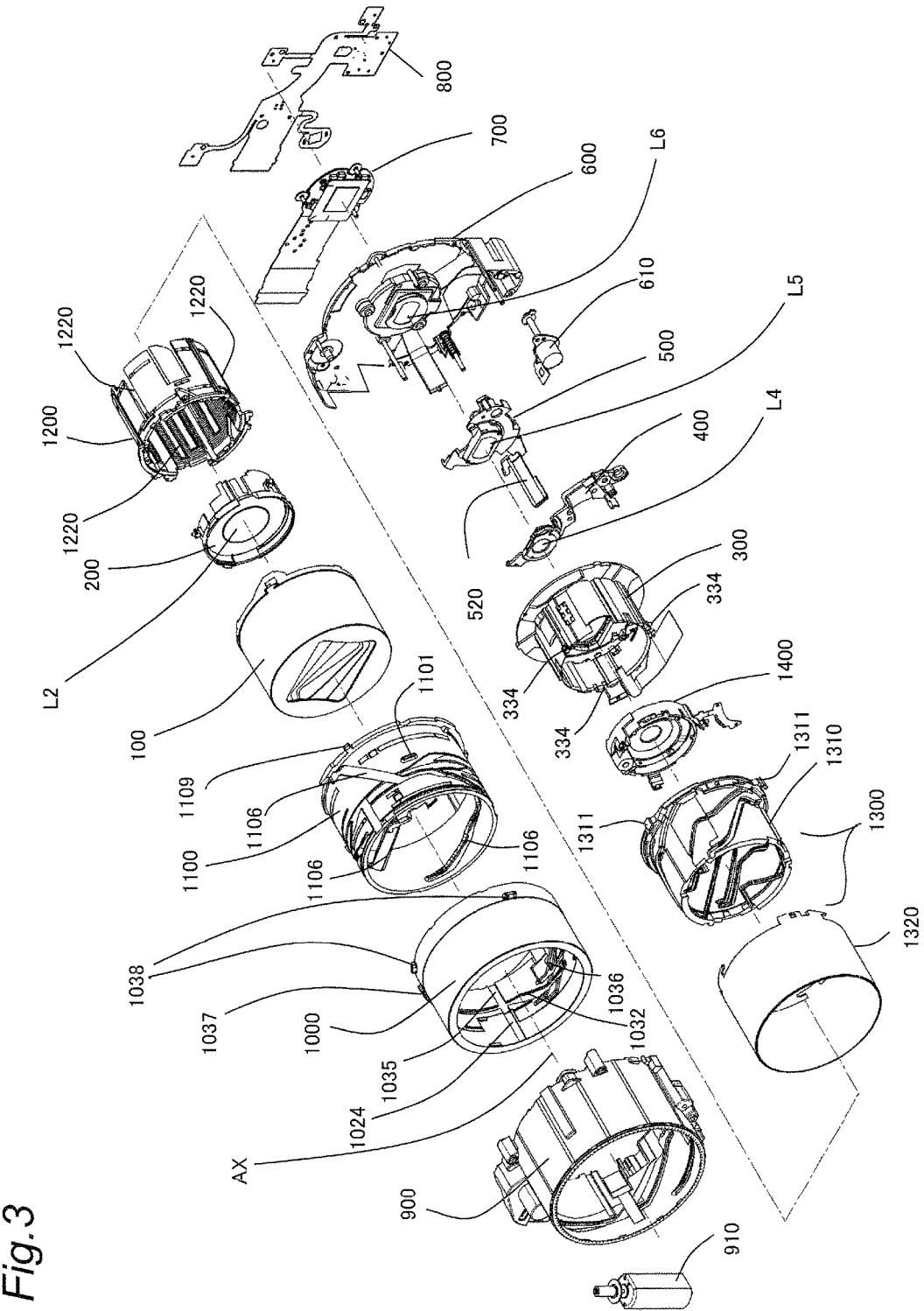
FIG. 3 is an exploded perspective view of the lens barrel 2000.

FIG. 3 is an exploded perspective view of the lens barrel 2000. This chapter and FIG. 3 are provided for describing the schematic constitution of the lens barrel, and there may be a case where symbols in the chapter and symbols used in the sentences are omitted in these drawings.

The first to third movable barrel portions 2100 to 2300 of the lens barrel 2000 are extended from the fixed barrel portion 2400 along an optical axis AX of an optical system. The optical system includes a first lens group L1 to a sixth lens group L6. In the explanation made hereinafter, the direction parallel to the optical axis AX is referred to as "optical axis direction", the direction orthogonal to the optical axis direction is referred to as "radial direction", and the direction along a circle about the optical axis AX is referred to as "circumferential direction". The optical axis AX substantially agrees with axes of respective frames which constitute the lens barrel 2000.

As shown in FIG. 3, the lens barrel 2000 includes: a first group unit 100; a second group unit 200; a third group unit 300; a fourth group unit 400; a fifth group unit 500; a master flange unit 600; an imaging element unit 700; a flexible printed circuit board 800; a fixed frame 900; a drive frame unit 1000; a penetration cam frame 1100; a rotation restricting frame 1200; a double-sided cam frame unit 1300; and a shutter unit 1400.

In this embodiment, the fixed frame 900 and the master flange unit 600 constitute the fixed barrel portion 2400. The first group unit 100 constitutes the third movable barrel portion 2300. The rotation restricting frame 1200 and the double-sided cam frame unit 1300 constitute the second movable barrel portion 2200. The drive frame unit 1000 and the penetration cam frame 1100 constitute the first movable barrel portion 2100.

The fixed frame 900 is formed in a circular cylindrical shape. A rotation restricting groove and a cam groove are formed on an inner peripheral surface of the fixed frame 900. A zooming motor unit 910 is mounted on an outer peripheral surface of the fixed frame 900. The zooming motor unit 910 is a drive source for extending the first to third movable barrel portions 2100 to 2300.

The master flange unit 600 is a plate-like member made of a resin which covers a rear portion of the fixed frame 900. The sixth lens group L6 is held on a front side of the radial center of the master flange unit 600. The imaging element unit 700 is fitted in a rear side of the radial center of the master flange unit 600.

The drive frame unit 1000 is formed in a circular cylindrical shape. The drive frame unit 1000 is arranged on an inner peripheral side of the fixed frame 900. The drive frame unit 1000 includes: rotation restricting grooves 1024, 1035; lifting cam grooves 1032; driving cam grooves 1036; cam followers 1038; and a driven gear portion 1037. The rotation restricting grooves 1024, 1035 are formed on an inner peripheral surface of the drive frame unit 1000 along the optical axis direction. The lifting cam groove 1032 is formed on the inner peripheral surface of the drive frame unit 1000. The cam follower 1038 and the driven gear portion 1037 are arranged on a rear end portion of the outer peripheral surface of the drive frame unit 1000. The cam follower 1038 engages with a cam groove formed on the inner peripheral surface of the fixed frame 900. The driven gear portion 1037 engages with a drive gear 910a joined to a drive shaft of the zooming motor unit 910 (see FIG. 25, FIG. 26). By driving the zooming motor unit 910, the drive frame unit 1000 advances or retracts in the optical axis direction while rotating about the optical axis AX. The drive frame unit 1000 includes: an ornamental ring 1010; a first drive frame 1020; and a second drive frame 1030. The detailed constitution of the drive frame unit 1000 is described later.

The penetration cam frame 1100 is formed in a circular cylindrical shape. The penetration cam frame 1100 is arranged on an inner peripheral side of the drive frame unit 1000. The penetration cam frame 1100 includes: a penetration cam groove 1106 which penetrates a wall (hereinafter, referred to as "peripheral wall") of the penetration cam frame 1100 which constitutes the circular cylinder in the radial direction; rotation restricting grooves; lifting cam followers 1101; and rotation restricting projections 1109. The penetration cam frame 1100 is held on the drive frame unit 1000 in a rotatable manner relative to the drive frame unit 1000 about the optical axis AX. The penetration cam groove 1106 penetrates the peripheral wall of the penetration cam frame 1100 in the radial direction. The lifting cam followers 1101 are formed on an outer peripheral surface of the penetration cam frame 1100, and engage with the lifting cam grooves 1032 formed on the inner peripheral surface of the drive frame unit 1000. The rotation restricting projections 1109 are arranged on a rear end portion of the outer peripheral surface of the penetration cam frame 1100, and engage with the rotation restricting grooves formed on the inner peripheral surface of the fixed frame 900. With this configuration, the penetration cam frame 1100 is movable in the optical axis direction relative to the fixed frame 900, while the rotation of the penetration cam frame 1100 relative to the fixed frame 900 about the optical axis AX is restricted.

Figure 28:
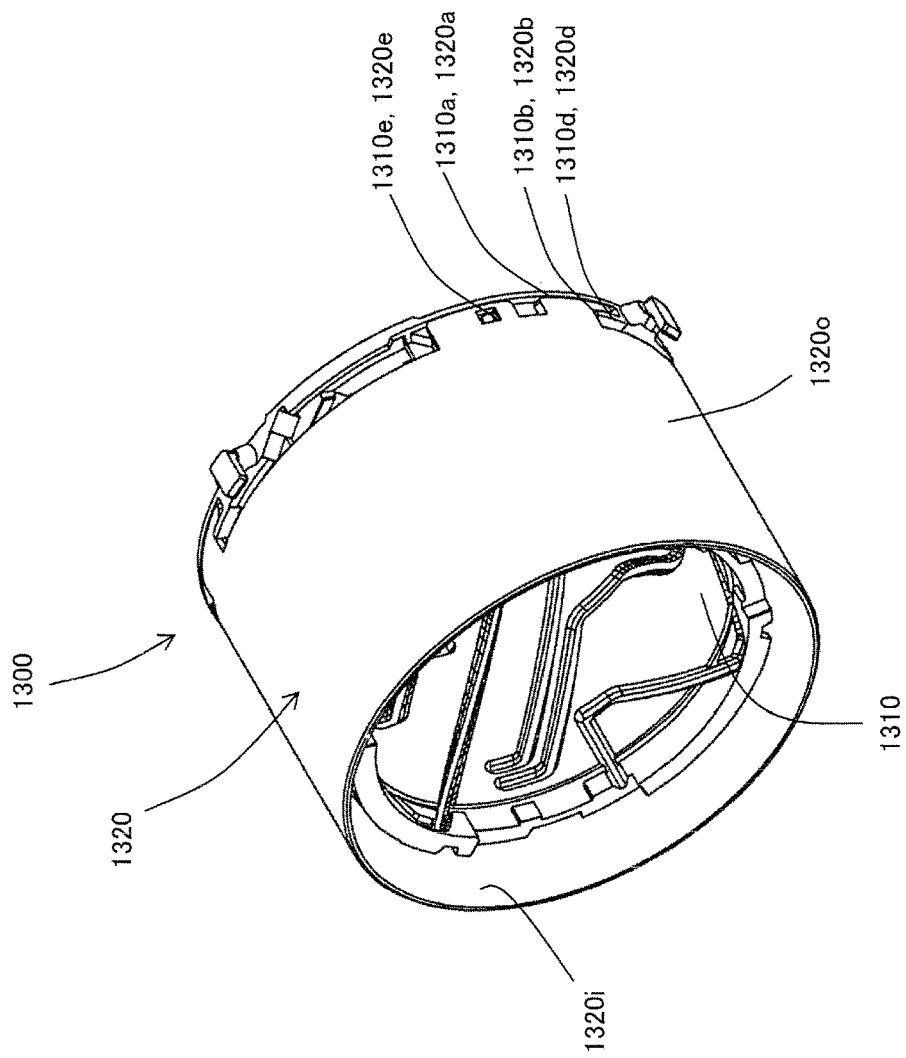
FIG. 28 is a perspective view showing the relationship between the double-sided cam frame 1310 and an ornamental frame 1320.
Figure 29:
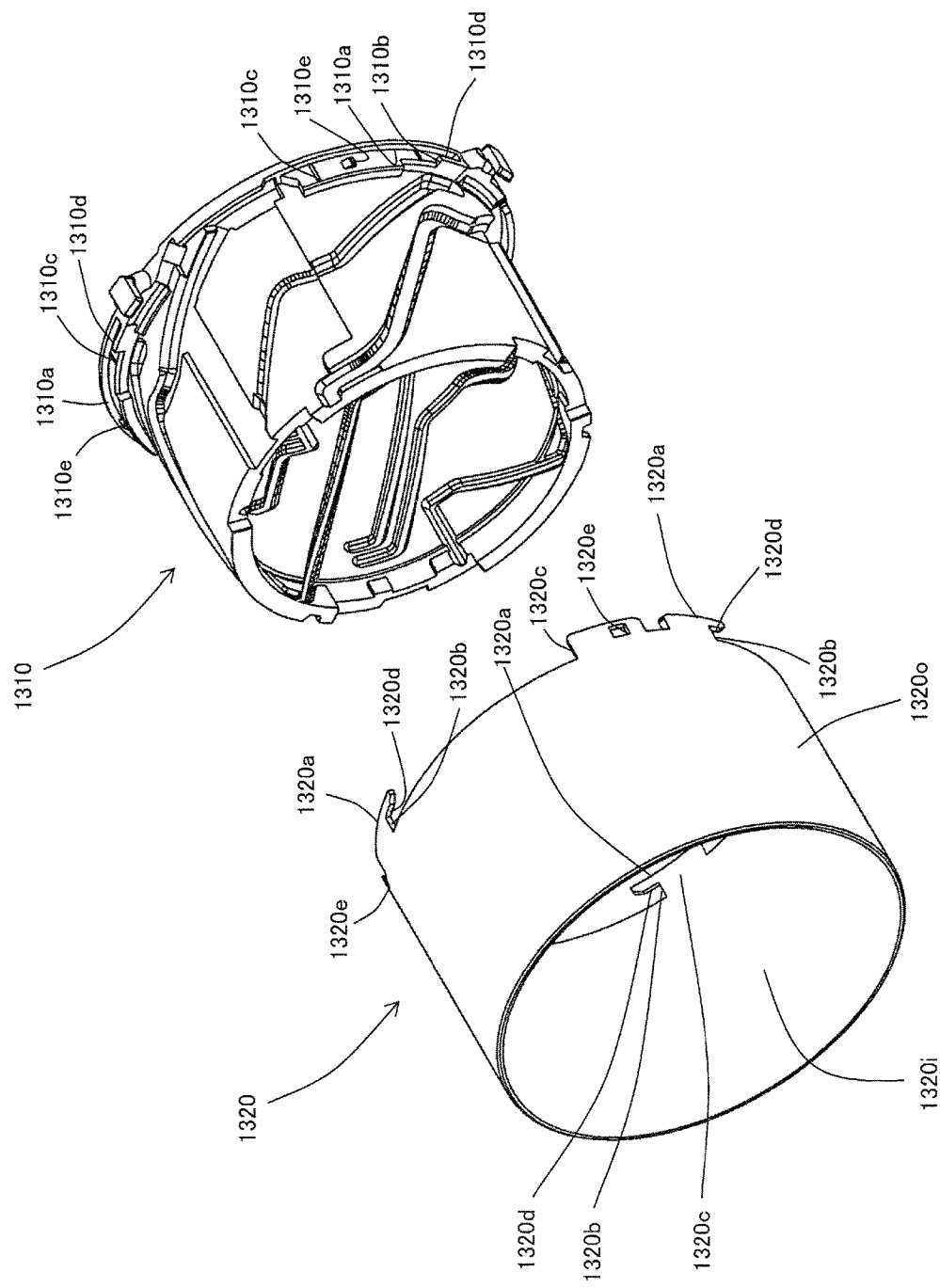
FIG. 29 is an exploded perspective view of the double-sided cam frame 1310 and the ornamental frame 1320.

As shown in FIG. 28 and FIG. 29, the double-sided cam frame unit 1300 includes: a double-sided cam frame 1310; and an ornamental frame 1320. The ornamental frame 1320 is fixed to the double-sided cam frame 1310. With this configuration, the ornamental frame 1320 is integrally formed with the double-sided cam frame 1310. An outer peripheral surface 1320o of the ornamental frame 1320 forms an external appearance surface which can be visually recognized from the outside. Accordingly, an external appearance treatment such as hairline machining or blast machining is applied to the outer peripheral surface of the ornamental frame 1320. On the other hand, an inner peripheral surface of the ornamental frame 1320 is formed into a circular cylindrical surface having no unevenness. This is because that, in the lens barrel of this embodiment, the inner peripheral surface of the ornamental frame 1320 is not required to have a function of restricting the rotation of the first group unit 100 and the like, and it is sufficient for the ornamental frame 1320 that the ornamental frame 1320 has only a function of fixing the ornamental frame 1320 per se to the double-sided cam frame 1310. The restricting of the rotation of the first group unit 100 is performed by the rotation restricting frame 1200 arranged on an inner peripheral side of the double-sided cam frame 1310. Accordingly, the ornamental frame 1320 which is arranged on an outer peripheral side of the first group unit 100 is not required to have a function of restricting the rotation of the first group unit 100. In view of the above, only the outer peripheral surface 1320o of the ornamental frame 1320 is formed of a surface to which an external appearance treatment such as hairline machining or blast machining is applied, and an inner peripheral surface 1320i is formed of a circular cylindrical surface having the approximately same diameter and having no unevenness. With this configuration, when metal is selected as a material for forming the ornamental frame 1320, the ornamental frame 1320 can be formed only by press working and lathe machining. When a metal material is used, compared to the case where a resin material is used, the same strength can be acquired while reducing a thickness of the ornamental frame 1320. When an external appearance function is provided to the outer peripheral surface of the ornamental frame 1320 and a rotation restricting function is provided to the inner peripheral surface of the ornamental frame 1320 as functions of the ornamental frame 1320, it is necessary to provide the structure where unevenness is formed on the inner peripheral side of the ornamental frame 1320 in the circumferential direction, that is, the structure where the radius of the ornamental frame 1320 is not uniform over the entire length. Accordingly, milling, machining or the like becomes necessary in addition to press working and lathe machining. In this case, a working cost is increased. As a method of providing the structure where unevenness is formed on an inner peripheral surface of a product in a circumferential direction at a low cost, there has been known an injection molding method which uses a resin for forming the product. However, in this method, the outer peripheral surface is also made of a resin. Accordingly, there exists a drawback that the quality of external appearance is deteriorated. As a method for overcoming such a drawback, a method may be considered where the ornamental frame 1320 is formed of two parts such that the outer peripheral surface is formed using a metal material and the inner peripheral surface is formed using a resin material. In this case, however, the number of parts is increased so that a manufacturing cost is pushed up.

The present disclosure is made to cope with such a drawback. In the present disclosure, the lens barrel includes: the first frame (the first group unit 100); the second frame (the double-sided cam frame 1310) which is arranged on an inner peripheral side of the first frame (the first group unit 100) and engages with the first frame (the first group unit 100) by a cam mechanism; the third frame (the double-sided cam frame 1310) which is arranged on an inner peripheral side of the second frame (the double-sided cam frame 1310), engages with the first frame (the first group unit 100) by a rotation restricting mechanism, and is rotatable relative to the second frame (the double-sided cam frame 1310); and the fourth frame (the ornamental frame 1320) which is arranged on an outer peripheral side of the first frame (the first group unit 100), and integrally engages with the second frame (double-sided cam frame 1310) in the optical axis direction. The fourth frame (the ornamental frame 1320) is formed as a single part where the outer peripheral surface 1320o is formed of a surface to which an external appearance treatment is applied using secondary machining such as hairline machining or blast machining, and the inner peripheral surface 1320i is formed of a circular cylindrical surface having the approximately uniform diameter over the whole length and having no unevenness.

The engagement between the double-sided cam frame 1310 and the ornamental frame 1320 is described. In the present disclosure, the double-sided cam frame 1310 and the ornamental frame 1320 are integrally joined to each other both in the optical axis direction and in the rotational direction (in the circumferential direction) at approximately rear end portions thereof in the optical axis direction. The double-sided cam frame 1310 and the ornamental frame 1320 respectively have optical-axis-direction restricting portions 1310a, 1320a, rotational direction restricting portions 1310b, 1320b, and radial direction restricting portions 1310c, 1320c. By making these three kinds of restricting portions contact each other or engage with each other respectively, the relative positions between the double-sided cam frame 1310 and the ornamental frame 1320 are decided. In the present disclosure, the inner peripheral surface 1320i of the ornamental frame 1320 is constituted of a surface having no steps, and is continuously formed with the inner peripheral surface of the radial direction restricting portion 1320c while having the same diameter as the inner peripheral surface of the radial direction restricting portion 1320c. The double-sided cam frame 1310 and the ornamental frame 1320 further include optical-axis-direction fixing portions 1310d, 1320d, and rotational-direction fixing portions 1310e, 1320e respectively. By making two kinds of fixing portions engage with each other respectively, the double-sided cam frame 1310 and the ornamental frame 1320 are fixed to each other in the respective directions. The optical-axis-direction restricting portion 1320a, the rotational direction restricting portion 1320b, the radial direction restricting portion 1320c, the optical-axis-direction fixing portion 1320d, and the rotational direction fixing portion 1320e are arranged between the outer peripheral surface 1320o and the inner peripheral surface 1320i, that is, within a thickness range of the ornamental frame 1320. It may be possible to adopt the structure where the double-sided cam frame 1310 and the ornamental frame 1320 are integrally joined to each other in the optical axis direction and are rotatably engageable with each other in the rotational direction (circumferential direction). The ornamental frame 1320 includes neither the rotation restricting mechanism nor the cam mechanism and the like and hence, the ornamental frame 1320 may be either rotatable or non-rotatable relative to the double-sided cam frame 1310. In this case, the double-sided cam frame 1310 and the ornamental frame 1320 may be joined to each other by a known bayonet mechanism or the like.

The double-sided cam frame 1310 is formed in a circular cylindrical shape. The double-sided cam frame 1310 is arranged on the inner peripheral side of the penetration cam frame 1100. The double-sided cam frame 1310 includes cam grooves and cam followers. The cam grooves are formed on an inner peripheral surface and an outer peripheral surface of the double-sided cam frame 1310 respectively. The cam followers are arranged on a rear end portion of the outer peripheral surface of the double-sided cam frame 1310. The cam followers engage with penetration cam grooves 1106 of the penetration cam frame 1100 and rotation restricting grooves formed on an inner peripheral surface of the drive frame unit 1000. When the drive frame unit 1000 is rotated about the optical axis AX, the rotation of the double-sided cam frame 1310 relative to the drive frame unit 1000 is restricted. However, even when the drive frame unit 1000 is rotated about the optical axis AX, the double-sided cam frame 1310 advances or retracts in the optical axis direction relative to the penetration cam frame 1100 due to the cam mechanism constituted of the cam grooves and the cam followers of the penetration cam frame 1100.

Returning to FIG. 3, the rotation restricting frame 1200 is formed in a circular cylindrical shape. The rotation restricting frame 1200 is arranged on an inner peripheral side of the double-sided cam frame unit 1300. The rotation restricting frame 1200 has rotation restricting projections and rotation restricting slits 1220. The rotation restricting projections are arranged on a front end portion of an outer peripheral surface of the rotation restricting frame 1200. The rotation restricting slits 1220 penetrate a peripheral wall of the rotation restricting frame 1200 in the radial direction. The rotation restricting slits 1220 are arranged along the optical axis direction. The rotation restricting frame 1200 is held in the double-sided cam frame unit 1300 such that although the rotation of the rotation restricting frame 1200 about the optical axis AX relative to the double-sided cam frame unit 1300 is allowed, the movement of the rotation restricting frame 1200 in the optical axis direction relative to the double-sided cam frame unit 1300 is restricted.

The first group unit 100 holds the first lens group L1 for introducing light into the inside of the lens barrel 2000 (see FIG. 2B). The first group unit 100 is formed in a circular cylindrical shape. The first group unit 100 includes: rotation restricting grooves; and cam followers. The rotation restricting grooves of the first group unit 100 are formed on an inner peripheral surface of the first group unit 100 along the optical axis direction, and engage with the rotation restricting projections of the rotation restricting frame 1200. The cam followers of the first group unit 100 are arranged on a rear end portion of the inner peripheral surface. The cam followers of the first group unit 100 engage with the cam grooves formed on the outer periphery of the double-sided cam frame 1310. When the double-sided cam frame 1310 rotates about the optical axis AX, the first group unit 100 advances or retracts in the optical axis direction by the cam mechanism which is constituted of the cam grooves and the cam followers of the double-sided cam frame 1310. At this stage of the operation, the rotation of the first group unit 100 about the optical axis AX is restricted by the rotation restricting frame 1200.

The second group unit 200 holds the second lens group L2 used for zooming. The second group unit 200 is formed in a circular disc shape, and is arranged on an inner peripheral side of the rotation restricting frame 1200. The second group unit 200 has cam followers on an outer periphery thereof. The cam followers of the second group unit 200 are inserted into the rotation restricting slits 1220 of the rotation restricting frame 1200 and, at the same time, engage with the cam grooves formed on an inner periphery of the double-sided cam frame 1310. When the double-sided cam frame 1310 is rotated about the optical axis AX, the second group unit 200 advances or retracts in the optical axis direction by the cam mechanism which is constituted of the cam grooves and the cam followers of the double-sided cam frame 1310. At this stage of the operation, the rotation of the second group unit 200 about the optical axis AX is restricted by the rotation restricting frame 1200.

The third group unit 300 holds the third lens group L3 used for zooming and the correction of blurring of an image. The third group unit 300 is formed in an approximately circular cylindrical shape, and is arranged on an inner peripheral side of the rotation restricting frame 1200. The third group unit 300 has a flange portion on a rear end portion thereof. The third group unit 300 includes: cam followers 334; and rotation restricting projections. The cam followers 334 of the third group unit 300 are mounted on an outer peripheral surface of a front end portion of the third group unit 300 in an erected manner. The cam followers 334 are inserted into the rotation restricting slits 1220 of the rotation restricting frame 1200 and, at the same time, engage with the cam grooves formed on the inner periphery of the double-sided cam frame 1310. The rotation restricting projections of the third group unit 300 are formed in a projecting manner in the outer peripheral direction from the rear end flange portion, and engage with the rotation restricting grooves formed on the inner peripheral surface of the penetration cam frame 1100. When the double-sided cam frame 1310 is rotated about the optical axis AX, the third group unit 300 advances or retracts in the optical axis direction by being driven by the cam mechanism which is constituted of the cam grooves and the cam followers of the double-sided cam frame 1310, while the rotation of the third group unit 300 is restricted by the penetration cam frame 1100.

The fourth group unit 400 holds the fourth lens group L4 used for zooming and focusing. The fourth group unit 400 is supported in a movable manner in the optical axis direction with respect to the master flange unit 600, and is driven in the optical axis direction by the focus motor unit 610. The focus motor unit 610 is a drive source for extending the fourth group unit 400. The fourth group unit 400 includes: a main guide portion; a sub guide portion; a spring contact portion; and a nut contact portion. The main guide portion restricts a position of the fourth group unit 400 in a plane orthogonal to the optical axis and the inclination of the fourth group unit 400 with respect to the optical axis. The main guide portion engages with a fourth group guide shaft such that the fourth group unit 400 is movable in the optical axis direction. The sub guide portion restricts the position of the fourth group unit 400 in a plane orthogonal to the optical axis together with the main guide portion. A biasing spring which biases the fourth group unit 400 frontwardly in the optical axis direction is brought into contact with the spring contact portion. A nut is brought into contact with the nut contact portion. The focus motor unit 610 includes: the nut; and a screw. The screw moves the nut in the optical axis direction by rotation. The focus motor unit 610 includes a screw feeding mechanism. When the screw is rotated by the rotation of the motor, the screw feeding mechanism moves the nut in the optical axis direction. When the nut is moved in the optical axis direction by the screw feeding mechanism, the nut contact portion to which the nut is pushed by way of the biasing spring is moved in the optical axis direction. As a result, the fourth group unit 400 is moved in the optical axis direction.

Figure 22:
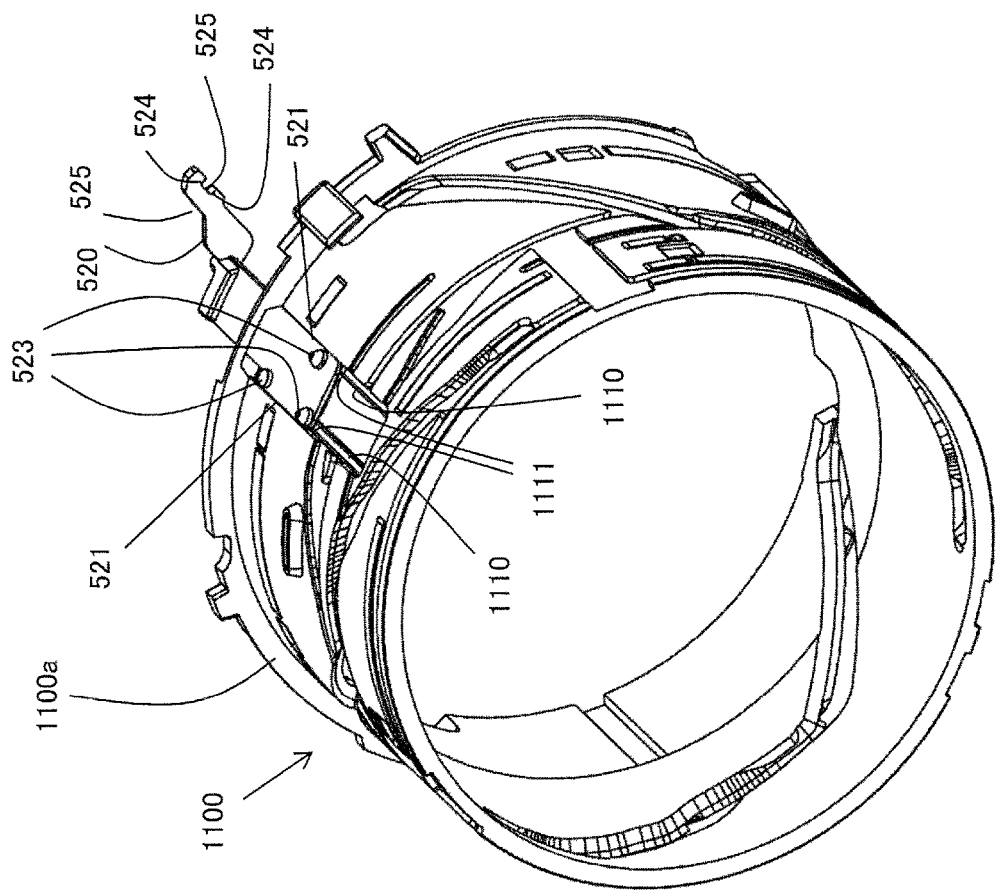
FIG. 22 is a view for describing the relationship between the penetration cam frame 1100 and a fifth group drive arm 520.
Figure 23:
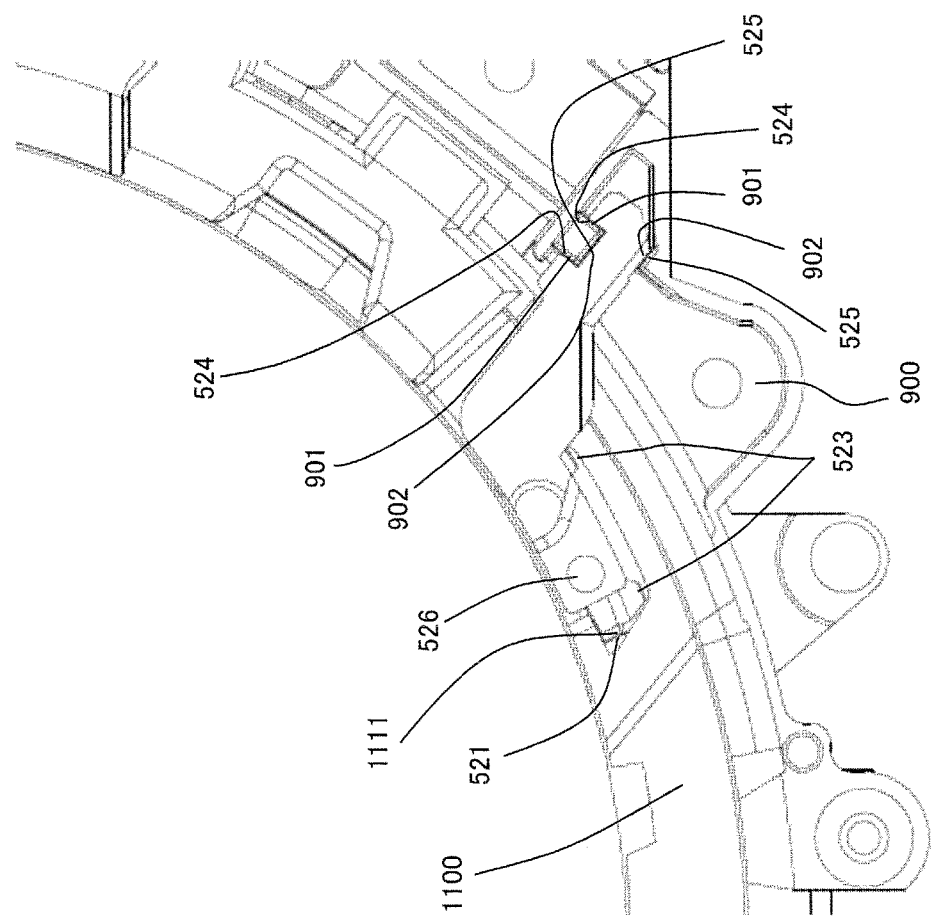
FIG. 23 is a view for describing the relationship between a fixed frame 900, the penetration cam frame 1100, and the fifth group drive arm 520.

The fifth group unit 500 holds the fifth lens group L5 used for zooming. The fifth group unit 500 is supported in a movable manner in the optical axis direction with respect to the master flange unit 600. The fifth group unit 500 is driven in the optical axis direction by a fifth group drive arm 520. As shown in FIG. 22, the fifth group drive arm 520 includes: cam followers 523; rotational direction restricting portions 525; and rotation restricting portions 521. The cam followers 523 engage with the driving cam grooves 1036 of the drive frame unit 1000. The rotational direction restricting portions 525 engage with restricting portions 902 of the fixed frame 900. The rotation restricting portions 521 engage with guide grooves 1111 of the penetration cam frame 1100. When the drive frame unit 1000 is rotated about the optical axis AX, the fifth group drive arm 520 advances or retracts in the optical axis direction by being driven by a cam mechanism constituted of the cam grooves and the cam followers 523 of the drive frame unit 1000. The rotation of the fifth group drive arm 520 is restricted by the fixed frame 900 and the penetration cam frame 1100.

The shutter unit 1400 is formed in a circular disc shape. The shutter unit 1400 is arranged on an inner peripheral side of the rotation restricting frame 1200. The shutter unit 1400 includes: an inner diameter opening portion; and cam followers formed on an outer peripheral surface thereof. The shutter unit 1400 also includes: a diaphragm mechanism; and a shutter mechanism. The diaphragm mechanism adjusts a size of a diameter of an opening by driving diaphragm blades. The shutter mechanism allows the transmission of light or shuts off light by opening or closing shutter blades. The diaphragm mechanism can perform a drive control of the diaphragm blades in response to an electric signal. The shutter mechanism can perform an open-close control of the shutter blades in response to an electric signal. In the optical system of the present disclosure, for miniaturizing the optical system, the shutter mechanism and the diaphragm mechanism are moved in the optical axis direction independently from the lens group at the time of zooming. The cam followers of the shutter unit 1400 are inserted into the rotation restricting slits 1220 of the rotation restricting frame 1200, and also engage with the cam grooves formed on an inner peripheral surface of the double-sided cam frame 1310. The restriction of the rotation of the shutter unit 1400 is performed by the rotation restricting slits 1220 of the rotation restricting frame 1200 which performs the restriction of the rotation of the third group unit 300. When the double-sided cam frame 1310 is rotated about the optical axis AX, the shutter unit 1400 advances or retracts in the optical axis direction by being driven by the cam mechanism constituted of the cam grooves and the cam followers of the double-sided cam frame 1310 while the rotation of the shutter unit 1400 is restricted by the rotation restricting frame 1200.

The imaging element unit 700 includes an imaging element. The imaging element converts light imaged on the imaging element by the first lens group L1 to the sixth lens group L6 into an electric signal.

The flexible printed circuit board 800 is a bendable printed circuit board having flexibility. The flexible printed circuit board 800 connects the zooming motor unit 910, the focus motor unit 610, and the shutter unit 1400 to an electric circuit on a main body side.

In the above-mentioned constitution, zooming and focusing can be performed by moving the first lens group L1 to the sixth lens group L6 in the optical axis direction by driving the zooming motor unit 910 and the focus motor unit 610. To be more specific, at the time of zooming, that is, at the time of changing a focal length, the zooming motor unit 910 and the focus motor unit 610 are driven. When the zooming motor unit 910 is driven at the time of zooming, due to the above-mentioned cam mechanism, the first group unit 100, the second group unit 200, the shutter unit 1400, the third group unit 300, and the fifth group unit 500 are moved in the optical axis direction. When the focus motor unit 610 is driven at the time of zooming, the fourth group unit 400 is driven by the above-mentioned screw feeding mechanism so that the fourth group unit 400 is moved in the optical axis direction. At the time of performing the adjustment of focusing, that is, at the time of adjusting the focal position, only the focus motor unit 610 is driven. When the focus motor unit 610 is driven at the time of performing the adjustment of focusing, the fourth group unit 400 is driven by the above-mentioned screw feeding mechanism so that the fourth group unit 400 is moved in the optical axis direction.

[3. Members Constituting Lens Barrel]

Members constituting the lens barrel are described in detail.

[3.1. Third Group Unit 300]

Figure 4:
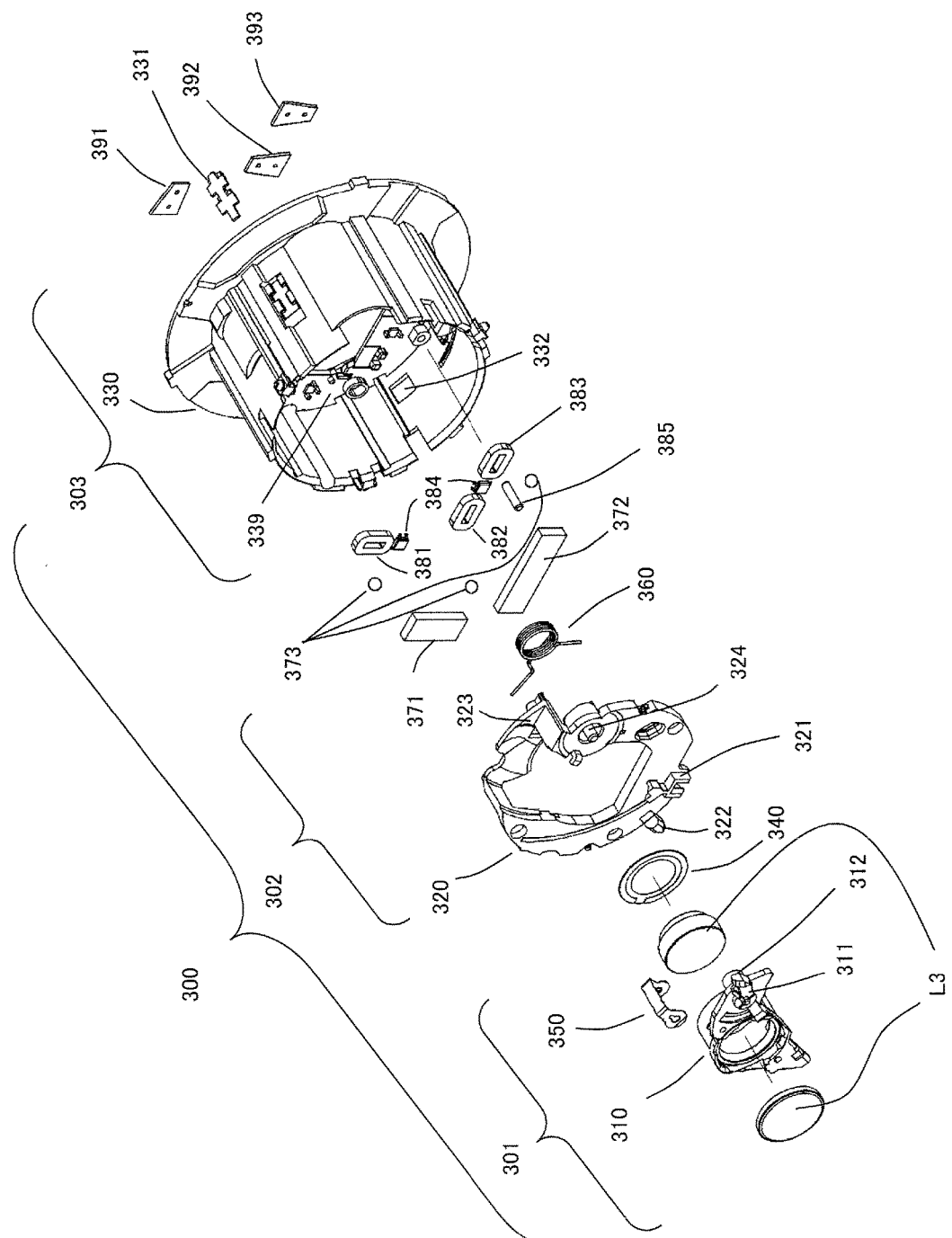
FIG. 4 is an exploded perspective view of a third group unit 300.

FIG. 4 is an exploded perspective view of the third group unit 300.

The third group unit 300 includes: a retracting lens frame unit 301; an OIS frame unit 302; and a third group frame unit 303.

[3.1.1. Retracting Lens Frame Unit 301]

The retracting lens frame unit 301 includes: a retracting lens frame 310; a retracting lever portion 311; the third lens group L3; and a third group light blocking sheet 340.

The third lens group L3 is constituted of three lenses. The third lens group L3 is inserted into the retracting lens frame 310 from front and rear sides of the retracting lens frame 310, and is fixed by adhesion to the retracting lens frame 310.

The third group light blocking sheet 340 is fixed to a rear surface of the retracting lens frame 310. The third group light blocking sheet 340 is made of a resin having light blocking property, and blocks undesired light beams on an outer peripheral side of the third lens group L3.

[3.1.2. OIS Frame Unit 302]

The OIS frame unit 302 includes: an OIS frame 320; a yaw magnet 371; and a pitch magnet 372.

The yaw magnet 371 and the pitch magnet 372 are fixed to a rear surface of the OIS frame 320 by an adhesive agent. The yaw magnet 371 and the pitch magnet 372 are magnetized to two poles respectively.

A retracting shaft 324 is integrally formed on the OIS frame 320. The retracting shaft 324 is inserted into a bearing portion 312 of the retracting lens frame 310.

A thrust spring 350 is mounted on the bearing portion 312 and the retracting shaft 324 in a state where the retracting shaft 324 is inserted into the bearing portion 312. With this configuration, the retracting lens frame unit 301 and the OIS frame unit 302 are biased in the direction that the retracting lens frame unit 301 and the OIS frame unit 302 are brought into close contact with each other in the optical axis direction.

By mounting a coil-shaped rotation spring 360 on the OIS frame unit 302 in such a state, the retracting lens frame unit 301 is biased in the direction that the retracting lens frame unit 301 is rotated about the bearing portion 312 with respect to the OIS frame unit 302.

At the time of performing usual photographing, the third lens group L3 of the retracting lens frame unit 301 is held at a position in the vicinity of the center position of the OIS frame unit 302 due to a biasing force of the rotation spring 360 and a biasing force of the thrust spring 350.

[3.1.3. Third Group Frame Unit 303]

The third group frame unit 303 includes: the third group frame 303; a yaw coil 381; a pitch coil 382; a pitch coil 383; a Hall element 384; a yoke 391; a yoke 392; a yoke 393; an OIS stopper 331; an OIS shaft 385; and three OIS balls 373.

As described above, the third group frame 330 engages with the penetration cam frame 1100, the rotation restricting frame 1200, and the double-sided cam frame 1310.

The yaw coil 381, the pitch coil 382, and the pitch coil 383 are coils for driving the OIS frame unit 302. These coils are arranged on an inner peripheral side of the third group frame 330, and are fixed to a front surface of a mounting surface portion 339 of the third group frame 330 orthogonal to the optical axis.

The Hall element 384 is a sensor for detecting the position of the OIS frame unit 302. The Hall element 384 is fixed to the front surface of the mounting surface portion 339.

The OIS shaft 385 is a shaft for controlling the movement of the OIS frame unit 302. The OIS shaft 385 has one end portion thereof fixed to the front surface of the mounting surface portion 339 such that the OIS shaft 385 is arranged parallel to the optical axis.

The yoke 391, the yoke 392, and the yoke 393 are fixed to a rear surface of the mounting surface portion 339 of the third group frame 330 at positions where the yoke 391, the yoke 392 and the yoke 393 face the yaw coil 381, the pitch coil 382, and the pitch coil 383 in an opposed manner respectively. The yoke 391, the yoke 392, and the yoke 393 are formed of a plated steel plate such that the yoke 391, the yoke 392, and the yoke 393 are biased in the attracting direction by magnetisms of the yaw magnet 371 and the pitch magnet 372 of the OIS frame unit 302.

The OIS stopper 331 suppresses the movement of the OIS frame unit 302 in the optical axis direction. That is, the OIS stopper 331 prevents the OIS frame unit 302 from being removed from the third group frame unit 303.

Three OIS balls 373 are sandwiched and held between the OIS frame unit 302 and the third group frame unit 303.

Due to the above-mentioned constitution, the OIS frame unit 302 is supported in a movable manner in a plane orthogonal to the optical axis with respect to the third group frame unit 303.

Further, a U-shaped groove portion 321 is formed on the OIS frame 320. The U-shaped groove portion 321 engages with the OIS shaft 385 by fitting engagement. With this configuration, the direction of movement of the OIS frame unit 302 is restricted. To be more specific, with respect to the third group frame unit 303, the OIS frame unit 302 can perform only the rotation about the OIS shaft 385 and the translational movement to the OIS shaft 385 in a plane orthogonal to the optical axis.

[3.1.4. Manner of Operation of OIS]

The manner of operation of the OIS is described in more detail with reference to FIG. 5A to FIG. 7B.

FIGS. 5A and 5B are constitutional views of the OIS actuator. FIG. 5A is a side view of the OIS actuator, and FIG. 5B is a front view of the OIS actuator. The OIS actuator is constituted of: the yaw magnet 371; the pitch magnet 372; the yaw coil 381; the pitch coil 382; the pitch coil 383; the yoke 391; the yoke 392; and the yoke 393 described above.

In FIGS. 5A and 5B, for the sake of brevity, the OIS actuator is shown in a state where the retracting lens frame 310, the OIS frame 320, the third group frame 330 and the like are omitted.

The yaw coil 381 and the Hall element 384 are arranged on a rear side of the yaw magnet 371 with a slight gap formed therebetween. The yoke 391 is arranged on a rear side of the yaw coil 381.

The pitch coil 382, the pitch coil 383, and the Hall element 384 are arranged on a rear side of the pitch magnet 372 with a slight gap formed therebetween. The yoke 392 is arranged on a rear side of the pitch coil 382. Further, the yoke 393 is arranged on a rear side of the pitch coil 383.

The third lens group L3, the yaw magnet 371 and the pitch magnet 372 are fixed to the OIS frame 320. Accordingly, at the time of performing usual photographing, when the third lens group L3 is moved, that is, when the OIS frame 320 is moved, the position of the yaw magnet 371 and the position of the pitch magnet 372 with respect to the Hall element 384 are changed. At this stage of the operation, a magnetic flux at the position where the Hall element 384 is disposed is changed so that an output of the Hall element 384 is changed. Accordingly, by detecting an output of the Hall element 384, the position of the third lens group 13 can be obtained.

When blurring of an image attributed to the camera shake or the like occurs at the time of performing photographing, by energizing the yaw coil 381, the pitch coil 382, and the pitch coil 383 so as to move the third lens group L3 in the direction that the blurring of the image is canceled, the blurring of the image can be canceled.

[3.1.5. Magnetic Attraction Force]

Figure 6A:
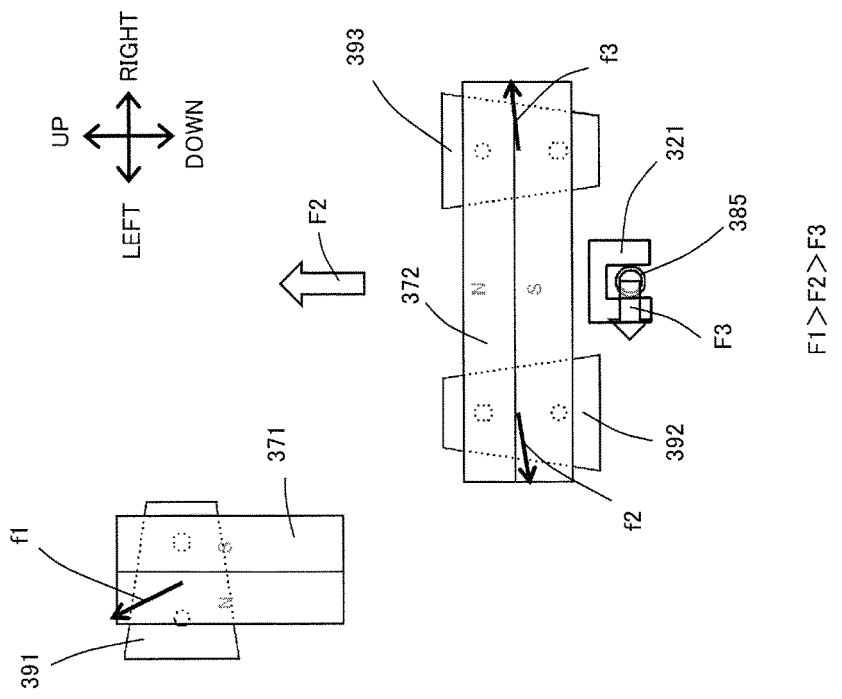
FIGS. 6A and 6B are explanatory views of a magnetic attraction force of the OIS actuator.
Figure 6B:
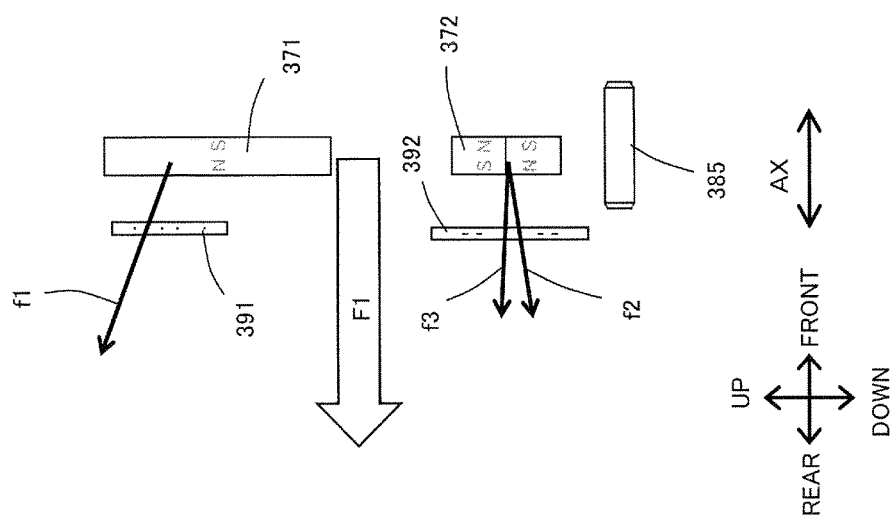

FIGS. 6A and 6B are explanatory views of the magnetic attraction of the OIS actuator. FIG. 6A is a side view, and FIG. 6B is a front view. In FIGS. 6A and 6B, for the sake of convenience, the third lens group L3, the yaw magnet 371, the pitch magnet 372, the yaw coil 381, the pitch coil 382, the pitch coil 383, the Hall element 384 and the like are omitted.

The yoke 391, the yoke 392 and the yoke 393 are identical parts having the same shape.

The yoke 391, the yoke 392, and the yoke 393 are formed by blanking a steel plate using a press. As such a steel plate, a plated steel plate made of a ferromagnetic material is used. Accordingly, a magnetic attraction force is acting between the yoke 391 and the yaw magnet 371.

The shape and arrangement of the yoke 391 according to this embodiment have the following features (1), (2), and (3).

(1) A length of the yoke 391 in the lateral direction is larger than a length of the yaw magnet 371 in the lateral direction (the polarization direction of the magnet). To be more specific, the length of the yoke 391 in the lateral direction is set such that end portions of the yaw magnet 371 in the lateral direction do not project outwardly from positions inside the end portions of the yoke 391 in the lateral direction by a predetermined amount even when the positional relationship between the yaw magnet 371 and the yoke 391 is relatively changed in the lateral direction. The "predetermined amount" means a length by which even when the positional relationship between the yaw magnet 371 and the yoke 391 is relatively changed in the lateral direction, the magnitude of a force acting in the lateral direction between the yoke 391 and the yaw magnet 371 fall within a range twice as large as the magnitude of a force acting between the yoke 391 and the yaw magnet 371 in the lateral direction when both the yoke 391 and the yaw magnet 371 are in a steady state, for example. By setting the predetermined amount as described above, when the yoke 391 and the yaw magnet 371 are moved relative to each other, it is possible to suppress a sharp change (a sharp increase) in power consumption of the OIS actuator.

(2) A length of the left end portion of the yoke 391 in the vertical direction is larger than a length of the right end portion of the yoke 391 in the vertical direction. With this configuration, the yoke 391 has a trapezoidal shape.

(3) The yoke 391 is fixed in a state where the yoke 391 is intentionally displaced with respect to the yaw magnet 371 in the leftward direction. To be more specific, the yoke 391 is fixed such that the center of the yoke 391 in the lateral direction is positioned on a left side of the center of the yaw magnet 371 in the lateral direction.

Effects acquired by the above-mentioned features (1), (2) and (3) are described.

Effects Acquired by the Feature (1)

In the case where the position of the yoke 391 and the position of the yaw magnet 371 are relatively displaced from each other in the lateral direction from initial positions of the yoke 391 and the yaw magnet 371, a force acting between the movable yoke 391 and the fixed yaw magnet 371 in the lateral direction can be weakened. The force acting between the yoke 391 and the yaw magnet 371 in the lateral direction when the end portions of the yaw magnet 371 in the N and S directions are positioned in the vicinity of the end portions of the yoke 391 becomes larger than a force acting between the yoke 391 and the yaw magnet 371 in the lateral direction when the end portions of the yaw magnet 371 in the N and S directions are disposed at initial positions. In this embodiment, the length of the yoke 391 in the lateral direction is set larger than the length of the yaw magnet 371 in the lateral direction and hence, as described above, even when the position of the yaw magnet 371 in the lateral direction is changed, it is possible to suppress a large change in the force acting in the lateral direction.

A force acting in the lateral direction impedes the movement of the OIS frame 320. That is, such a force impedes the operation of the OIS. Accordingly, it is desirable that the force is as weak as possible. On the other hand, it is desirable that an attraction force acting in the longitudinal direction is strong to some extent for stabilizing the posture of the retracting lens frame unit 301 and the posture of the OIS frame unit 302.

In this embodiment, the length of the yoke 391 in the lateral direction is set approximately 1.5 times as large as the length of the yaw magnet 371 in the lateral direction.

When the length of the yoke 391 in the lateral direction is set substantially equal to the length of the yaw magnet 371 in the lateral direction, the force acting in the lateral direction becomes maximum. The force acting in the lateral direction becomes weak when the length of the yoke 391 in the lateral direction is either larger or smaller than the length of the yaw magnet 371 in the lateral direction. On the other hand, the larger the length of the yaw magnet 371 in the lateral direction, the stronger the attraction force becomes in the longitudinal direction. Accordingly, to weaken the force acting in the lateral direction while ensuring the attraction force in the longitudinal direction, it is sufficient that the length of the yoke 391 in the lateral direction is set larger than the length of the yaw magnet 371 in the lateral direction.

Effects Acquired by the Features (2), (3)

To make a force act on the third lens group L3 in one direction when the third lens group L3 is held on the optical axis AX, the yoke 391 is formed in asymmetry in the lateral direction and is arranged in asymmetry with respect to the yaw magnet 371 in the lateral direction.

In FIG. 6, symbol f1 indicates an attraction force applied to the yaw magnet 371 by the yoke 391 (fixed to the third group frame 330), symbol f2 indicates an attraction force applied to the pitch magnet 372 by the yoke 392, and symbol f3 indicates an attraction force applied to the pitch magnet 372 by the yoke 393. The yaw magnet 371 and the pitch magnet 372 are fixed to the OIS frame unit 302. Accordingly, a resultant force of the attraction forces f1, f2 and f3 is applied to the OIS frame unit 302. Component forces obtained by dividing the resultant force of the attraction forces f1, f2 and f3 in the longitudinal direction, in the vertical direction and in the lateral direction are expressed by symbols F1, F2 and F3 in FIG. 6.

Symbol F1 is a force for pushing the OIS frame unit 302 in the rearward direction. It is preferable that the force F1 is strong to some extent for stabilizing postures of the retracting lens frame unit 301 and the OIS frame unit 302.

Symbol F2 is a force pulling up the OIS frame unit 302 in the upward direction. When the digital camera 3000 is held in a horizontal-position photographing state, the force F2 becomes a force for lifting up the retracting lens frame unit 301 and the OIS frame unit 302 against the gravity (a force which pulls up the OIS frame unit 302 in the upward direction (hereinafter referred to as "magnetic coercive force" or "magnetic coercive force F2" when appropriate)).

The force F3 is a force which pushes the U-shaped groove portion 321 to the OIS shaft 385 in the leftward direction. The U-shaped groove portion 321 and the OIS shaft 385 have dimensional errors attributed to irregularities in manufacture respectively. The OIS frame 320 on which the U-shaped groove portion 321 is made of a resin, while the OIS shaft 385 is made of metal and hence, a linear expansion coefficient of the OIS frame 320 and a linear expansion coefficient of the OIS shaft 385 differ from each other. Accordingly, it is necessary to set a width of the U-shaped groove portion 321 larger than a diameter of the OIS shaft 385 so as to form a gap therebetween even when both the U-shaped groove portion 321 and the OIS shaft 385 are thermally inflated in a state where the OIS shaft 385 is fitted in the U-shaped groove portion 321. On the other hand, when the gap is formed between the U-shaped groove portion 321 and the OIS shaft 385, rattling is liable to occur between the U-shaped groove portion 321 and the OIS shaft 385. According to this embodiment, the OIS frame unit 302 is biased in the leftward direction by the force F3 thus giving rise to a state where a side surface of the U-shaped groove portion 321 of the OIS frame 320 is pushed to the OIS shaft 385. Accordingly, even when such a gap is formed between the U-shaped groove portion 321 and the OIS shaft 385, it is possible to suppress the OIS frame unit 302 from being vibrated due to rattling, and it is also possible to suppress the deterioration of image blurring correction performance caused by the positional displacement of the third lens group L3.

As shown in FIG. 5B, holes 391a, 392a, 393a are formed at two positions in the yokes 391, 392, 393 respectively. These holes 391a, 392a, 393a, however, are holes for positioning the third group frame 330 and hence, a magnetic attraction force is minimally affected by these holes.

Next, effects acquired by the magnetic coercive force F2 is described in detail.

FIGS. 7A and 7B are explanatory views showing the power consumption of the OIS actuator. FIG. 7A shows the instantaneous power consumption, and FIG. 7B shows the average power consumption.

In FIGS. 7A and 7B, a ratio of the magnetic coercive force F2 with respect to a total mass of the OIS movable portions (the retracting lens frame unit 301, the OIS frame unit 302, the thrust spring 350, and the rotation spring 360) (magnetic coercive force/weight of movable portions) is taken on an axis of abscissas. When the magnetic coercive force/weight of movable portions is "1", this means that the total weight of the OIS movable portions and the magnetic coercive force F2 are equal.

As shown in FIG. 7A, along with the increase of the magnetic coercive force F2, the power consumption of the OIS actuator at the horizontal position is lowered. This is because along with the increase of the magnetic coercive force F2, the OIS movable portion is lifted higher due to the magnetic coercive force F2 and hence, the necessity of lifting the OIS movable portion against the gravity is decreased. On the other hand, in the vertical position photographing state, along with the increase of the magnetic coercive force F2, power consumption is increased. This is because it is necessary to generate a force for pulling down the OIS movable portion in the downward direction against the magnetic coercive force F2.

Usually, photographing is not performed either only in the horizontal position or only in the vertical position. That is, photographing is performed in both positions.

When the inventors investigated photographs displayed in a photograph contest for amateurs and photographs posted to photograph posting site on Internet, 110 pieces (78.0%) of photographs are photographs taken at a horizontal position out of 141 pieces of photographs with respect to the photographs displayed in the photograph contest for amateurs. 971 pieces (83.5%) of photographs are photographs taken at a horizontal position with respect to 1163 pieces of photographs with respect to the photographs posted to the photograph posting site. Based on the result of these investigations, it is estimated that a rate of photographs at the horizontal position is approximately 70 to 90% of all photographs although the rate may differ depending on the use and a user of a digital camera.

On the other hand, with respect to a moving image, a screen of a monitor (a television receiver set, a personal computer or the like) with which a user enjoys the moving image is horizontally elongated and hence, most moving images are taken at the horizontal position.

FIG. 7B shows an average power consumption when the rate of horizontal-position photographing is 70%, 80%, and 90%.

When the rate of horizontal position photographing is 70% and a rate of magnetic coercive force/movable part mass is 0.5 to 0.9, the average power consumption becomes 60% or less of the average power consumption when there is no magnetic coercive force. When the rate of horizontal position photographing is 90% or more, for example, the average power consumption takes a minimum value when the rate of magnetic coercive force/movable part mass is larger than 0.9, and becomes lower than the average power consumption when the rate of the horizontal position photographing is 70% or 80%.

As described above, by setting a magnetic coercive force and a movable part mass such that a rate of magnetic coercive force/movable part mass becomes larger than 0.2, the average power consumption can be lowered so as to prolong a lifetime of a battery. It is more preferable to set a magnetic coercive force and movable part mass such that a rate of magnetic coercive force/movable part mass becomes 0.5 to 1.0. By setting the magnetic coercive force and movable part mass in this manner, the average power consumption can be lowered and hence, a lifetime of a battery can be prolonged.

(Effects and the Like)

Hereinafter, the technical features, the effects and the like of the above-mentioned constitution are described. Hereinafter, constitutional elements in claims and constitutional elements in the embodiment are described in the form of "constitutional elements in claims (constitutional elements in embodiment)". However, this form of expression is provided for facilitating the understanding of the correspondence between the constitutional elements in claims and the constitutional elements in the embodiment, and does not intend to limit the constitutional elements in claims to the constitutional elements described in the embodiment.

The lens barrel of the present disclosure includes the lens frame (OIS frame 320) which holds the lens (the third group lens L3), and the holding frame (the third group frame 330)

which holds the lens frame (OIS frame 320) in a state where the lens frame (OIS frame 320) is movable in a plane orthogonal to the optical axis. A biasing means which generates a force in the direction that the lens frame (OIS frame 320) is lifted up against the gravity is provided to at least the holding frame (third group frame 330) out of the holding frame (third group frame 330) and the lens frame (OIS frame 320).

With this configuration, the lens frame (OIS frame 320) is lifted up against the gravity by the biasing means and hence, a force for lifting up the lens frame (OIS frame 320) against the gravity can be reduced at the time of operating the OIS frame. Accordingly, the power consumption of the lens barrel can be reduced.

In the present disclosure, the biasing means includes: the magnets (the yaw magnet 371, the pitch magnet 372) mounted on the lens frame (the OIS frame 320), and the yokes (the yoke 391, the yoke 392, the yoke 393) which are mounted on the holding frame (the third group frame 330) at positions where the yokes face the magnets (the yaw magnet 371, the pitch magnet 372) in an opposed manner in the optical axis direction respectively. The yokes (the yoke 391, the yoke 392, the yoke 393) are arranged on the holding frame (third group frame 330) and the shapes of the yokes (yoke 391, yoke 392, yoke 393) are set such that, in a state where the lens (the third group lens L3) is positioned at the center of the optical axis, the yokes (the yoke 391, the yoke 392, the yoke 393) are magnetically attracted in the predetermined directions in a plane orthogonal to the optical axis by the magnets (the yaw magnet 371, the pitch magnet 372).

With this constitution, the biasing means can be formed using the magnets, the yokes and the like.

In the present disclosure, the yokes (the yoke 391, the yoke 392, the yoke 393) are arranged on the holding frame (the third group frame 330) and the shapes of the yokes (the yoke 391, the yoke 392, the yoke 393) are set such that the optical axis of the lens (the third group lens L3) is positioned below the optical axis of the lens barrel by a predetermined amount.

With this constitution, the power consumption of the lens barrel can be reduced when vertical-position photographing is included in all photographing by a predetermined rate.

In the present disclosure, a value obtained by dividing the force F2 of the biasing means in the lifting-up direction by the weight of the lens frame (the OIS frame 320) and the members (the OIS movable portion (the retracting lens frame unit 301, the OIS frame unit 302, the thrust spring 350, the rotation spring 360)) mounted on the lens frame (the OIS frame 320) is set larger than 0.5.

By setting the force F2 in this manner, the power consumption of the lens barrel can be substantially halved.

In the present disclosure, the yokes (the yoke 391, the yoke 392, the yoke 393) are formed into a trapezoidal shape, and are arranged such that the direction orthogonal to the bottom side of the trapezoidal shape and the NS direction of the magnet (the yaw magnet 371, the pitch magnet 372) agree with each other.

With this constitution, it is possible to generate a force directed in the horizontal direction (the lateral direction) of the imaging device.

(Another Example of OIS Actuator)

In the above-mentioned example, the forces F1, F2, F3 in the respective directions are realized by a magnetic force generated between the pitch magnet 372 and the yoke 392, a magnetic force generated between the pitch magnet 372 and the yoke 393, and a magnetic force generated between the yaw magnet 371 and the yoke 391. However, these forces can be also realized by making use of an elastic force of a mechanical spring by arranging the mechanical spring or the like between the OIS frame 320 and the third group frame 330. Hereinafter, an example where the mechanical spring is used is described with reference to FIGS. 30A and 30B. In this example, the description of parts identical with the parts described above is omitted when appropriate.

FIGS. 30A and 30B are constitutional views showing another example of the OIS actuator. FIG. 30A is a side view, and FIG. 30B is a front view. The OIS actuator is constituted of: a yaw magnet 371; a pitch magnet 372; a yaw coil 381; a pitch coil 382; a pitch coil 383; a spring 387; and a spring 388. That is, in this example, the spring 387 and the spring 388 are provided in place of the yoke 391, the yoke 392, and the yoke 393 of the example described above.

The spring 387 is arranged on a left side of a third lens group L3 and below the yaw magnet 371 and the yaw coil 381. The spring 387 is a helical spring. An annular-shaped movable-side spring hook portion 387a is formed on a front end side of the spring 387. The movable-side spring hook portion 387a engages with a spring engaging portion formed on an OIS frame 320. An annular-shaped fixed-side spring hook portion 387b is formed on a rear end side of the spring 387. The fixed-side spring hook portion 387b engages with a spring engaging portion formed on a third group frame 330. Although not particularly shown in the drawing, the spring engaging portions of the OIS frame 320 and the third group frame 330 may have any constitution provided that the movable-side spring hook portion 387a and the fixed-side spring hook portion 387b are engageable with the spring engaging portions respectively.

The spring 388 is arranged on a right side of the third lens group L3. The spring 388 is a helical spring. An annular-shaped movable-side spring hook portion 388a is formed on a front end side of the spring 388. The movable-side spring hook portion 388a engages with a spring engaging portion formed on the OIS frame 320. An annular-shaped fixed-side spring hook portion 388b is formed on a rear end side of the spring 388. The fixed-side spring hook portion 388b engages with a spring engaging portion formed on the third group frame 330. Although not particularly shown in the drawing, the spring engaging portions of the OIS frame 320 and the third group frame 330 may have any structure provided that the movable-side spring hook portion 388a and the fixed-side spring hook portion 388b are engageable with the spring engaging portions respectively.

The spring 387 and the spring 388 are arranged in an inclined manner such that a rear end side is positioned above a front end side. Accordingly, the spring engaging portions of the third group frame 330 are arranged above (at positions higher than) the spring engaging portions of the OIS frame 320 in the vertical direction of the camera barrel.

The spring 388 is arranged above the spring 387 in the vertical direction of the camera barrel. Accordingly, in the vertical direction of the camera barrel, the spring engaging portions for the spring 388 on the third group frame 330 and the OIS frame 320 are arranged above (at the positions higher than) the spring engaging portions for the spring 387 on the third group frame 330 and the OIS frame 320.

By arranging the spring 387 and the spring 388 as described above, forces f1a, f1b directed toward an oblique rear and upper side can be applied to the third group frame 330 using the spring 387 and the spring 388. Component forces obtained by dividing a resultant force of the force f1a and the force f1b as a force in the longitudinal direction and a force in the vertical direction are expressed by symbols F1, F2 in FIGS. 30A and 30B respectively.

The force F1 is a force which pushes the OIS frame unit 302 in the rearward direction in the same manner as the force F1 in the above-mentioned example.

The force F2 is a force which lifts up the OIS frame unit 302 in the upward direction in the same manner as the force F2 in the above-mentioned example. This force corresponds to the magnetic coercive force in the above-mentioned example.

Accordingly, also in this example, the effects substantially equal to the effects attributed to the forces F1, F2 described in the above-mentioned example can be acquired.

[3.1.6. Method of Assembling Retracting Lens Frame Unit 301 and OIS Frame Unit 302 into Third Group Frame Unit 303]

FIGS. 8A and 8B are views showing a method of assembling the retracting lens frame unit 301 and the OIS frame unit 302 into the third group frame unit 303. FIG. 8A is a view showing a state taken in the course of the assembling operation, and FIG. 8B is a view showing a state after the assembling operation.

The OIS frame 320 includes a leaning projecting portion 322 which projects toward an outer peripheral side (see FIG. 4). The third group frame 330 has a penetration window portion 332 which penetrates the peripheral wall of the third group frame 330 in the radial direction (see FIG. 4).

As shown in FIG. 8A, at the time of assembling, the retracting lens frame unit 301 and the OIS frame unit 302 are assembled into the three group frame unit 303 in a state where the retracting lens frame unit 301 and the OIS frame unit 302 are inclined with respect to the optical axis direction. At this stage of operation, the leaning projecting portion 322 is inserted into the penetration window portion 332.

As shown in FIG. 8B, after assembling, the leaning projecting portion 322 penetrates the penetration window portion 332, and a portion of the leaning projecting portion 322 projects to a more outer peripheral side than the outer peripheral surface of the peripheral wall of the third group frame unit 303. Further, the OIS stopper 331 is fixed to a portion of the third group frame 330 on a side substantially opposite to the penetration window portion 332 in the radial direction (a position spaced apart by approximately 180 degrees in the circumferential direction) with the center of the third group frame 330 sandwiched therebetween such that a predetermined gap is formed between the OIS stopper 331 and an OIS stopper contact surface 323 (see FIG. 4) of the OIS frame 320 in the optical axis direction. With this constitution, there is no possibility that the OIS frame 320 is removed from the third group frame 330 in the optical axis direction.

[3.1.7. Relationship between Third Group Unit 300 and Rotation Restricting Frame 1200]

Hereinafter, the relationship between the third group unit 300 and the rotation restricting frame 1200 is described with reference to FIG. 9 and FIGS. 10A and 10B.

FIG. 9 is a perspective view showing the relationship between the third group unit 300 and the rotation restricting frame 1200.

FIGS. 10A and 10B are a side view and a cross-sectional view showing a state where the third group unit 300 and the rotation restricting frame 1200 are assembled to each other. FIG. 10A is a side view, and FIG. 10B is a cross-sectional view of the third group frame 330 and the rotation restricting frame 1200 taken at a position corresponding to the cam followers 334.

The third group frame 330 of the third group unit 300 has the cam followers 334, supporting ribs 335, and reinforcing ribs 336. The third group frame 330 has the flange portion on the rear end portion thereof, and is formed into an approximately circular cylindrical shape. The cam followers 334 are mounted on the outer peripheral surface of the front end portion of the third group frame 330 in an erected manner. The supporting ribs 335 and the reinforcing ribs 336 are formed on the peripheral wall of the third group frame 330 in a projecting manner in the outer peripheral direction.

The rotation restricting frame 1200 has the rotation restricting slits 1220, supporting grooves 1230, and reinforcing grooves 1240. The rotation restricting frame 1200 is formed in an approximately circular cylindrical shape. The rotation restricting frame 1200 is arranged on the outer peripheral side of the third group frame 330. The rotation restricting slits 1220 penetrate the peripheral wall of the rotation restricting frame 1200 in the radial direction. The rotation restricting slits 1220 are formed along the optical axis direction, and rear end portions of the rotation restricting slits 1220 are opened. The supporting grooves 1230 and the reinforcing grooves 1240 are formed on the inner peripheral surface of the rotation restricting frame 1200 along the optical axis direction.

As shown in FIG. 10B, the cam followers 334 engage with the rotation restricting slits 1220 by fitting engagement. The supporting ribs 335 engage with the supporting grooves 1230 by fitting engagement. The reinforcing ribs 336 engage with the reinforcing grooves 1240 by fitting engagement. With respect to the third group frame 330 and the rotation restricting frame 1200, in the circumferential direction, only circumferential portions of the respective frames 330, 1200 which are disposed within ranges T1 to T6 are brought into contact with each other and are slidable relative to each other in such a state. A gap of an approximately 0.05 to 0.1 mm is formed between the third group frame 330 and the rotation restricting frame 1200 such that the third group frame 330 and the rotation restricting frame 1200 are not brought into contact with each other at positions other than the portions disposed in the ranges T1 to T6. To be more specific, the cam followers 334 and the rotation restricting slits 1220 are brought into contact with each other, and the supporting ribs 335 and the supporting grooves 1230 are brought into contact with each other. On the other hand, a gap is formed between the reinforcing ribs 336 and the reinforcing grooves 1240 respectively.

The rear end portions of the rotation restricting slits 1220 are opened. Accordingly, the rotation restricting frame 1200 in a single form is easily deformed due to opening of rear end portions of the rotation restricting slits 1220 in the circumferential direction, the deflection of the rotation restricting slits 1220 in the radial direction or the like. In this embodiment, the structure is adopted where peripheral portions of the rotation restricting slits 1220 are sandwiched between the cam followers 334 and the supporting ribs 335 of the third group frame 330 in the circumferential direction as well as in the radial direction and hence, such a deformation can be prevented. Accordingly, even when the rear end portions of the rotation restricting slits 1220 are opened, a drawback attributed to opening of the rear end portions of the rotation restricting slits 1220 minimally occurs. Further, the cam followers 334 can be inserted into the rotation restricting slits 1220 from an opening end side of the rotation restricting slits 1220 and hence, the degree of freedom in assembling can be increased. Further, the cam followers 334 are slidable to positions in the vicinity of the opening ends of the rotation restricting slits 1220 and hence, the relative stroke between the third group frame 330 and the rotation restricting frame 1200 in the optical axis direction can be extended whereby the length of the barrel in a collapsed state (hereinafter referred to as "collapsed length" when appropriate) can be shortened.

[3.1.8. Retracting Operation of OIS Lens]

Hereinafter, a retracting operation of the OIS lens is described with reference to FIG. 9 to FIG. 12C.

Figure 11B:
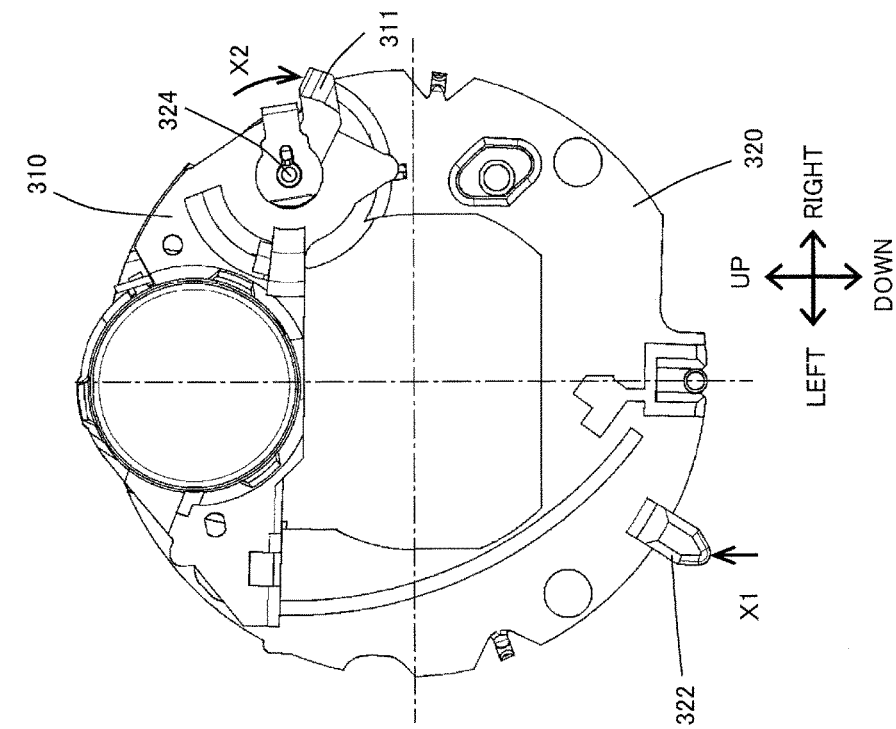
FIGS. 11A and 11B are views showing a retracting operation of a retracting lens frame 310.
Figure 11A:
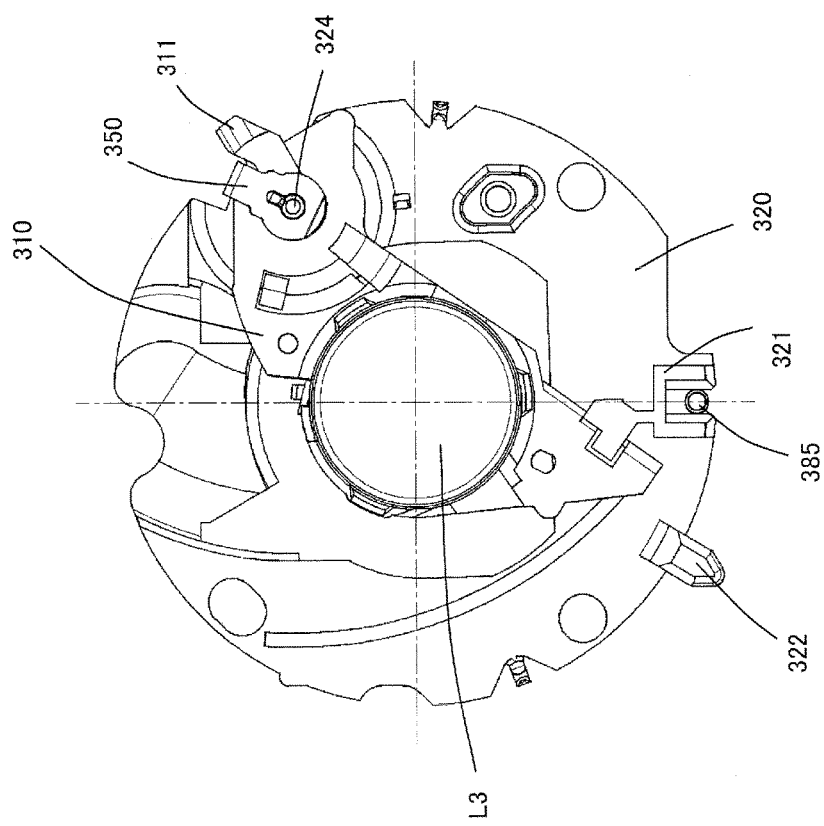

FIGS. 11A and 11B are views showing a retracting operation of the retracting lens frame unit 301. FIG. 11A shows a photographing state, and FIG. 11B shows a collapsed state.

FIGS. 12A to 12C are views showing the relationship between the third group unit 300 and the rotation restricting frame 1200. FIG. 12A is a front view, FIG. 12B is a cross-sectional view taken along a line A-A in FIG. 12A, and FIG. 12C is a partially enlarged view of FIG. 12B.

As shown in FIG. 9, the rotation restricting frame 1200 has a retracting rib 1210 and a retracting cam groove 1250. The retracting rib 1210 is formed in a rearwardly extending manner from a front side in the optical axis direction more on an inner peripheral side than the inner peripheral surface of the rotation restricting frame 1200. A retracting cam surface 1211 which is obliquely cut is formed on a rear end portion of the retracting rib 1210. The retracting cam groove 1250 is formed on the inner peripheral surface of the rotation restricting frame 1200, and is formed such that a width and a depth of the retracting cam groove 1250 are gradually increased toward a rear side. Further, as shown in FIG. 12B, a wall portion 333 which projects toward an outer peripheral side is formed on the third group frame 330 at a position corresponding to the retracting rib 1210 of the rotation restricting frame 1200.

A size and a shape of the retracting rib 1210 are set such that the retracting cam surface 1211 (see FIG. 12B) is brought into contact with the retracting lever portion 311 of the retracting lens frame 310 as shown in FIG. 11B in a collapsed state, and is not brought into contact with the retracting lever portion 311 in a photographing state. A size of the retracting cam groove 1250 is set such that the retracting cam groove 1250 is brought into contact with the leaning projecting portion 322 of the OIS frame 320 in a collapsed state but is not brought into contact with the leaning projecting portion 322 in a photographing state.

In a collapsed state shown in FIG. 11B, the whole OIS frame 320 is moved toward a right upper side when the leaning projecting portion 322 is pushed in the X1 direction by the retracting cam groove 1250 of the rotation restricting frame 1200 (see FIG. 9). Simultaneously, the retracting lens frame 310 is moved toward an upper side while rotating about the retracting shaft 324 when the retracting lever portion 311 is pushed in the X2 direction by the retracting cam surface 1211 of the rotation restricting frame 1200. As a result, as shown in FIG. 12A, in a collapsed state, a space portion P is formed in a center portion of the third group unit 300. In this embodiment, in a collapsed state, the fourth group unit 400 and a portion of the fifth group unit 500 are configured to be inserted into the space portion P. With this constitution, the length of the barrel in a collapsed state can be shortened.

Although the third group frame 330 is arranged on the inner peripheral side of the rotation restricting frame 1200 as described above, as shown in FIG. 12B, the wall portion 333 projects toward the outer peripheral side and hence, the retracting rib 1210 of the rotation restricting frame 1200 is arranged more on an inner peripheral side than the wall portion 333.

When the retracting ribs are arranged on the outer peripheral side of the third group frame 330 contrary to the above-mentioned constitution, for example, it is necessary to form a hole in the peripheral wall of the third group frame 330 for enabling the contacting of the retracting lever portion 311 with the retracting rib. However, when such a hole is formed in the peripheral wall of the third group frame 33, there arises a possibility that undesired light enters the inside of the barrel from the outer peripheral side of the third group frame 330 and adversely influences an image. In this embodiment, by arranging the retracting rib 1210 more on an inner peripheral side than the wall portion 330 of the third group frame 330 as described above, it is unnecessary to form the above-mentioned hole in the peripheral wall of the third group frame 330. Accordingly, it is possible to prevent such a phenomenon that undesired light enters the inside of the barrel from the outer peripheral side of the third group frame 330 and adversely influences an image.

As shown in FIGS. 12B and 12C, a gap W is formed between the OIS frame 320 and the third group frame 330. In the OIS frame 320 and the third group frame 330, surfaces 324a, 330a which face each other in an opposed manner and may be brought into contact with each other are referred to as "contact surfaces". At the time of photographing where the lens barrel is extended, there is no possibility that the contact surfaces 324a, 330a are brought into contact with each other. On the other hand, in a collapsed state of the lens barrel, a load is applied to the retracting lever portion 311 of the retracting lens frame 310 by the retracting cam surface 1211 of the rotation restricting frame 1200 so that the contact surfaces 324a, 330a are brought into contact with each other. By providing the contact surfaces 324a, 330a in this manner, a stress which is applied to ball supporting portions of the OIS balls 373 at the time of performing a retracting operation can be dispersed. With this constitution, it is possible to prevent the subsequent formation of the dents on the ball supporting portions and the deterioration of OIS performance attributed to the subsequent formation of the dents. When the retracting lever portion 311 is pushed, the OIS frame 320 is inclined with respect to the optical axis. However, since the contact surfaces 324a, 330a are brought into contact with each other, the OIS frame 320 is not inclined any more. Accordingly, the retracting operation can be performed in a stable manner.

[3.2. Drive Frame Unit]

Figure 13A:
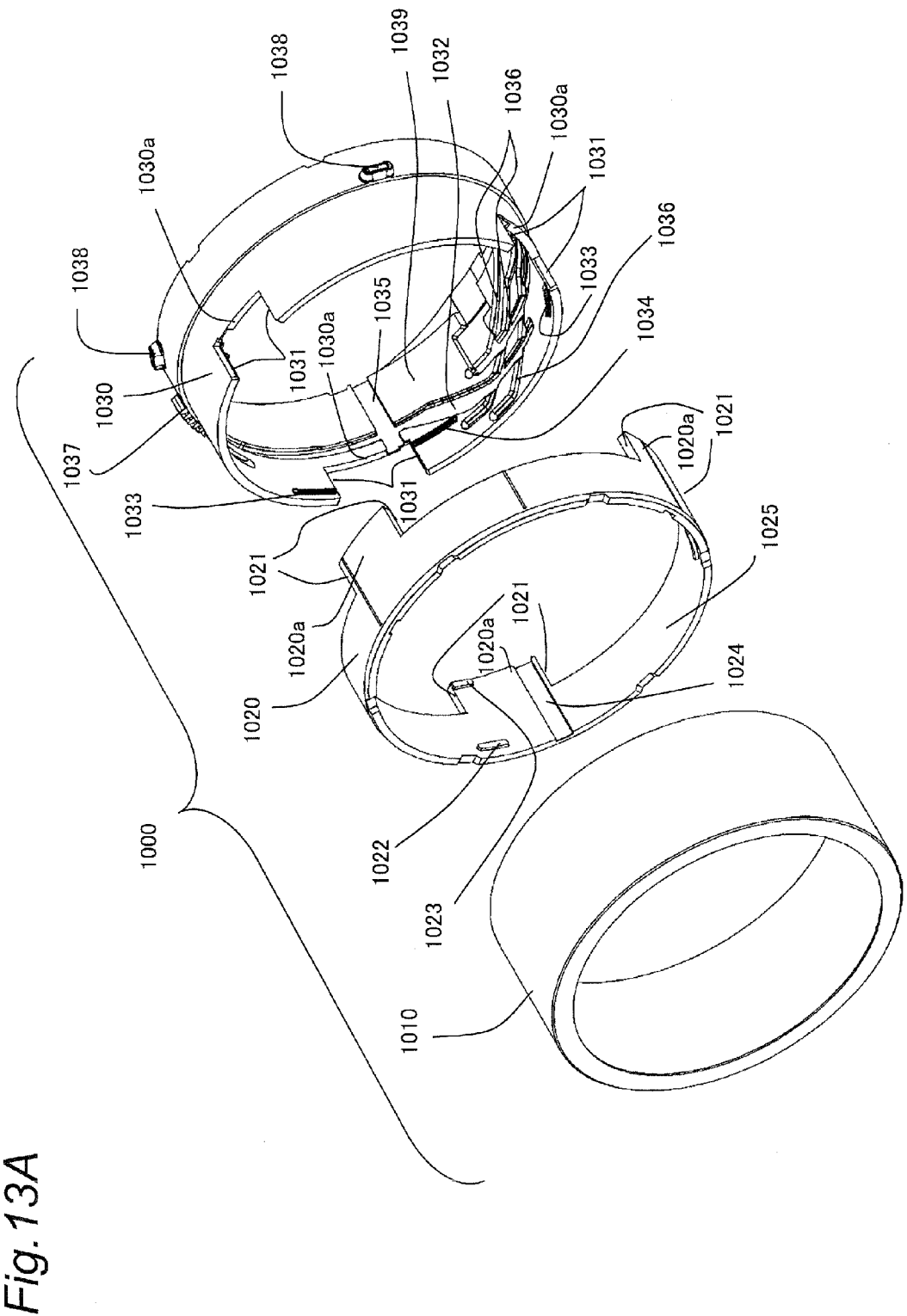
FIG. 13A is an exploded perspective view of a drive frame unit 1000.
Figure 13B:
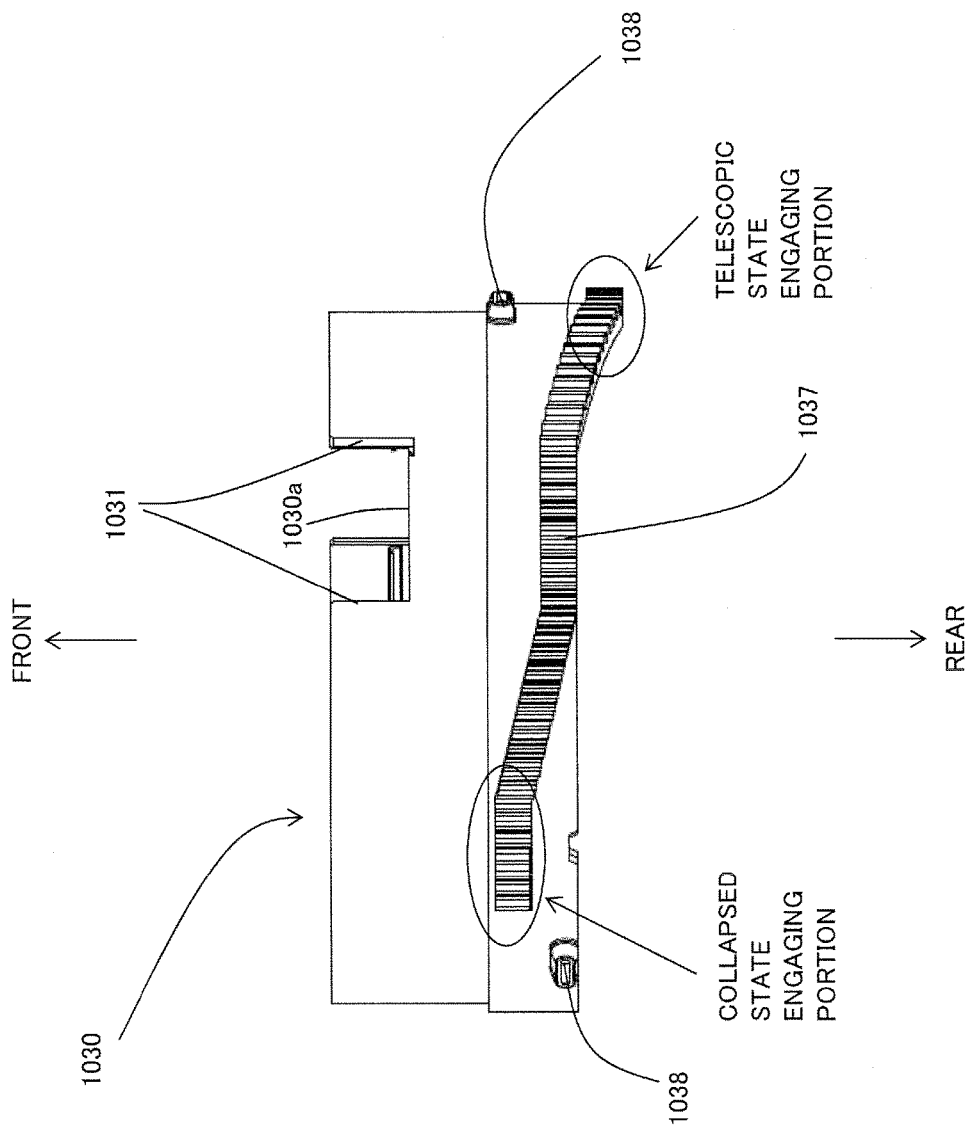
FIG. 13B is a view showing a second drive frame 1030.

FIG. 13A is an exploded perspective view of the drive frame unit 1000. FIG. 13B is a view of a second drive frame 1030 as viewed from an outer peripheral side.

As shown in FIG. 13A, the drive frame unit 1000 includes: the ornamental ring 1010; a first drive frame 1020; and a second drive frame 1030. The ornamental ring 1010 is a part providing an external appearance to the barrel, and is formed in a circular cylindrical shape. The ornamental ring 1010 is a press-formed product made of aluminum. To be more specific, cutting is applied to a surface of the ornamental ring 1010 and, thereafter, alumite treatment and coloring are applied to the surface of the ornamental ring 1010.

The first drive frame 1020 is formed in a circular cylindrical shape. Three bayonet ribs 1022 and three bayonet ribs 1023 are formed on the inner peripheral surface of the first drive frame 1020 at pitches of approximately 120° in the circumferential direction. Further, a radial direction restricting portion 1025 is formed on the inner peripheral surface of the first drive frame 1020. Three rotation restricting grooves 1024 are formed on the inner peripheral surface of the first drive frame 1020 along the optical axis direction at pitches of approximately 120° in the circumferential direction. Three projections 1020a are formed on a rear end portion of the first drive frame 1020 at pitches of approximately 120° in the circumferential direction. The projections 1020a extend rearwardly in the optical axis direction.

The ornamental ring 1010 and the first drive frame 1020 are integrally joined to each other by using an adhesive agent or the like.

The second drive frame 1030 is formed in a circular cylindrical shape. The lifting cam groove 1032, the lifting cam followers 1033, the lifting cam followers 1034, a radial direction restricting portion 1039, and the rotation restricting groove 1035 are formed on an inner peripheral surface of the second drive frame 1030. The rotation restricting groove 1035 is formed along the optical axis direction. Three notched-shaped recessed portions 1030a are formed on a front end portion of the second drive frame 1030. The cam followers 1038 and the driven gear portion 1037 are formed on an outer peripheral surface of the second drive frame 1030.

Rotation restricting portions 1021 are formed on side portions of the projections 1020a of the first drive frame 1020 in the circumferential direction, and rotation restricting portions 1031 are formed on side portions of the recessed portions 1030a of the second drive frame 1030 in the circumferential direction. The rotation restricting portions 1021 and the rotation restricting portions 1031 are respectively brought into contact with each other in a state where the rotation restricting portions 1021 and the rotation restricting portions 1031 are assembled to each other. With this constitution, the relative rotation between the first drive frame 1020 and the second drive frame 1030 about the optical axis AX is restricted. However, the first drive frame 1020 and the second drive frame 1030 are movable relative to each other in the optical axis direction.

Three driving cam grooves 1036 are formed on the inner peripheral surface of the second drive frame 1030. Three driving cam grooves 1036 are arranged close to each other. The driving cam grooves 1036 engage with the cam followers 523 of the fifth group drive arm 520 for driving the fifth group lens frame 510 (see FIG. 22).

The driving cam grooves 1036 and the lifting cam groove 1032 have the substantially same depth (in the radial direction). The driving cam grooves 1036 and the lifting cam groove 1032 are arranged in a partially intersecting manner. A circumferential length of the lifting cam follower 1101 (see FIG. 3 and FIG. 4) of the penetration cam frame 1100 which engages with the lifting cam groove 1032 is set larger than a groove width of the driving cam groove 1036. Accordingly, even when the lifting cam follower 1101 is located at the position where the driving cam groove 1036 and the lifting cam groove 1032 intersect with each other, the lifting cam follower 1101 is smoothly movable along the lifting cam groove 1032 without being removed or caught by the driving cam grooves 1036.

Figure 24:
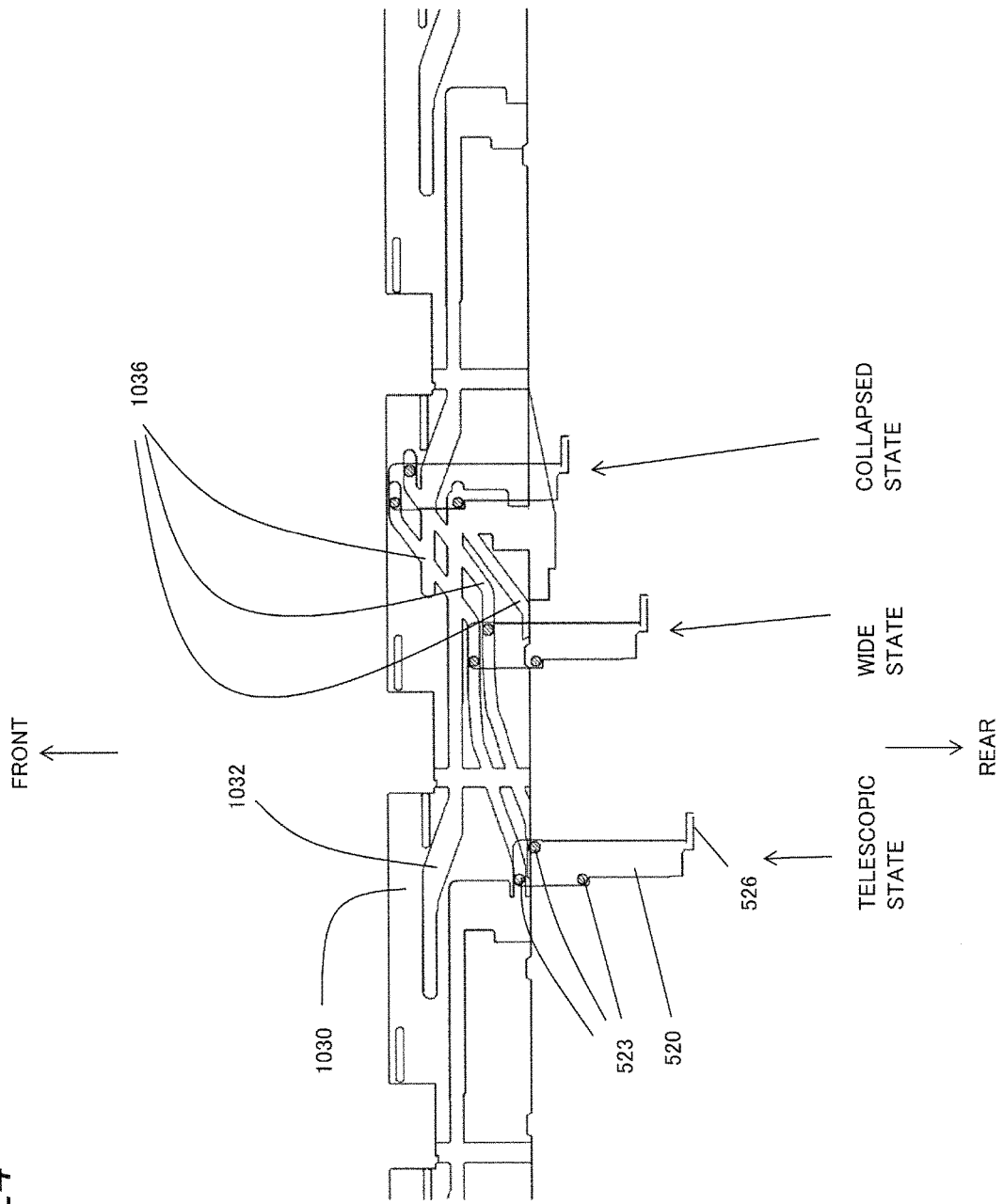
FIG. 24 is a view for describing the relationship between a second drive frame 1030 and the fifth group drive arm 520.

As shown in FIG. 24, the cam followers 523 are engageable with the driving cam grooves 1036. Three cam followers 523 are arranged close to each other. Accordingly, even when one cam follower 523 out of three cam followers 523 is moved to the intersection between the driving cam groove 1036 and the lifting cam groove 1032, at least one cam follower 523 out of remaining two cam followers 523 engages with the driving cam groove 1036. Accordingly, the fifth group drive arm 520 is smoothly movable along the driving cam groove 1036 without being removed from the second drive frame 1030 or without being caught by the lifting cam groove 1032.

Figure 26:
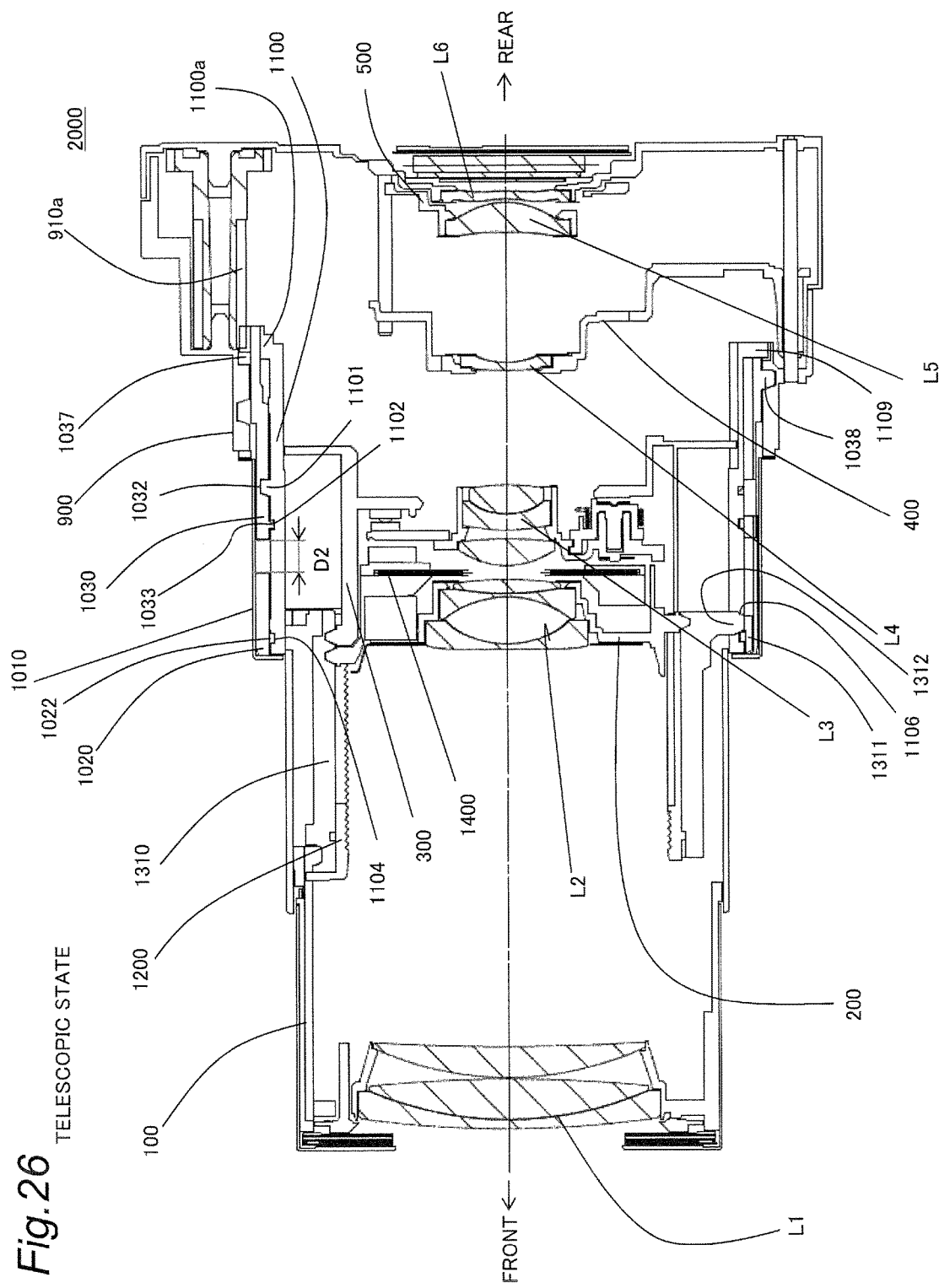
FIG. 26 is a cross-sectional view of the lens barrel 2000 in a telescopic state.
Figure 27:
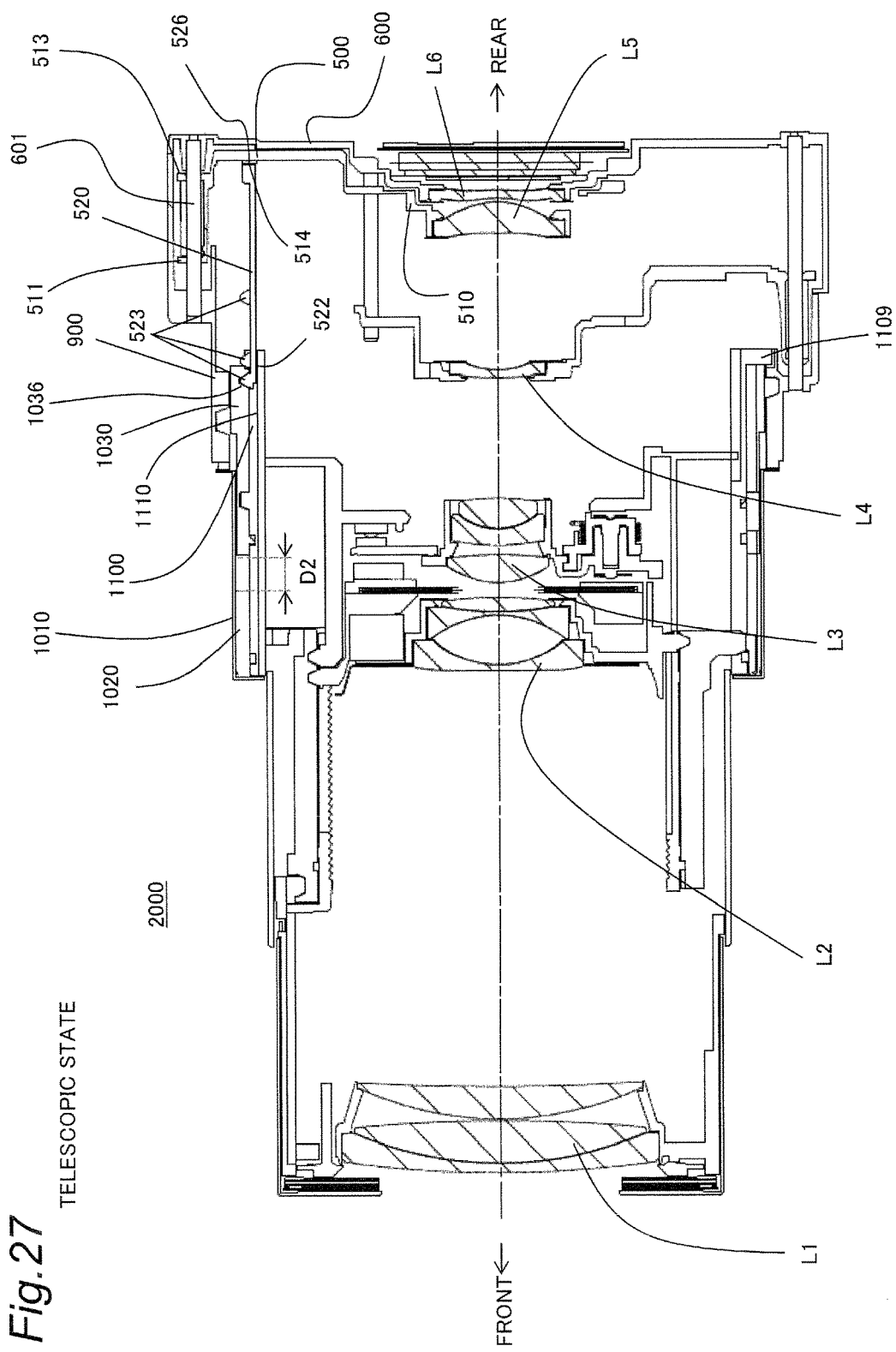
FIG. 27 is a cross-sectional view of the lens barrel 2000 in a telescopic state.

Returning to FIG. 13B, the cam followers 1038 engage with the cam groove formed on the inner peripheral surface of the fixed frame 900. The driven gear portion 1037 engages with the zooming motor unit 910 by way of a gear. The driven gear portion 1037 is formed such that a region (a meshing portion) used in a collapsed state is positioned on a front side of the driven gear portion 1037, and a region (a meshing portion) used in a telescopic state is positioned on a rear side of the driven gear portion 1037. The second drive frame 1030 is extendable from the fixed frame 900 and is rotatable with respect to the fixed frame 900 by being driven by the driven gear portion 1037. Accordingly, the cam groove formed on the inner peripheral surface of the fixed frame 900 is formed corresponding to the driven gear portion 1037. With this constitution, a length of the drive gear 910a used in the zooming motor unit 910 can be shortened. Further, as shown in FIG. 26, the region (the meshing portion) of the driven gear portion 1037 used in a telescopic state overlaps with the flange portion 1100a formed on the rear end of the penetration cam frame 1100 as viewed in the radial direction (see FIG. 26). Accordingly, by avoiding the formation of the driven gear portion 1037 in the region (the meshing portion) of the driven gear portion 1037 used in a telescopic state, that is, a region in the vicinity of the rear end portion of the second drive frame 1030 as much as possible, the flange portion 1100a can be formed largely on the rear end of the penetration cam frame 1100, and the flange portion 1100a can be formed in a wide range. Further, the penetration cam frame 1100 can ensure a strength thereof and hence, the penetration cam frame 1100 is minimally broken by an external force such as falling. Still further, a total length of the lens barrel in a collapsed state can be further shortened.

When the second drive frame 1030 is driven by the zooming motor unit 910, the cam followers 1038 are moved along the cam grooves (not shown in the drawing) of the fixed frame 900. With this constitution, the second drive frame 1030 advances or retracts in the optical axis direction while rotating about the optical axis AX.

As described previously, the rotation restricting portions 1031 are brought into contact with the rotation restricting portions 1021 of the first drive frame 1020. Accordingly, the first drive frame 1020 is rotated with respect to the fixed frame 900 along with the rotation of the second drive frame 1030.

[3.3. Penetration Cam Frame]

Figure 14:
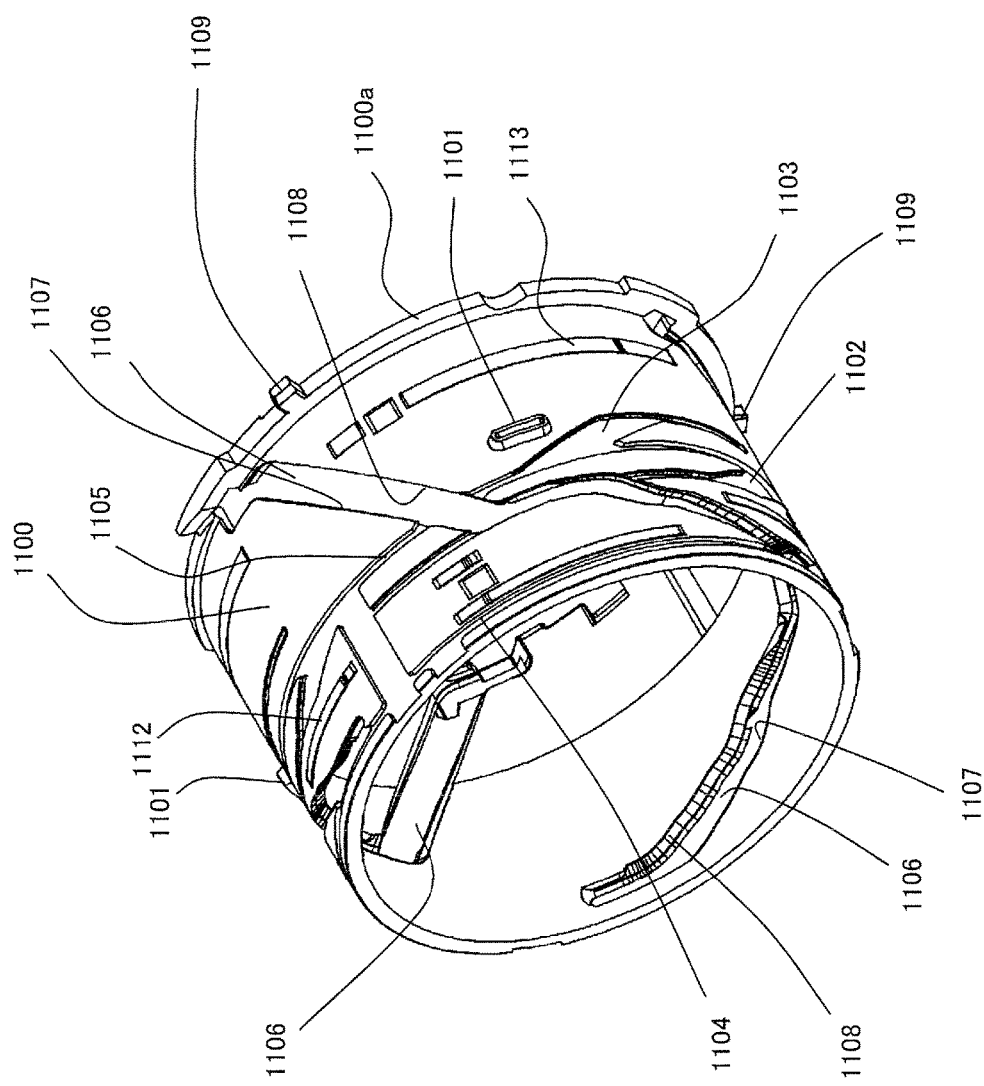
FIG. 14 is a perspective view of a penetration cam frame 1100.

FIG. 14 is a perspective view of the penetration cam frame 1100.

The penetration cam frame 1100 is formed in a circular cylindrical shape. The penetration cam frame 1100 is arranged on the inner peripheral side of the drive frame unit 1000. Three lifting cam followers 1101, three lifting cam grooves 1102, three lifting cam grooves 1103, three bayonet grooves 1104, three bayonet grooves 1105, three radial direction restricting portions 1112, and three radial direction restricting portions 1113 are formed on the outer peripheral surface of the penetration cam frame 1100 at pitches of approximately 120° in the circumferential direction respectively. Further, three penetration cam grooves 1106 are formed on the penetration cam frame 1100 at pitches of approximately 120° in the circumferential direction. The penetration cam grooves 1106 penetrate the peripheral wall of the penetration cam frame 1100 in the radial direction.

The lifting cam followers 1101 are formed on the penetration cam frame 1100 in a projecting manner in the outer peripheral direction. The lifting cam follower 1101 is formed in a shape which is obtained by arranging two frustoconical bases parallel to each other in the circumferential direction and by connecting two frustoconical bases to each other. The lifting cam followers 1101 engage with the lifting cam grooves 1032 of the drive frame unit 1000.

The lifting cam grooves 1102 and the lifting cam grooves 1103 are formed on the outer peripheral surface of the penetration cam frame 1100. The lifting cam grooves 1102 engage with the lifting cam followers 1033 of the second drive frame 1030. A slight gap may be formed between the lifting cam grooves 1102 and the lifting cam followers 1033. The lifting cam grooves 1103 engage with the lifting cam followers 1034 of the second drive frame 1030. A slight gap may be formed between the lifting cam grooves 1103 and the lifting cam followers 1034. The radial direction restricting portions 1112 and the radial direction restricting portions 1025 engage with each other and hence, the movement of the first drive frame 1020 in the radial direction with respect to the penetration cam frame 1100 is restricted. The radial direction restricting portions 1113 and the radial direction restricting portions 1039 engage with each other and hence, the movement of the second drive frame 1030 in the radial direction with respect to the penetration cam frame 1100 is restricted.

The bayonet grooves 1104 and the bayonet grooves 1105 are formed on the outer peripheral surface of the peripheral wall of the penetration cam frame 1100. The bayonet grooves 1104 and the bayonet grooves 1105 engage with the bayonet ribs 1022 and the bayonet ribs 1023 of the first drive frame 1020 respectively. In this embodiment, the lifting cam groove 1102 and the bayonet groove 1105, and the lifting cam groove 1103 and the bayonet groove 1105 are formed such that portions of these grooves are used in common. However, the respective grooves may be formed independently from each other.

[3.4. Relationship Among First Drive Frame 1020, Second Drive Frame 1030 and Penetration Cam Frame 1100]

FIG. 15A and FIG. 15B are developed views (schematic views) showing the relationship among the first drive frame 1020, the second drive frame 1030 and the penetration cam frame 1100.

FIG. 15A(a) is a developed view of the first drive frame 1020 and the second drive frame 1030 as viewed from an inner peripheral side. FIG. 15A(b) is a perspective developed view of the penetration cam frame 1100 as viewed from an inner peripheral side. FIG. 15B(a) is a view showing the relationship among the frames in a collapsed state. FIG. 15B(b) is a view showing the relationship among the frames in a telescopic state. In FIGS. 15B(a), 15B(b), several symbols are omitted for the sake of convenience of explanation.

As described previously, when the second drive frame 1030 is rotatably driven by the zooming motor unit 910, the first drive frame 1020 is rotated together with the second drive frame 1030. In such an operation, due to the relationship between the first and second drive frames 1020, 1030 and the penetration cam frame 1100, the first drive frame 1020 and the second drive frame 1030 make different movements in the optical axis direction.

Figure 25:
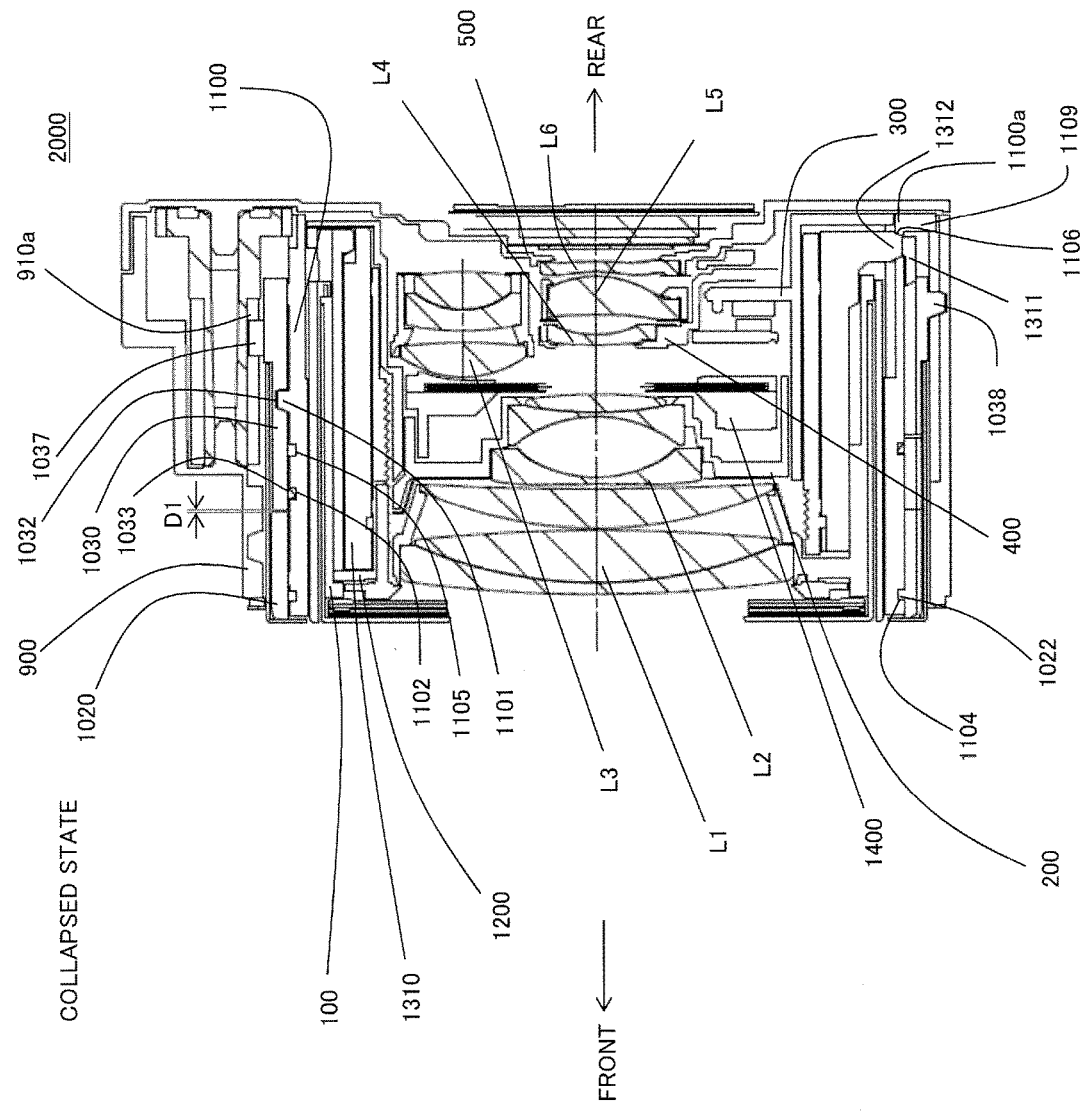
FIG. 25 is a cross-sectional view of the lens barrel 2000 in a collapsed state.

Hereinafter, the movements of the first drive frame 1020 and the second drive frame 1030 are specifically described. The movements are described with reference to FIGS. 25, 26 together with FIGS. 15A, 15B. FIG. 25 is a cross-sectional view of the lens barrel 2000 in a collapsed state. FIG. 26 is a cross-sectional view of the lens barrel 2000 in a telescopic state.

As shown in FIGS. 25, 26, in the second drive frame 1030, the lifting cam groove 1032 engages with the lifting cam follower 1101 of the penetration cam frame 1100. In the penetration cam frame 1100, the rotation restricting projection 1109 arranged on a rear end portion engages with a rotation restricting groove (not shown in the drawing) of the fixed frame 900. The rotation restricting groove of the fixed frame 900 is formed along the optical axis direction.

When the second drive frame 1030 is rotated with respect to the fixed frame 900, as shown in FIGS. 15B(a), 15B(b), the lifting cam follower 1101 is moved along the lifting cam groove 1032. As a result, as shown in FIGS. 25, 26, the penetration cam frame 1100 is moved toward a front side relative to the second drive frame 1030. That is, the penetration cam frame 1100 is brought into a telescopic state shown in FIG. 26 from a collapsed state shown in FIG. 25. In the same manner as the lifting cam follower 1101, the lifting cam follower 1033 and the lifting cam follower 1034 move relative to the lifting cam groove 1102 and the lifting cam groove 1103 respectively. The lifting cam follower 1033 and the lifting cam follower 1034 are cam followers provided for reinforcing the lifting cam follower 1101.

The lifting cam groove 1102 and the lifting cam follower 1033 of the second drive frame 1030 or the lifting cam groove 1103 and the lifting cam follower 1034 of the second drive frame 1030 are formed with a slight gap therebetween in a normal operation. Although such a gap is irrelevant to the operation of the barrel, when a large external force is applied to the lens barrel due to falling of the barrel or the like, the gap assists the engagement between the lifting cam follower 1101 and the lifting cam groove 1032 thus preventing disengagement of the lifting cam follower 1101 and the lifting cam groove 1032. Even when the constitution is adopted where the penetration cam frame 1100 is lifted, that is, is moved in the optical axis direction relative to the second drive frame 1030 by making the penetration cam frame 1100 and the second drive frame 1030 engage with each other by a plurality of cam mechanisms having the substantially same trajectory, the engagement strength is minimally lowered. In three kinds of cam mechanisms adopted in this embodiment, one kind of cam follower and two kinds of cam grooves are arranged on a penetration cam frame 1100 side, and one kind of cam groove and two kinds of cam followers are arranged on a second drive frame 1030 side. However, the present invention is not limited to such arrangement. The arrangement may be adopted where three kinds of cam followers are arranged on the same frame side, and three kinds of cam grooves are arranged on a counterpart frame side.

Bayonet ribs 1022 and bayonet ribs 1023 of the first drive frame 1020 engage with bayonet grooves 1104 and bayonet grooves 1105 of the penetration cam frame 1100 respectively.

With this constitution, since the lifting cam follower 1101 and the lifting cam groove 1032 engage with each other, when the second drive frame 1030 is rotated with respect to the penetration cam frame 1100 for shifting the barrel to a telescopic state from a collapsed state, the penetration cam frame 1100 is lifted, that is, is moved toward a front side in the optical axis direction relative to the second drive frame 1030. Further, the bayonet ribs 1022 and the bayonet ribs 1023 engage with the bayonet grooves 1104 and the bayonet grooves 1105 of the penetration cam frame 1100 respectively and hence, the first drive frame 1020 is lifted, that is, is moved toward a front side in the optical axis direction relative to the second drive frame 1030 together with the penetration cam frame 1100.

Since the rotation restricting portion 1021 of the first drive frame 1020 and the rotation restricting portion 1031 of the second drive frame 1030 engage with each other (are brought into contact with each other), when the second drive frame 1030 is rotated, the first drive frame 1020 is rotated along with the rotation of the second drive frame 1030. When the bayonet ribs 1022 and the bayonet ribs 1023 are moved along the bayonet grooves 1104 and the bayonet grooves 1105, the first drive frame 1020 is rotated with respect to the penetration cam frame 1100. In such an operation, the relative movement of the first drive frame 1020 in the optical axis direction with respect to the penetration cam frame 1100 is restricted. At this state of operation, as shown in FIGS. 25, 26, the second drive frame 1030 is moved so as to approach the first drive frame 1020 in a collapsed state, and is moved so as to be away from the first drive frame 1020 in a telescopic state.

(Effects and the Like)

The lens barrel of the present disclosure includes: the first frame (the penetration cam frame 1100); the second frame (the first drive frame 1020) which is rotatably supported relative to the first frame (the penetration cam frame 1100) about the optical axis, and has the first groove (the rotation restricting groove 1024); the third frame (the second drive frame 1030) which is rotatably supported relative to the first frame (the penetration cam frame 1100) about the optical axis, and has the second groove (the rotation restricting groove 1035); the fourth frame (the double-sided cam frame 1310) which has a first follower (a rotation restricting projection 1311) which is engageable with a first groove (a rotation restricting groove 1024) and a second groove (a rotation restricting groove 1035) and is movable with respect to the second frame (the first drive frame 1020) and the third frame (the second drive frame 1030) in the optical axis direction; and the moving mechanism (the cam mechanism constituted of the lifting cam follower 1101 and the lifting cam groove 1032) which moves the third frame (the second drive frame 1030) relative to the second frame (the first drive frame 1020) in the optical axis direction when the third frame (the second drive frame 1030) is rotated relative to the first frame, wherein the first follower (the rotation restricting projection 1311) is formed in a shape by which the first follower (the rotation restricting projection 1311) can continuously transit between the first groove (the rotation restricting groove 1024) and the second groove (the rotation restricting groove 1035).

With this constitution, the second frame (the first drive frame 1020) and the third frame (the second drive frame 1030) arranged on the single first frame (the penetration cam frame 1100) can be moved in a separated manner and hence, a moving amount of the fourth frame (the double-sided cam frame 1310) can be increased. Further, the miniaturization (the reduction of thickness) of the lens barrel in the optical axis direction can be realized while increasing the moving amount of the fourth frame (the double-sided cam frame 1310).

In the lens barrel of the present disclosure, the moving mechanism is constituted of the cam mechanism (the lifting cam follower 1101 and the lifting cam groove 1032).

With this constitution, the third frame (the second drive frame 1030) can be moved relative to the second frame (the first drive frame 1020) in the optical axis direction with the simple structure constituted of the cam mechanism (the lifting cam follower 1101 and the lifting cam groove 1032).

In the lens barrel of the present disclosure, the cam mechanism is constituted of the cam follower (the lifting cam follower 1101) of the first frame (the penetration cam frame 1100) and the cam groove (the lifting cam groove 1032) of the third frame (the second drive frame 1030).

With this constitution, the cam mechanism can be formed with the simple structure.

In the lens barrel of the present disclosure, the second frame (the first drive frame 1020) has the first rotation restricting portion (the rotation restricting portion 1021), and the third frame (the second drive frame 1030) has the second rotation restricting portion (the rotation restricting portion 1031) which engages with the first rotation restricting portion (the rotation restricting portion 1021).

With this constitution, it is possible to make the second frame (the first drive frame 1020) and the third frame (the second drive frame 1030) move relative to each other in the optical axis direction while restricting the relative rotation between the second frame (the first drive frame 1020) and the third frame (the second drive frame 1030).

The lens barrel of the present disclosure further includes the drive motor (the zooming motor unit 910) where the drive gear (the drive gear 910*a*) is joined to the drive shaft, the driven gear portion (the driven gear portion 1037) which meshes with the drive gear of the drive motor (the zooming motor unit 910) and rotates the third frame (the second drive frame 1030) about the optical axis is formed on a rear end side of an outer peripheral surface of the third frame (the second drive frame 1030) in the circumferential direction, and the driven gear portion (the driven gear portion 1037) is formed so as to make a predetermined angle with respect to the circumferential direction such that one end side of the driven gear portion (the driven gear portion 1037) in the circumferential direction projects toward a rear side from a rear end of the third frame (the second drive frame 1030).

With this constitution, the rear end flange portion 1100*a* of the penetration cam frame 1100 can be formed largely and also in a wide range. Accordingly, the penetration cam frame 1100 can ensure the strength and hence, the penetration cam frame 1100 is minimally broken by an external force such as falling. Further, the total length of the lens barrel in a collapsed state can be further shortened.

The lens barrel of the present disclosure includes: the first frame (the penetration cam frame 1100); the second frame (the first drive frame 1020) which is supported rotatably relative to the first frame (the penetration cam frame 1100) about the optical axis; the moving member (the fifth group drive arm 520) which is movably supported in the optical axis direction on the second frame (the first drive frame 1020); the third frame (the fifth group lens frame 510) which is arranged so as to face the moving member (the fifth group drive arm 520) in an opposed manner in the optical axis direction, and is movably supported in the optical axis direction; and the biasing means (the biasing spring 603) which biases the moving member (the fifth group drive arm 520) and the third frame (the fifth group lens frame 510) in the directions that the moving member (the fifth group drive arm 520) and the third frame (the fifth group lens frame 510) are brought into contact with each other. The lens barrel of the present disclosure also includes the moving mechanism (the cam follower 523, the drive cam groove 1036) which moves the moving member (the fifth group drive arm 520) in the optical axis direction when the second frame (the first drive frame 1020) is rotated relative to the first frame (the penetration cam frame 1100).

With this constitution, it is possible to move the third frame (the fifth group lens frame 510) in the optical axis direction by way of the moving member (the fifth group drive arm 520) corresponding to the relative rotation between the first frame (the penetration cam frame 1100) and the second frame (the first drive frame 1020).

This embodiment also discloses the following constitution.

That is, in the lens barrel of the present disclosure, the second frame (the first drive frame 1020) further includes the first rotation restricting portion (the rotation restricting portion 1021), the third frame (the second drive frame 1030) further includes the second rotation restricting portion (the rotation restricting portion 1031), and the second frame (the first drive frame 1020) and the third frame (the second drive frame 1030) engage with the first rotation restricting portion (the rotation restricting portion 1021) and the second rotation restricting portion (the rotation restricting portion 1031) when the relative positions in the optical axis direction of the second frame (the first drive frame 1020) and the third frame (the second drive frame 1030) in the optical axis direction are changed thus restricting the rotations.

With this constitution, it is unnecessary to apply the restriction of rotation to the second frame (the first drive frame 1020) and the third frame (the second drive frame 1030) respectively from other frames.

In the lens barrel of the present disclosure, the second frame (the first drive frame 1020) and the third frame (the second drive frame 1030) are arranged along the optical axis direction, and opposedly facing outer diameters of the second frame (the first drive frame 1020) and the third frame (the second drive frame 1030) are set to the substantially same diameter, and opposedly facing inner diameters of the second frame (the first drive frame 1020) and the third frame (the second drive frame 1030) are set to the substantially same diameter. The first rotation restricting portion (the rotation restricting portion 1021) and the second rotation restricting portion (the rotation restricting portion 1031) are arranged between the outer diameter and the inner diameter which are substantially the same diameter between the second frame (the first drive frame 1020) and the third frame (the second drive frame 1030). The radial direction position of the first rotation restricting portion (the rotation restricting portion 1021) is set substantially equal to the radial direction position of the first groove (the rotation restricting groove 1024), and the radial direction position of the second rotation restricting portion (the rotation restricting portion 1031) is set substantially equal to the radial direction position of the second groove (the rotation restricting groove 1035). In other words, the radial direction position of the first rotation restricting portion (the rotation restricting portion 1021) has at least a portion thereof overlapping with the radial direction position of the first groove (the rotation restricting groove 1024), and the radial direction position of the second rotation restricting portion (the rotation restricting portion 1031) has at least a portion thereof overlapping with the radial direction position of the second groove (the rotation restricting groove 1035).

With this constitution, a moving amount of the fourth frame (the double-sided cam frame 1310) can be increased without increasing the size in the radial direction.

In the lens barrel of the present disclosure, the fifth frame (the ornamental ring 1010) is fixed to the outer peripheral portion of the second frame (the first drive frame 1020) and hence, the fifth frame (the ornamental ring 1010) and the second frame (the first drive frame 1020) are integrally joined to each other. It is sufficient that the length of the fifth frame (the ornamental ring 1010) in the optical axis direction is the length with which a gap formed when the positions of the second frame (the first drive frame 1020) and the third frame (the second drive frame 1030) in the optical axis direction are changed can be concealed, that is, the length which is longer than amounts of changes of the positions of the respective frames in the optical axis direction. In the present disclosure, the length of the fifth frame (the ornamental ring 1010) is set to the length with which the fifth frame (the ornamental ring 1010) covers the second frame (the first drive frame 1020), a gap formed between the second frame (the first drive frame 1020) and the third frame (the second drive frame 1030) is concealed, and the fifth frame (the ornamental ring 1010) covers a portion of the third frame (the second drive frame 1030) observed in external appearance. In this case, the fifth frame (the ornamental ring 1010) and the second frame (the first drive frame 1020) are fixed to each other and hence, the fifth frame (the ornamental ring 1010) and the second frame (the first drive frame 1020) may be brought into close contact to each other. However, the fifth frame (the ornamental ring 1010) changes the position thereof in the optical axis direction with respect to the third frame (the second drive frame 1030), that is, the fifth frame (the ornamental ring 1010) and the third frame (the second drive frame 1030) move relative to each other and hence, it is necessary to make the fifth frame (the ornamental ring 1010) and the third frame (the second drive frame 1030) face each other with a gap formed therebetween in the radial direction. It is preferable to set this gap in the radial direction to approximately 0.01 mm to 0.5 mm.

With this constitution, even when a gap, that is, a separated portion is formed due to a change in positions of the second frame (the first drive frame 1020) and the third frame (the second drive frame 1030) in the optical axis direction, such a gap can be concealed. Accordingly, the aesthetic appearance of the lens barrel can be ensured, the intrusion of harmful light can be suppressed, and the intrusion of dust or a foreign substance can be suppressed.

The lens barrel of the present disclosure includes the first cam mechanism constituted of the first frame (the penetration cam frame 1100) and the third frame (the second drive frame 1030), and the relative position of the first frame (the penetration cam frame 1100) and the third frame (the second drive frame 1030) in the optical axis direction can be changed by the first cam mechanism. The first cam mechanism is formed by the engagement between the lifting cam follower 1101 of the first frame (the penetration cam frame 1100) and the lifting cam groove 1032 of the third frame (the second drive frame 1030). The lens barrel includes the second cam mechanism which is constituted of the first frame (the penetration cam frame 1100) and the second frame (the first drive frame 1020), and the first frame (the penetration cam frame 1100) and the second frame (the first drive frame 1020) engage with each other in a relatively rotatable manner while not changing the relative position in the optical axis direction therebetween by the second cam mechanism. The second cam mechanism is constituted of the engagement between the bayonet grooves 1104 and the bayonet grooves 1105 of the first frame (the penetration cam frame 1100) and the bayonet ribs 1022 and the bayonet ribs 1023 of the second frame (the first drive frame 1020).

With this constitution, the positions of the second frame (the first drive frame 1020) and the third frame (the second drive frame 1030) in the optical axis direction can be changed without increasing the number of parts or without increasing the size in the radial direction.

In the lens barrel of the present disclosure, the first radial direction restricting portion (the radial direction restricting portion 1112) and the second radial direction restricting portion (the radial direction restricting portion 1113) are formed on the outer periphery of the first frame (the penetration cam frame 1100), and the third radial direction restricting portion (the radial direction restricting portion 1025) is formed on the inner periphery of the second frame (the first drive frame 1020), and the fourth radial direction restricting portion (the radial direction restricting portion 1039) is formed on the inner periphery of the third frame (the second drive frame 1030). Due to the engagement between the first radial direction restricting portion (the radial direction restricting portion 1112) and the third radial direction restricting portion (the radial direction restricting portion 1025), the second frame (the first drive frame 1020) is restricted in the radial direction with respect to the first frame (the penetration cam frame 1100). Due to the engagement between the second radial direction restricting portion (the radial direction restricting portion 1113) and the fourth radial direction restricting portion (the radial direction restricting portion 1039), the third frame (the second drive frame 1030) is restricted in the radial direction with respect to the first frame (the penetration cam frame 1100).

With this constitution, it is unnecessary to provide the radial direction restriction between the second frame (the first drive frame 1020) and the third frame (the second drive frame 1030) and hence, the lens barrel can be formed without increasing the size in the radial direction.

In the lens barrel of the present disclosure, the first frame (the penetration cam frame 1100) has the third groove (the penetration cam groove 1106), the fourth frame (the double-sided cam frame 1310) has the second follower (the cam follower 1312) which engages with the third groove (the penetration cam groove 1106), and the third cam mechanism is constituted of the third groove (the penetration cam groove 1106) and the second follower (the cam follower 1312). When the second frame (the first drive frame 1020) is rotated relative to the first frame (the penetration cam frame 1100), the second follower (the cam follower 1312) is moved along the third groove (the penetration cam groove 1106) and hence, the fourth frame (the double-sided cam frame 1310) is moved in the optical axis direction while rotating with respect to the first frame (the penetration cam frame 1100).

Due to such an operation, the fourth frame (the double-sided cam frame 1310) can be moved without increasing the number of parts or without increasing the size in the radial direction.

The lens barrel of the present disclosure further includes the sixth frame (the fixed frame 900) which is supported rotatably relative to the third frame (the second drive frame 1030). The third frame (the second drive frame 1030) is moved with the relative rotation between the third frame (the second drive frame 1030) and the sixth frame (the fixed frame 900) by the fourth cam mechanism constituted of the sixth frame (the fixed frame 900) and the third frame (the second drive frame 1030). The lens barrel further includes the seventh frame (the first group unit 100) which is rotatably supported relative to the fourth frame (the double-sided cam frame 1310), and the seventh frame (the first group unit 100) and the fourth frame (the double-sided cam frame 1310) are moved in the optical axis direction while being rotatable relative to each other by the fifth cam mechanism constituted of the fourth frame (the double-sided cam frame 1310) and the seventh frame (the first group unit 100). Assuming a moving amount of the third frame (the second drive frame 1030) in the optical axis direction with respect to the sixth frame (fixed frame 900) by the fourth cam mechanism as $\alpha$, a moving amount of the first frame (the penetration cam frame 1100) in the optical axis direction with respect to the third frame (the second drive frame 1030) by the first cam mechanism as $\beta$, a moving amount of the fourth frame (the double-sided cam frame 1310) in the optical axis direction with respect to the first frame (the penetration cam frame 1100) by the third cam mechanism as $\gamma$, and a moving amount of the seventh frame (the first group unit 100) in the optical axis direction with respect to the fourth frame (the double-sided cam frame 1310) by the fifth cam mechanism as $\delta$, a moving amount of the seventh frame (the first group unit 100) with respect to the sixth frame (the fixed frame 900) is expressed as $\alpha+\beta+\gamma+\delta$.

In this manner, the lens barrel of the present disclosure can acquire an extending amount comparable to an extending amount of a four-stage collapsible barrel, that is, an extending amount of $\alpha+\beta+\gamma+\delta$ while exhibiting the same external appearance as a three-stage collapsible barrel, that is, having the substantially same outer diameter as a three-stage collapsible barrel. The lens barrel of the present disclosure can extend the moving amount by $\beta$ compared to the conventional three-stage collapsible barrel. In the present disclosure, the first groove and the second groove are formed as the rotation restricting groove and the third groove is formed as the cam groove. However, the grooves may be used in an opposite manner. That is, the same advantageous effect can be acquired by using the first groove and the second groove as the cam grooves and the third groove as the rotation restricting groove. In the present disclosure, in the second cam mechanism, the first frame (the penetration cam frame 1100) and the second frame (the first drive frame 1020) are configured such that the relative position in the optical direction is not changed. However, the first frame (the penetration cam frame 1100) and the second frame (the first drive frame 1020) are configured such that the relative position in the optical direction is changed. The same effects can be obtained by such a constitution. In the present disclosure, the fifth frame (the ornamental ring 1010) is formed as a member separate from the second frame (the first drive frame 1020), the fifth frame (the ornamental ring 1010) and the second frame (the first drive frame 1020) may be formed as one integral part. Such a part can also acquire the same advantageous effect. Although the fifth frame (the ornamental ring 1010) is fixed to the second frame (the first drive frame 1020) in the present disclosure, the fifth frame (the ornamental ring 1010) may be fixed to the third frame (the second drive frame 1030). In this case, the second frame (the first drive frame 1020) and the fifth frame (the ornamental ring 1010) may be arranged to face each other with a gap formed therebetween in the radial direction. Such a constitution can also acquire the same advantageous effect. The fifth frame (the ornamental ring 1010) and the third frame (the second drive frame 1030) may be formed as one integral part. Such a part can also acquire the same advantageous effect.

[3.5. (Double-Sided Cam Frame)]

Figure 16:
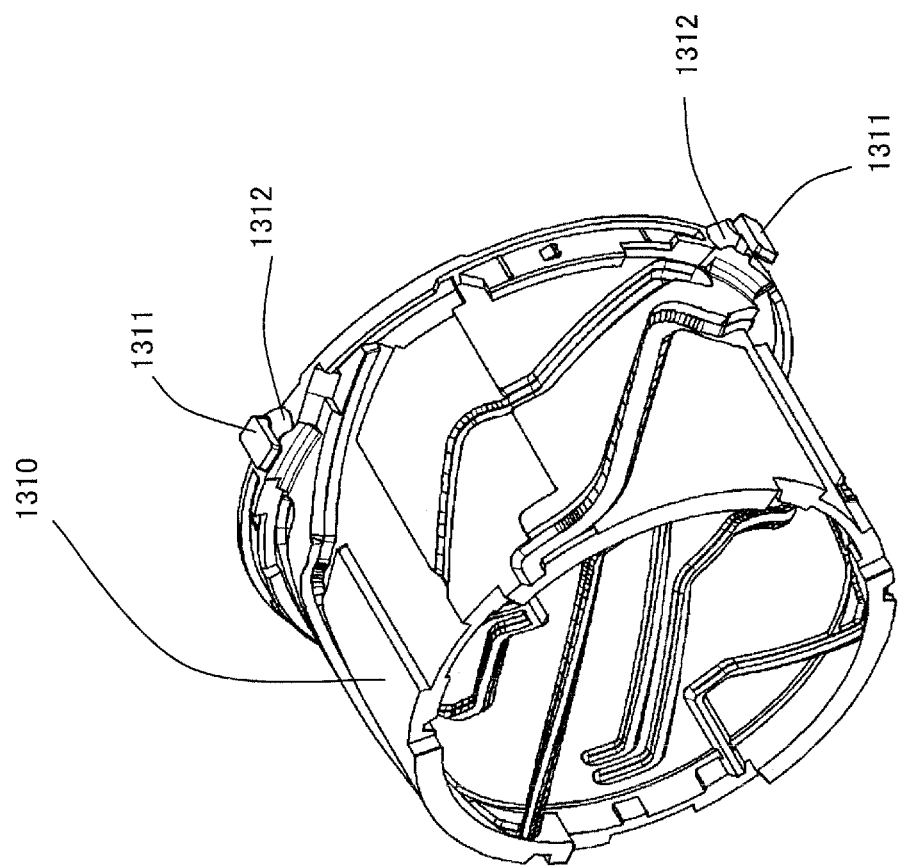
FIG. 16 is a perspective view of a double-sided cam frame 1310.

FIG. 16 is a perspective view of the double-sided cam frame 1310.

FIG. 17 is a constitutional view of the double-sided cam frame 1310. FIG. 17A is a front view of the double-sided cam frame 1310, FIG. 17B is a view of the double-sided cam frame 1310 as viewed in the direction indicated by D in FIG. 17A, and FIG. 17C is a view of the double-sided cam frame 1310 as viewed in the direction indicated by E in FIG. 17A.

As shown in FIGS. 16 and 17, the double-sided cam frame 1310 is formed into a circular cylindrical shape. The double-sided cam frame 1310 is formed by injection molding using a resin. The double-sided cam frame 1310 is arranged on an inner peripheral side of the penetration cam frame 1100. A rotation restricting projection 1311 and a cam follower 1312 are formed on the double-sided cam frame 1310. The cam follower 1312 is formed in a radially projecting manner from a rear end portion of the double-sided cam frame 1310. The cam follower 1312 engages with the penetration cam groove 1106 of the penetration cam frame 1100. The cam follower 1312 has a shape formed by arranging two frustoconical bases in the circumferential direction and by connecting both frustoconical bases. By forming the cam follower 1312 into such a shape, compared to a cam follower having the structure where only one frustoconical base is arranged, the cam follower 1312 can increase a cross-sectional area of the cam follower in the circumferential direction. Accordingly, even when an external force is applied to the lens barrel due to falling or the like, the lens barrel is minimally broken.

The rotation restricting projection 1311 has a form configured such that the rotation restricting projection 1311 projects in the radial direction from a distal end of the cam follower 1312, and a distal end of the rotation restricting projection 1311 extends toward a front side in the optical axis direction.

As shown in FIG. 19, the rotation restricting projection 1311 engages with the rotation restricting groove 1024 of the first drive frame 1020 and the rotation restricting groove 1035 of the second drive frame 1030 (see FIG. 13). As shown in FIG. 19, in a collapsed state, a rear end portion of the rotation restricting groove 1035 of the second drive frame 1030 is disposed away from the rear end flange portion 1100a of the penetration cam frame 1100. With this constitution, when the penetration cam frame 1100 is lifted toward a front side in the optical axis direction, that is, when the penetration cam frame 1100 is moved toward a front side in the optical axis direction along with the shifting of the lens barrel to a telescopic state from a collapsed state as described previously, it is possible to ensure a space for preventing the interference of the rear end flange portion 1100a of the penetration cam frame 1100 with the rear end portion of the second drive frame 1030. The rotation restricting projection 1311 is, in a collapsed state shown in FIG. 19, formed in an extending manner toward a front side in the optical axis direction such that the rotation restricting projection 1311 reaches a rear end portion of the rotation restricting groove 1035 disposed away from the rear end flange portion 1100a of the penetration cam frame 1100. As shown in FIG. 20, when the lens barrel is in a telescopic state, the front end portion of the extending portion of the rotation restricting projection 1311 is made to approach and face the front side flange portion of the ornamental ring 1010 in an opposed manner without interposing the first drive frame 1020 between the front end portion of the extending portion of the rotation restricting projection 1311 and the front flange portion of the ornamental ring 1010 in the optical axis direction. In this embodiment, as shown in FIG. 17B, the rotation restricting projection 1311 is disposed at the position offset toward a left side from the center of the cam follower 1312 as viewed in the drawing.

Figure 18:
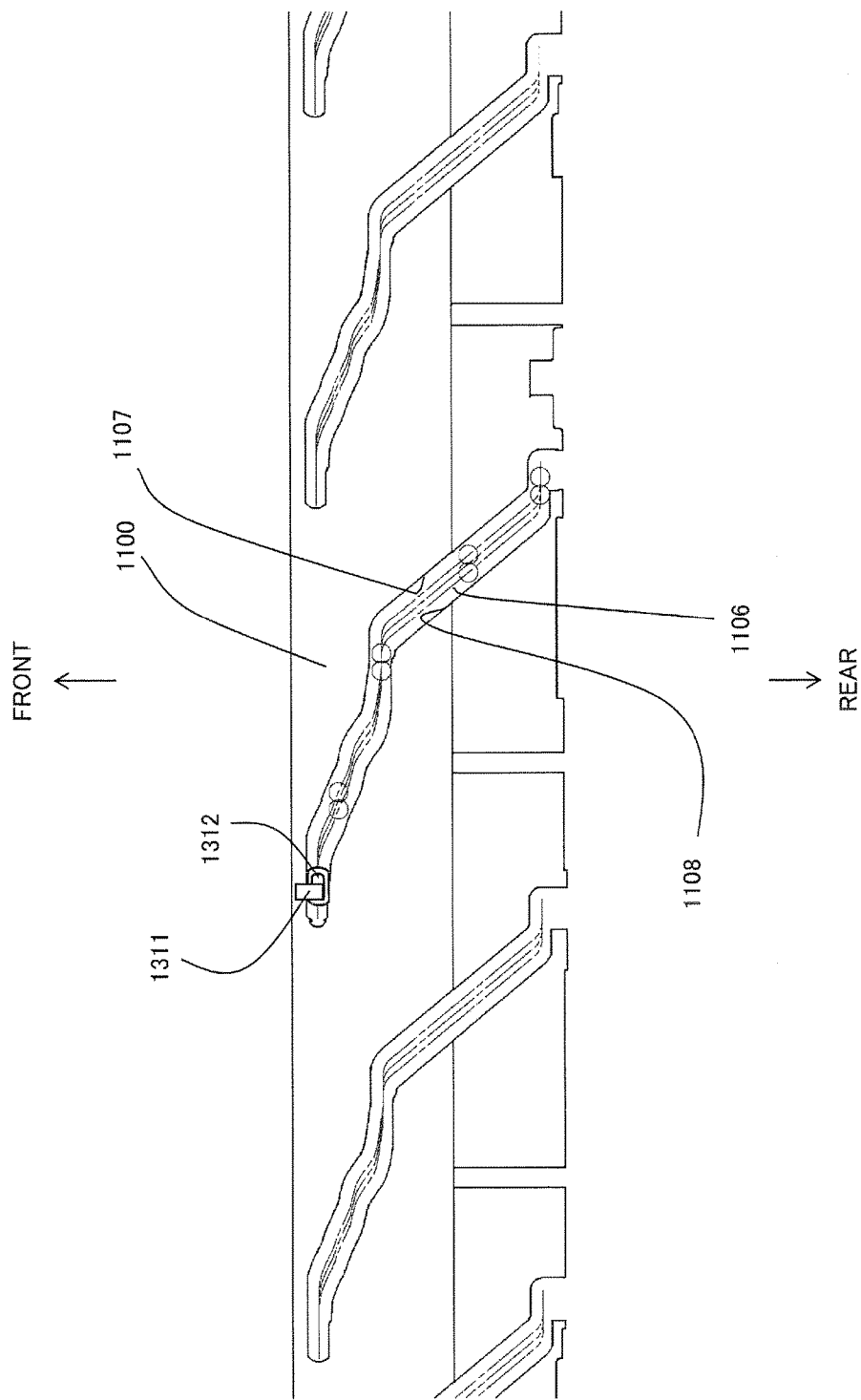
FIG. 18 is a developed view of the penetration cam frame 1100.

FIG. 18 is a developed view of the penetration cam groove 1106.

The penetration cam groove 1106 has a shape which approximately monotonously extends toward a right lower position from a left upper position in the drawing. The penetration cam groove 1106 has a front cam surface 1107 disposed on a front side in the optical axis direction and a rear cam surface 1108 on a rear side in the optical axis direction.

As shown in FIG. 17B, portions of the cam follower 1312 which slide in the penetration cam groove 1106 are only a conical surface 1313a and a conical surface 1313b. The conical surface 1313a is a portion (a range indicated by a solid-line arrow) at a right upper side on a surface of paper formed on the first frustoconical base 1312a on a right side on the surface of paper out of two frustoconical bases which form the cam follower 1312, wherein such portion faces the front cam surface 1107 of the penetration cam groove 1106 shown in FIG. 18 in an opposed manner. The conical surface 1313b is a portion (a range indicated by a solid-line arrow) at a left lower side on the surface of paper formed on the second frustoconical base 1312b on a left side on the surface of paper out of two frustoconical bases which form the cam follower 1312, wherein such portion faces the rear cam surface 1108 of the penetration cam groove 1106 shown in FIG. 18 in an opposed manner. Accordingly, it is sufficient for the cam follower 1312 to ensure the size accuracy substantially equal to the size accuracy of the conical surface 1313a and the conical surface 1313b.

In this embodiment, the conical surface 1313a and the conical surface 1313b are formed on portion which slide in the penetration cam groove 1106 and predetermined ranges disposed adjacent to the portions. To be more specific, the conical surface 1313a is formed within a range of a predetermined angle in the clockwise direction from a front side in the optical axis direction with respect to the center axis (conical axis) of the first frustoconical base 1312a. The conical surface 1313b is formed within a range of a predetermined angle in the clockwise direction from a rear side in the optical axis direction with respect to the center axis (conical axis) of the second frustoconical base 1312b.

Further, in this embodiment, to ensure the dimensional accuracy of the cam follower 1312, as a mold part for forming the double-sided cam frame 1310 by injection molding, a mold part which can form a single mold part within an accuracy ensured range 1314 (a range indicated by a broken-line arrow) is used. The accuracy ensured range 1314 is a range from the position which is routed around the conical surface 1313a of the first frustconical base 1312a by a predetermined angle in the clockwise direction from a front side as viewed from an outer side in the radial direction of a conical axis to the position which is routed around the conical surface 1313b of the second frustconical base 1312b by a predetermined angle in the counterclockwise direction from a rear side as viewed from an outer side in the radial direction of a conical axis. Due to such processing, the accuracy ensured range 1314 (the range indicated by a broken-line arrow) can be formed by a single mold part and hence, the accuracy of the part can be made stable. This single mold part can be moved (slid) in the radial direction at the time of molding. As a result, when the rotation restricting projection 1311 and the accuracy ensured range 1314 overlap with each other as viewed from the radial direction, these parts cannot be formed by a single mold part. Accordingly, in forming the accuracy ensured range 1314 by the single mold part, it is necessary to adopt the constitution where the rotation restricting projection 1311 and the accuracy ensured range 1314 do not overlap with each other as viewed in the radial direction.

It is necessary to form the rotation restricting projection 1311 such that the rotation restricting projection 1311 has a side surface 1315 and a side surface 1316, the side surface 1315 and the conical surface 1313a do not overlap with each other as viewed in the radial direction, and the side surface 1316 and the conical surface 1313b do not overlap with each other as viewed in the radial direction. The side surface 1315 and the side surface 1316 of the rotation restricting projection 1311 are formed so as to extend to a front side in the optical axis direction from the cam follower 1312. Accordingly, the side surface 1315 and the side surface 1316 do not extend toward a rear side from the conical axis of the cam follower 1312 in the optical axis direction and hence, the side surface 1315 and the side surface 1316 do not overlap with the cam follower 1312 as viewed in the radial direction. To widen a width of the rotation restricting projection 1311, that is, a distance "h" between the side surface 1315 and the side surface 1316 while ensuring the accuracy ensured range 1314 (a range from the position which is routed around the conical surface 1313*a* of the first frustconical base 1312*a* by a predetermined angle in the clockwise direction from a front side as viewed from an outer side in the radial direction of a conical axis to the position which is routed around the conical surface 1313*b* of the second frustconical base 1312*b* by a predetermined angle in the counterclockwise direction from a rear side as viewed from an outer side in the radial direction of a conical axis), it is sufficient to move the side surface 1316 toward a left side on a surface of paper, that is, in the direction away from an intermediate point between the first frustoconical base 1312*a* and the second frustconical base 1312*b*. In the second frustconical base 1312*b*, the conical surface 1313*b* which requires accuracy exists only on a rear side in the optical axis direction with respect to the conical axis of the cam follower 1312 and hence, even when the side surface 1316 overlaps with the portion more on a front side in the optical axis direction than the conical axis of the second frustconical base 1312*b*, the accuracy of the conical surface 1313*b* can be ensured. In the first frustconical base 1312*a*, the conical surface 1313*a* which requires accuracy exists more on a front side in the optical axis direction than the conical axis of the cam follower 1312 and hence, when the side surface 1315 overlaps with a portion of the first frustconical base 1312*a* more on a front side in the optical axis direction than the conical axis of the cam follower 1312, the accuracy ensured range 1314 cannot be formed by a single mold part and hence, the accuracy of the conical surface 1313*a* cannot be ensured. Accordingly, it is necessary to form the side surface 1315 more on a second frustoconical base 1312*b* side in the circumferential direction than the conical axis of the first frustconical base 1312*a*. To satisfy this requirement, the rotation restricting projection 1311 is formed in a shape where the rotation restricting projection 1311 is offset toward a left side on a surface of paper from the center of the cam follower 1312, that is, an intermediate point between the first frustoconical base 1312*a* and the second frustoconical base 1312*b*. By forming the side surface 1315 in this manner, the size of the width "h" can be ensured and hence, the strength of the rotation restricting projection 1311 can be ensured. Further, both the accuracy of the cam follower 1312 and the strength of the rotation restricting projection 1311 can be acquired.

As described above, the double-sided cam frame 1310 includes: the cam follower 1312 having a shape where the first frustoconical base 1312*a* and the second frustconical base 1312*b* are arranged in the circumferential direction and are joined to each other; and the rotation restricting projection 1311 which is formed such that the rotation restricting projection 1311 projects in the radial direction from the cam follower 1312 and, further, extends toward a front side in the optical axis direction. The rotation restricting projection 1311 has the side surface 1315 and the side surface 1316 which differ from each other in the circumferential distance from an intermediate point between the first frustconical base 1312*a* and the second frustconical base 1312*b*. The side surface 1315 is disposed at the approximately same position as the conical axis of the first frustconical base 1312*a* or on a side closer to the intermediate point (the intermediate position between the first frustconical base 1312*a* and the second frustconical base 1312*b*) than the conical axis of the first frustconical base 1312*a* in the circumferential direction. The side surface 1316 is disposed at the approximately same position as the conical axis of the second frustconical base 1312*b* or on a side remoter from the intermediate point than the conical axis of the second frustconical base 1312*b* in the circumferential direction.

[3.6. Engaging State of Drive Frame Unit, Penetration Cam Frame and Double-Side Cam Frame]

FIGS. 19A and 19B are views showing the relationship in a collapsed state among the drive frame unit 1000, the penetration cam frame 1100 and the double-sided cam frame 1310. FIG. 19A is a view of the drive frame unit 1000 as viewed from the optical axis direction, and FIG. 19B is a cross-sectional view taken along a line C-C in FIG. 19A.

FIGS. 20A and 20B are views showing the relationship in a telescopic state among the drive frame unit 1000, the penetration cam frame 1100 and the double-sided cam frame 1310. FIG. 20A is a view of the drive frame unit 1000 as viewed from the optical axis direction, and FIG. 20B is a cross-sectional view taken along a line D-D in FIG. 20A.

When the second drive frame 1030 is rotated with respect to the penetration cam frame 1100 for shifting the lens barrel to a telescopic state from a collapsed state, the lifting cam follower 1101 engages with the lifting cam groove 1032. Due to such engagement, the penetration cam frame 1100 is lifted, that is, is moved toward a front side in the optical axis direction relative to the second drive frame 1030 and hence, the bayonet ribs 1022 and the bayonet ribs 1023 engage with the bayonet grooves 1104 and the bayonet grooves 1105 of the penetration cam frame 1100 respectively. Accordingly, the first drive frame 1020 is lifted, that is, is moved toward a front side in the optical axis direction relative to the second drive frame 1030 together with the penetration cam frame 1100.

When the second drive frame 1030 is rotated with respect to the penetration cam frame 1100 from a collapsed state, the double-sided cam frame 1310 is moved toward a front side in the optical axis direction while being rotated with respect to the penetration cam frame 1100 by the cam mechanism. The cam mechanism is constituted of: the penetration cam groove 1106 of the penetration cam frame 1100; the cam follower 1312 which engages with the penetration cam groove 1106; the rotation restricting groove 1035 of the second drive frame 1030; and the rotation restricting projection 1311 which engages with the rotation restricting groove 1035.

In an initial state when the lens barrel is shifted to a telescopic state from a collapsed state, the first drive frame 1020 and the second drive frame 1030 are being held in a state where the first drive frame 1020 and the second drive frame 1030 are close to each other in the optical axis direction and hence, a distance D1 in the optical axis direction between the first drive frame 1020 and the second drive frame 1030 is small. In this state, two grooves, that is, the rotation restricting groove 1024 of the first drive frame 1020 and the rotation restricting groove 1035 of the second drive frame 1030 are close to each other and are formed continuously as if two grooves form one groove.

When the double-sided cam frame 1310 is moved toward a front side in the optical axis direction while being rotated with respect to the penetration cam frame 1100, the cam follower 1312 is moved in the penetration cam groove 1106. At this stage of the operation, the rotation restricting projection 1311 is moved in the rotation restricting groove 1035 of the second drive frame 1030 and, thereafter, transits to the rotation restricting groove 1024 of the first drive frame 1020 disposed continuously with the rotation restricting groove 1035, and is moved in the rotation restricting groove 1024.

When the second drive frame 1030 is rotated with respect to the penetration cam frame 1100 so as to shift the lens barrel to a telescopic state from a collapsed state, the rotation restricting projection 1311 transits to the rotation restricting groove 1024 of the first drive frame 1020 from the rotation restricting groove 1035 of the second drive frame 1030 and, thereafter, the lifting cam follower 1101 engages with the lift portion of the lifting cam groove 1032, that is, the optical-axis-direction moved portion of the lifting cam groove 1032. Accordingly, the penetration cam frame 1100 is lifted, that is, is moved toward a front side in the optical axis direction relative to the second drive frame 1030. Then, the bayonet ribs 1022 and the bayonet ribs 1023 engage with the bayonet grooves 1104 and the bayonet grooves 1105 of the penetration cam frame 1100 respectively. Accordingly, the first drive frame 1020 is lifted, that is, moved toward a front side in the optical axis direction relative to the second drive frame 1030 together with the penetration cam frame 1100. As a result, the position of the second drive frame 1030 and the position of the first drive frame 1020 are separated from each other in the optical axis direction so that a distance D2 in the optical axis direction between the first drive frame 1020 and the second drive frame 1030 is increased. (D2>D1)

In this embodiment, the rotation restricting projection 1311 transits to the rotation restricting groove 1024 from the rotation restricting groove 1035 and, thereafter, the second drive frame 1030 and the first drive frame 1020 are separated from each other in the optical axis direction. However, the present invention is not limited to such a manner of operation. The second drive frame 1030 and the first drive frame 1020 may be separated from each other in the optical axis direction before the rotation restricting projection 1311 transits to the rotation restricting groove 1024 from the rotation restricting groove 1035 or in the midst of the transition. In this case, it is sufficient that a length of the rotation restricting projection 1311 in the optical axis direction is equal to or longer than the predetermined length D2. That is, it is sufficient that the length D2 of the rotation restricting projection 1311 is larger than a distance formed between the second drive frame 1030 and the first drive frame 1020 when the rotation restricting projection 1311 transits to the rotation restricting groove 1024 from the rotation restricting groove 1035.

The rotation restricting groove 1024 of the first drive frame 1020 and the rotation restricting groove 1035 of the second drive frame 1030 engage with the rotation restricting portion 1021 and the rotation restricting portion 1031 respectively and hence, even when the positional relationship in the optical axis direction changes, there is no possibility that the positional relationship in the circumferential direction, that is, in the rotation angle direction changes.

As shown in FIG. 19B, the rotation restricting projection 1311 is positioned in the rotation restricting groove 1035 of the second drive frame 1030. When the lens barrel is moved to a telescopic state shown in FIG. 20 from a collapsed state shown in FIG. 19, the rotation restricting projection 1311 is moved in a transiting manner to the rotation restricting groove 1024 of the first drive frame 1020 from the rotation restricting groove 1035 of the second drive frame 1030. As described previously, the rotation restricting projection 1311 is formed in a shape extending in the optical axis direction and having the length equal to or more than the predetermined length in the optical axis direction and hence, the rotation restricting projection 1311 can surely transit to the rotation restricting groove 1024 of the first drive frame 1020 from the rotation restricting groove 1035 of the second drive frame 1030.

As described previously, when the lens barrel is moved to a telescopic state shown in FIG. 20 from a collapsed state shown in FIG. 19, the second drive frame 1030 and the first drive frame 1020 are separated from each other (D1 in FIG. 19 being changed to D2 in FIG. 20). To conceal such a portion where the second drive frame 1030 and the first drive frame 1020 are separated from each other, the ornamental ring 1010 is arranged on an outer peripheral side of the second drive frame 1030 and an outer peripheral side of the first drive frame 1020.

[3.7. Description of Driving of Fifth Group Unit]

Driving of the fifth group unit 500 is described with reference to FIGS. 21 to 23 and FIG. 27.

Figure 21:
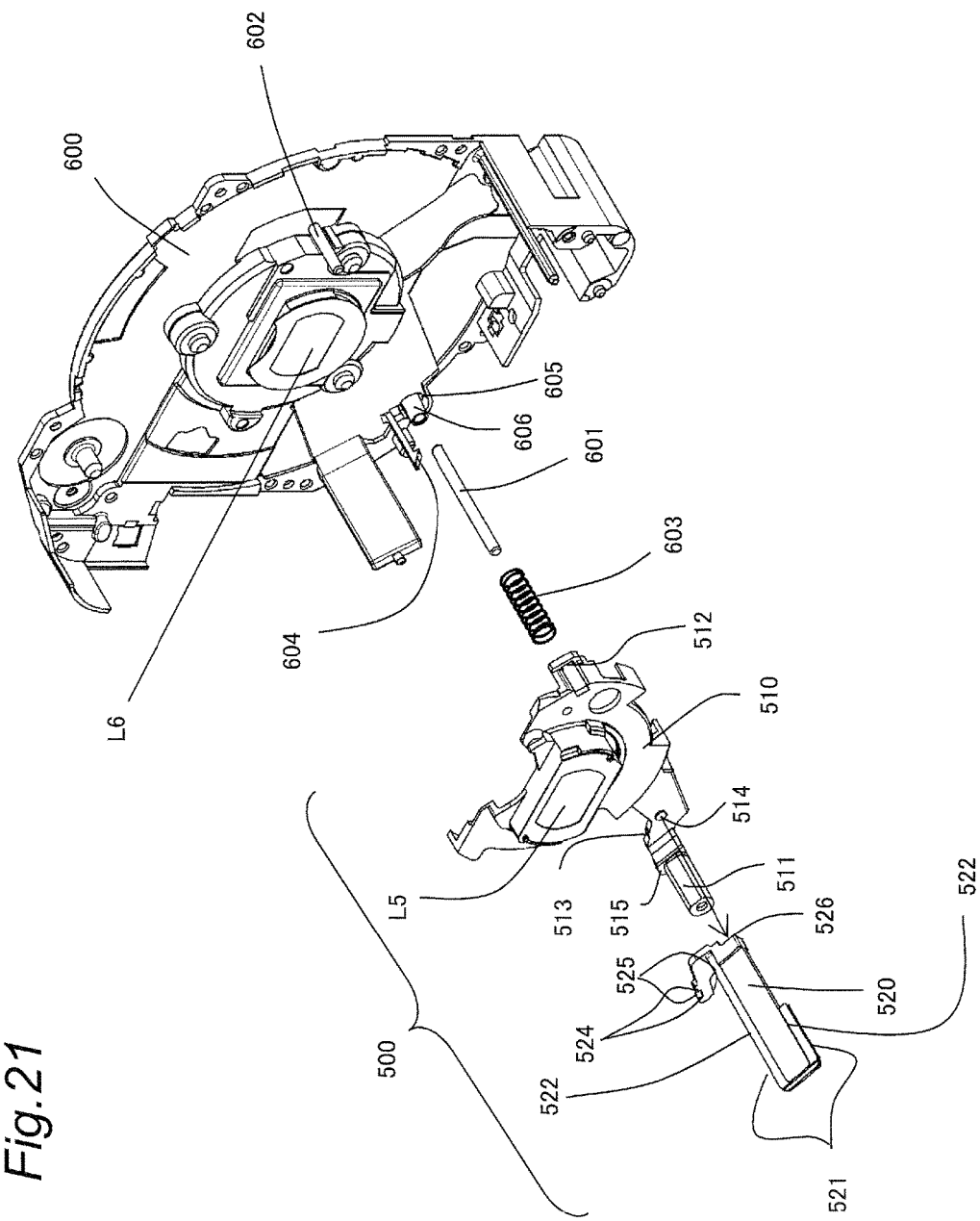
FIG. 21 is an exploded perspective view for describing driving of a fifth group unit 500.

As shown in FIG. 21, the fifth group lens frame 510 includes: a guide portion 511; a guide portion 512; a contact portion 513; a contact portion 514; and an engaging portion 515. The guide portion 511 engages with a fifth group guide shaft 601 in such a manner that the guide portion 511 allows the movement of the fifth group lens frame 510 in the optical axis direction while restricting the position of the fifth group lens frame 510 in a plane orthogonal to the optical axis and the inclination of the fifth group lens frame 510 in the plane orthogonal to the optical axis. The guide portion 512 restricts the position of the fifth group lens frame 510 in the plane orthogonal to the optical axis together with the guide portion 511. A biasing spring 603 which biases the fifth group lens frame 510 toward a front side in the optical axis direction is brought into contact with the contact portion 513. The contact portion 514 is brought into contact with a contact portion 526 of the fifth group drive arm 520. With this constitution, the position of the contact portion 514 in the optical axis direction changes corresponding to the position of the fifth group drive arm 520 in the optical axis direction. The engaging portion 515 engages with the position restricting portion 604 of the master flange unit 600 so as to hold the fifth group lens frame 510 such that the fifth group lens frame 510 is not removed from the master flange unit 600. The fifth group lens frame 510 is held by the master flange unit 600 by way of the fifth group guide shaft 601 and the fifth group guide shaft 602. The fifth group lens frame 510 is biased toward a front side by the biasing spring 603 mounted on the fifth group guide shaft 601.

The fifth group guide shaft 601 and the fifth group guide shaft 602 are fixed to the master flange unit 600 approximately parallel to the optical axis. The master flange unit 600 includes: a shaft fixing portion 606; the position restricting portion 604; and a contact portion 605. The shaft fixing portion 606 fixes the fifth group guide shaft 601 to the master flange unit 600. The position restricting portion 604 engages with the engaging portion 515 of the fifth group lens frame 510 thus restricting the movement of the fifth group lens frame 510 in the optical axis direction. The contact portion 605 is brought into contact with the biasing spring 603. In a state taken in the course of assembling the lens barrel 2000, the fixed frame 900 is not joined to the master flange unit 600, and the fifth group drive arm 520 is not present on a front side of the fifth group lens frame 510. At this stage of operation, the fifth group lens frame 510 is biased toward a front side by the biasing spring 603 and hence, the engaging portion 515 of the fifth group lens frame 510 and the position restricting portion 604 of the master flange unit 600 engage with each other. Accordingly, there is no possibility that the fifth group lens frame 510 is removed from the master flange unit 600.

The fifth group drive arm 520 has a shape (an arc shape) which corresponds to an arc which constitutes a portion of a circular cylinder about the optical axis. As shown in FIG. 17, FIGS. 22, 23 and FIG. 27, the fifth group drive arm 520 includes: the rotation restricting portion 521; a radial-direction restricting portion 522; three cam followers 523; a radial-direction restricting portion 524; the rotational direction restricting portion 525; and a contact portion 526. The rotation restricting portion 521 engages with a guide groove 1111 formed on the penetration cam frame 1100 thus restricting the rotation of the fifth group drive arm 520 with respect to the optical axis. The radial-direction restricting portion 522 engages with a restricting portion 1110 formed on the penetration cam frame 1100 thus restricting the movement of the fifth group drive arm 520 in the radial direction. The cam follower 523 engages with three drive cam grooves 1036 formed on an inner peripheral surface of the second drive frame 1030 (see FIG. 24) thus restricting the movement of the fifth group drive arm 520 in the optical axis direction. The radial-direction restricting portion 524 engages with a restricting portion 901 formed on the fixed frame 900 thus restricting the movement of the fifth group drive arm 520 in the radial direction. The rotational direction restricting portion 525 engages with a restricting portion 902 formed on the fixed frame 900 thus restricting the rotation of the fifth group drive arm 520. The contact portion 526 is brought into contact with the contact portion 514 of the fifth group lens frame 510 thus transmitting the position of the fifth group drive arm 520 in the optical axis direction to the fifth group lens frame 510. The fifth group drive arm 520 is arranged outside in the radial direction of the fourth lens group L4 of the fourth group unit 400, and connects the drive cam groove 1036 formed on an inner peripheral side of the second drive frame 1030 disposed on a front side in the optical axis direction and the contact portion 514 of the fifth group lens frame 510 to each other. With this constitution, the drive force of the drive frame unit 1000 can be transmitted to the fifth group lens frame 510 through the fifth group drive arm 520, the fifth group lens frame 510 can be driven, even if other movable frame, that is, the fourth group unit 400 is provided between the drive frame unit 1000 and the fifth group lens frame 510 in the optical axis direction. More specifically, the drive force of the zooming motor unit 910 can be transmitted to the fifth group lens frame 510 through the fifth group drive arm 520, and the fifth group lens frame 510 can be driven, even if other movable frame, that is, the fourth group unit 400 which is driven by the focus motor unit 610 as a second drive source is provided between the drive frame unit 1000 that is driven by the zooming motor unit 910 as a first drive source and the fifth group lens frame 510 in the optical axis direction. Further, the fifth group drive arm 520 has an approximately arcuate shape or an approximately plate shape not but a cylindrical shape and is provided by one in the circumferential direction, and then a space for arranging a mechanism for driving the fifth group lens frame 510 can be reduced. Furthermore, the fifth group drive arm 520 is provided by one in the circumferential direction. Therefore, the driving cam grooves 1036 and the cam follower 523 can be provided by one, respectively. That is, the driving cam grooves 1036 and the cam follower 523 need not to be provided by three (plurality) and the constitution can be simple.

When the second drive frame 1030 is rotated with respect to the penetration cam frame 1100, three cam followers 523 of the fifth group drive arm 520 are moved along three drive cam grooves 1036 of the second drive frame 1030 and hence, the fifth group drive arm 520 is driven in the optical axis direction (see FIG. 24). When at least two cam followers 523 out of three cam followers 523 of the fifth group drive arm 520 are simultaneously engaged with the drive cam grooves 1036, compared to the case where only one cam follower 523 is engaged with the drive cam groove 1036, the rotation of the fifth group drive arm 520 with respect to the second drive frame 1030 is minimally generated. Accordingly, the posture of the fifth group drive arm 520 becomes stable thus enhancing the positioning accuracy. Further, in the fifth group drive arm 520, the rotation restricting portion 521 engages with the guide groove 1111 formed on the penetration cam frame 1100, and the rotational direction restricting portion 525 engages with the restricting portion 902 formed on the fixed frame 900. Accordingly, the rotation of the fifth group drive arm 520 is restricted. In the fifth group drive arm 520, the radial-direction restricting portion 522 engages with the restricting portion 1110 formed on the penetration cam frame 1100, and the radial direction restricting portion 524 engages with the restricting portion 901 formed on the fixed frame 900. With this constitution, a change in the position of the fifth group drive arm 520 in the radial direction is restricted. As a result, changes in the respective positions of the fifth group drive arm 520 in the optical axis direction, the rotational direction and the radial direction can be restricted. Further, changes in the respective positions of the fifth group drive arm 520 in both the front side and the rear side in the optical axis direction. Therefore, the change in the position of the fifth group drive arm 520 can be restricted more accurately. Specifically, changes in the respective positions of the fifth group drive arm 520 in the rotational direction and the radial direction can be restricted, in both the front side and the rear side in the optical axis direction. Therefore, changes in the respective positions of the fifth group drive arm 520 in the rotational direction and the radial direction can be restricted more accurately. When the second drive frame 1030 is rotated relative to the penetration cam frame 1100, the fifth group drive arm 520 is movable approximately parallel to the optical axis while maintaining the posture thereof as it is. Further, in a state where the fixed frame 900 into which the second drive frame 1030 and the penetration cam frame 1100 are assembled is joined to the master flange unit 600, it is possible to acquire the positional relationship where the contact portion 514 of the fifth group lens frame 510 and the contact portion 526 of the fifth group drive arm 520 can be brought into contact with each other. In such a position where the contact portion 514 and the contact portion 526 can be brought into contact with each other, a state is taken where the position restricting portion 604 of the master flange unit 600 and the engaging portion 515 of the fifth group lens frame 510 do not engage with each other, and the fifth group lens frame 510 is biased toward a front side by the biasing spring 603. Accordingly, the state where the contact portion 514 of the fifth group lens frame 510 and the contact portion 526 of the fifth group drive arm 520 are brought into contact with each other can be maintained. When the second drive frame 1030 and the penetration cam frame 1100 are rotated relative to each other in such a state, the fifth group drive arm 520 is driven in the optical axis direction. At this stage of operation, the contact between the contact portion 514 and the contact portion 526 is maintained by the biasing spring 603 and hence, the fifth group lens frame 510 is moved in the optical axis direction in an interlocking manner with the movement of the fifth group drive arm 520. Accordingly, at the time of zooming, the movement of the fifth lens group L5 of the fifth group lens frame 510 can be realized.

In the present disclosure, the fifth group drive arm 520 has an arc shape which is constituted of a portion of the circular cylinder about the optical axis. However, the fifth group drive arm 520 may have a plate-like shape which approximates an arc shape.

In the optical system of the present disclosure, the first lens group L1, the second lens group L2, the third lens group L3 and the fifth lens group L5 are moved in the optical axis direction using the zooming motor unit 910 as a drive source only at the time of zooming, while the fourth lens group L4 is moved in the optical axis direction using the focus motor unit 610 as a drive source both at the time of performing focusing and at the time of zooming. It is preferable that the movement of the lens group using the zooming motor unit 910 as the drive source is brought about by the rotation of the drive frame unit 1000 and the double-sided cam frame 1310 relative to the fixed frame 900, the penetration cam frame 1100 and the rotation restricting frame 1200. That is, it is preferable that such movement of the lens group is performed by the cam mechanism provided between the respective cylinders. On the other hand, it is preferable that the movement of the lens group using the focus motor unit 610 which constitute the drive source is performed by the following mechanism. That is, it is preferable that the mechanism be supported such that the mechanism is movable in the optical axis direction with respect to the master flange unit 600, and the lens group be driven in the optical axis direction by the focus motor unit 610 fixed to the master flange unit 600. This mechanism is assembled in accordance with the following steps (1) to (3) in general.

(1) The mechanism where the zooming motor unit 910 on a fixed frame 900 side, that is, on a front side in the optical axis direction is used as the drive source is assembled.
(2) The mechanism where the focus motor unit 610 on a master flange unit 600 side, that is, on a rear side in the optical axis direction is used as the drive source is assembled.
(3) The mechanism on the fixed frame 900 side, that is, on the front side in the optical axis direction, and the mechanism on the master flange unit 600 side, that is, on the rear side in the optical axis direction are joined to each other.

However, in the optical system of the present disclosure, the third lens group L3 and the fifth lens group L5 which are moved using the zooming motor unit 910 as the drive source are arranged on the front side and the rear side in the optical axis direction with the fourth lens group L4 which is moved using the focus motor unit 610 as the drive source interposed therebetween. Accordingly, when the above-mentioned assembling method is used, at the time of joining the mechanism on the fixed frame side and the mechanism on the master flange unit 600 side, the fourth lens group L4 collides with the fifth lens group L5 and hence, assembling cannot be performed. In other words, when there are provided at least three movable frames which are moved in the optical axis direction and at least two drive sources for moving the movable frames, and at least two movable frames which are moved by the other drive source are arranged with at least one movable frame which is moved by one drive source interposed therebetween, the assembling becomes difficult. Further, when two drive sources are held by two different members, and two members are separated from each other or joined to each other, the assembling becomes difficult.

To overcome the above-mentioned drawbacks, the lens barrel according to the present disclosure includes: the first drive source; the second drive source; the first movable frame; the second movable frame; the first moving mechanism driven by the first drive source; the second movable mechanism driven by the second drive source; the first support member on which the first moving mechanism is arranged and which movably supports the first movable frame and the second movable frame in the optical axis direction; and the intermediate member which is driven by the second moving mechanism, wherein a drive force is transmitted to the first movable frame by the first moving mechanism, and a drive force is transmitted to the second movable frame by way of the intermediate member. Further, the lens barrel of the present disclosure includes the second support member on which the second movable mechanism is arranged, and movably supports the intermediate member in the optical axis direction. The cam mechanism is used as the second moving mechanism. The first support member and the second support member are configured to be separable from each other and are joinable to each other. The first moving frame is arranged more on a second support member side than the second movable frame in the optical axis direction, and at least a portion of the intermediate member is arranged outside the first movable frame or the lens group mounted on the first movable frame in the radial direction. Further, at least one of the contact surface of the intermediate member and the contact surface of the second movable frame is set as a surface approximately orthogonal to the optical axis direction. In the present disclosure, the first drive source is formed of the focus motor unit 610, the second drive source is formed of the zooming motor unit 910, the first movable frame is formed of the fourth group unit 400, the lens group mounted on the first drive frame is formed of the fourth lens group L4, the second movable frame is formed of the fifth group unit 500, the first moving mechanism is formed of the screw feeding mechanism of the focus motor unit 610, the second moving mechanism is formed of the cam mechanism which is constituted of the drive cam groove 1036 and the cam follower 523, the first support member is the master flange unit 600, the second support member is a unit constituted of the fixed frame 900, the penetration cam frame 1100, the rotation restricting frame 1200, the drive frame unit 1000 and the double-sided cam frame 1310, and the intermediate member is formed of the fifth group drive arm 520.

With this constitution, assembling can be performed easily without deteriorating moving accuracy of the movable frame. Further, it is possible to provide the lens barrel which can be easily assembled without increasing drive sources and movable mechanisms.

(Effects and the Like)

The lens barrel according to the present disclosure includes: at least one lens; the optical axis of the lens; the first frame (the fixed frame 900) having the first restricting portion (the restricting portion 901, the restricting portion 902) and having an approximately cylindrical shape about the optical axis; the second frame (the drive frame unit 1000) having the cam groove (the driving cam groove 1036) and having an approximately cylindrical shape about the optical axis; the third frame (the fifth group lens frame 510) having the guide portion (the guide portion 511) which restricts inclination thereof with respect to the first contact portion (the contact portion 514) and the optical axis and having an approximately cylindrical shape about the optical axis; the drive arm (the fifth group drive arm 520) having a cam follower (the cam follower 523), the second restricting portion (the radial direction restricting portion 524, the rotational direction restricting portion 525) and the second contact portion (the contact portion 526), and having an approximately arcuate shape constituted of a portion of a circular cylinder about the optical axis or an approximately plate shape; the guide shaft (the guide shaft 601) for guiding the guide portion (the guide portion 511) in a movable manner in the optical axis direction; and the spring (the biasing spring 603). The first restricting portion (the restricting portion 901, the restricting portion 902) engages with the second restricting portion (the radial direction restricting portion 524, the rotational direction restricting portion 525). The cam follower (the cam follower 523) engages with the cam groove (the driving cam groove 1036). The drive arm (the fifth group drive arm 520) moves approximately parallel to the optical axis due to the relative rotation of the second frame (the drive frame unit 1000) with respect to the first frame (the fixed frame 900), the third frame (the fifth group lens frame 510) is biased by the spring (the biasing spring 603) thus bringing the first contact portion (the contact portion 514) and the second contact portion (the contact portion 526) into contact with each other, and the third frame (the fifth group lens frame 510) moves in the optical axis direction in an interlocking manner with the drive arm (the fifth group drive arm 520) with the inclination of the guide portion (the guide portion 511) being restricted by the guide shaft (the guide shaft 601).

With this constitution, the lens barrel of the drive arm (the fifth group drive arm 520) can be miniaturized (can be made thin) in the optical axis direction.

In the lens barrel according to the present disclosure, the first restricting portion (the restricting portion 901, the restricting portion 902) includes the first radial direction restricting portion (the restricting portion 901) and the first rotational direction restricting portion (the restricting portion 902), the second restricting portion (the radial direction restricting portion 524, the rotational direction restricting portion 525) includes the second radial direction restricting portion (the radial direction restricting portion 524) and the second rotational direction restricting portion (the rotational direction restricting portion 525), the first rotational direction restricting portion (the restricting portion 902) and the second rotational direction restricting portion (the rotational direction restricting portion 525) engage with each other, and the first radial direction restricting portion (the restricting portion 901) and the second radial direction restricting portion (the radial direction restricting portion 524) engage with each other.

With this constitution, a change in position of the drive arm (the fifth group drive arm 520) in the rotational direction and the radial direction can be restricted.

In the lens barrel according to the present disclosure, the drive arm (the fifth group drive arm 520) includes the third restricting portion (the rotation restricting portion 521, the radial direction restricting portion 522), and the lens barrel includes the fourth frame (1100) having the fourth restricting portion (the restricting portion 1110, the guide groove 1111) which engages with the third restricting portion (the rotation restricting portion 521, the radial direction restricting portion 522) and has an approximately cylindrical shape about the optical axis.

With this constitution, by the third restricting portion (the rotation restricting portion 521, the radial direction restricting portion 522) and the fourth restricting portion (the restricting portion 1110, the guide groove 1111) of the fourth frame (1100), the first restricting portion (the restricting portion 901, the restricting portion 902) and the second restricting portion (the radial direction restricting portion 524, the rotational direction restricting portion 525) can restrict a change in position of the drive arm (the fifth group drive arm 520) outside a predetermined range at different positions. In this embodiment, the second restricting portion (the radial direction restricting portion 524, the rotational direction restricting portion 525) is formed on a rear side of the drive arm (the fifth group drive arm 520) in the optical axis direction and hence, a change in position of the drive arm (the fifth group drive arm 520) outside a predetermined range on a rear side in the optical axis direction can be restricted. On the other hand, the third restricting portion (the rotation restricting portion 521, the radial direction restricting portion 522) is formed on a front side of the drive arm (the fifth group drive arm 520) in the optical axis direction and hence, a change in position of the drive arm (the fifth group drive arm 520) outside a predetermined range on a front side in the optical axis direction can be restricted.

In the lens barrel according to the present disclosure, the third restricting portion (the rotation restricting portion 521, the radial direction restricting portion 522) includes the third radial direction restricting portion (the radial direction restricting portion 522) and the third rotational direction restricting portion (the rotation restricting portion 521), the fourth restricting portion (the restricting portion 1110, the guide groove 1111) includes the fourth radial direction restricting portion (the restricting portion 1110) and the fourth rotational direction restricting portion (the guide groove 1111), the third rotational direction restricting portion (the rotation restricting portion 521) and the fourth rotational direction restricting portion (the guide groove 1111) are engage with each other, and the third radial direction restricting portion (the radial direction restricting portion 522) and the fourth radial direction restricting portion (the restricting portion 1110) engage with each other.

With this constitution, a change in position of the drive arm (the fifth group drive arm 520) in the rotational direction and the radial direction can be restricted. In this embodiment, the third radial direction restricting portion (the radial direction restricting portion 522) and the third rotational direction restricting portion (the rotation restricting portion 521) are formed on a front side of the drive arm (the fifth group drive arm 520) in the optical axis direction and hence, a change in position of the drive arm (the fifth group drive arm 520) in the rotational direction and the radial direction on a front side in the optical axis direction can be restricted. On the other hand, the second radial direction restricting portion (the radial direction restricting portion 524) and the second rotational direction restricting portion (the rotational direction restricting portion 525) are formed on a rear side of the drive arm (the fifth group drive arm 520) in the optical axis direction and hence, a change in position of the drive arm (the fifth group drive arm 520) in the rotational direction and the radial direction on a rear side in the optical axis direction can be restricted.

In the lens barrel according to the present disclosure, the lens barrel includes the fifth frame (the fourth group unit 400) movable in the optical axis direction, and at least a portion of the drive arm (the fifth group drive arm 520) is arranged outside the fifth frame (the fourth group unit 400) or a group of lenses (the fourth lens group L4) mounted on the fifth frame (the fourth group unit 400) in a radial direction.

With this constitution, at least a portion of the drive arm (the fifth group drive arm 520) can be arranged at the same position as the fifth frame (the fourth group unit 400) or the group of lenses (the fourth lens group L4) mounted on the fifth frame (the fourth group unit 400) in the optical axis direction. Accordingly, the lens barrel can be miniaturized (can be made thin) in the optical axis direction.

In the lens barrel according to the present disclosure, the lens barrel includes: the first motor unit (the focus motor unit 610) which drives the fifth frame (the fourth group unit 400) for positioning the fifth frame (the fourth group unit 400) in the optical axis direction; and the second motor unit (the zooming motor unit 910) which drives the second frame (the drive frame unit 1000) in a rotatable manner.

With this constitution, the fifth frame (the fourth group unit 400) can be driven for positioning the fifth frame (the fourth group unit 400) in the optical axis direction by the first motor unit (the focus motor unit 610), and the second frame (the drive frame unit 1000) can be driven in a rotatable manner by the second motor unit (the zooming motor unit 910).

In this embodiment, although the first restricting portion is constituted of the restricting portion 901 and the restricting portion 902, and the second restricting portion is constituted of the radial direction restricting portion 524 and the rotational direction restricting portion 525, the constitution of the first restricting portion and the constitution the second restricting portion are not limited to such a constitution. The first restricting portion and the second restricting portion may adopt any constitution provided that the first restricting portion and the second restricting portion can restrict a change in position outside a predetermined range (a change in position in the rotational direction and the radial direction and the like) due to the engagement of the first restricting portion and the second restricting portion to each other. For example, one restricting portion out of the first restricting portion and the second restricting portion may be constituted of a shaft-like member which extends in the optical axis direction, and the other restricting portion may be constituted of a cylindrical bearing member, for example, through which the shaft-like member is inserted and which supports the shaft-like member in a movable manner in the optical axis direction.

[4. Others]

In some paragraphs of the embodiment, subject matters are described in a manner of "a name of subject matter (a name of concrete subject matter)" such as "a first frame (a first group unit 100)", "a first frame (a penetration cam frame 1100)", and "a first frame (a fixed frame 900)", there are cases where a name of subject matter "a first frame" is used with respect to "a first group unit 100", "a penetration cam frame 1100", and "a fixed frame 900". These expressions do not mean that any one of "a first group unit 100", "a penetration cam frame 1100", and "a fixed frame 900" may be used as "a first frame". Names "first frame" in each paragraph are generalized names in each paragraph with respect to "a first group unit 100", "a penetration cam frame 1100", and "a fixed frame 900". It is the same with respect to "a second frame (a double-sided cam frame 1310)", "a second frame (a first drive frame 1020)", and "a second frame (a drive frame unit 1000)". Further, it is the same with respect to other subject matters described in the same expressing manner.

The embodiment has been described heretofore as an example of the technique according to the present disclosure. For this purpose, the attached drawings and the detailed description are provided.

Accordingly, the constitutional elements described in the attached drawings and the detailed description may also include not only the constitutional elements necessary for solving the problems but also constitutional elements which are unnecessary for solving the problems in order to exemplify the aforementioned techniques. Therefore, such unnecessary constitutional elements should not be immediately determined to be necessary, for the reason that these unnecessary constitutional elements are described in the attached drawings and the detailed description.

Further, the aforementioned embodiment is merely for exemplifying the techniques according to the present disclosure and, therefore, various changes, replacements, additions, omissions and the like can be made thereto within the scope of the claims and scopes equivalent thereto.

INDUSTRIAL APPLICABILITY

The present disclosure is applicable to an imaging apparatus. To be more specific, the present disclosure is applicable to a digital still camera, a movie set, a mobile phone equipped with a camera function, a smartphone and the like.

What is claimed is:

1. A lens barrel comprising:
a first frame;
a second frame which is rotatably supported relative to the first frame about an optical axis, and has a first groove;
a third frame which is rotatably supported relative to the first frame about the optical axis, and has a second groove;
a fourth frame which has a first follower which is engageable with the first groove and the second groove and is movable with respect to the second frame and the third frame in the optical axis direction; and
a moving mechanism which moves the third frame relative to the second frame in the optical axis direction when the third frame is rotated relative to the first frame,
wherein the first follower is formed in a shape by which the first follower can continuously transit between the first groove and the second groove.

2. The lens barrel according to claim 1, wherein the moving mechanism is constituted of a cam mechanism.

3. The lens barrel according to claim 2, wherein the cam mechanism is constituted of a cam follower of the first frame and a cam groove of the third frame.

4. The lens barrel according to claim 3, wherein the second frame has a first rotation restricting portion, and the third frame has a second rotation restricting portion which engages with the first rotation restricting portion.

5. The lens barrel according to claim 1 further includes a drive motor where a drive gear is joined to the drive shaft,
a driven gear portion which engages with the drive gear of the drive motor and rotates the third frame about the optical axis is formed on a rear end side of an outer circumferential surface of the third frame in the circumferential direction, and
the driven gear portion is formed so as to make a predetermined angle with respect to the circumferential direction such that one end side of the driven gear portion in the circumferential direction projects toward a rear side from a rear end of the third frame.

* * * * *